US012602436B2

(12) United States Patent
Yap et al.

(10) Patent No.: US 12,602,436 B2
(45) Date of Patent: Apr. 14, 2026

(54) SYSTEM FOR REAL-TIME FACT-CHECKING OF MULTIMEDIA CONTENT

(71) Applicant: AI Seer Pte. Ltd., Singapore (SG)

(72) Inventors: Dennis B. Yap, Singapore (SG); Shi Ting Wong, Singapore (SG); A M Shahruj Rashid, Singapore (SG); Ngok Jeun Wan, Singapore (SG); Ying Chong Sim, Singapore (SG); Jiamin Bai, Singapore (SG); Anmol Dua, Delhi (IN); Mark Claude Frankel, London (GB); Sriram Srikanth, Singapore (SG); Eshaan Govil, Princeton, NJ (US); Aarush P. Goradia, Princeton, NJ (US)

(73) Assignee: AI Seer Pte. Ltd., Singapore (SG)

( * ) Notice: Subject to any disclaimer, the term of this patent is extended or adjusted under 35 U.S.C. 154(b) by 0 days.

(21) Appl. No.: 19/011,265

(22) Filed: Jan. 6, 2025

(65) Prior Publication Data

US 2025/0231990 A1      Jul. 17, 2025

Related U.S. Application Data

(60) Provisional application No. 63/621,949, filed on Jan. 17, 2024.

(51) Int. Cl.
*G06F 16/00* (2019.01)
*G06F 16/2457* (2019.01)
*G06F 16/903* (2019.01)

(52) U.S. Cl.
CPC .. *G06F 16/90335* (2019.01); *G06F 16/24575* (2019.01)

(58) Field of Classification Search
CPC .................... G06F 16/90335; G06F 16/24575
(Continued)

(56) References Cited

U.S. PATENT DOCUMENTS

2013/0151240 A1*   6/2013  Myslinski .............. G06Q 50/01
                                                                704/9
2016/0050221 A1    2/2016  Myslinski
(Continued)

FOREIGN PATENT DOCUMENTS

TW          M617933        10/2021

OTHER PUBLICATIONS

Bayat et al., "Factual Error Detection and Correction with Evidence", Retrieved from External Knowledge. arXiv:2310.17119, Oct. 26, 2023, pp. 1-7.

*Primary Examiner* — Chelcie L Daye
(74) *Attorney, Agent, or Firm* — Van Pelt, Yi & James LLP

(57) ABSTRACT

Using a machine learning model query on received content, one or more statements in the content that meet one or more candidate criteria for correctness verification are automatically identified. For at least one statement of the identified one or more statements, a machine learning model is used to assess correctness of the at least one statement including by searching resources associated with the at least one statement to determine a search result and evaluating the search result. A revision of at least one statement assessed to be incorrect in the identified one or more statements is automatically determined. In some embodiments, a bias report is generated, wherein the bias report compares two or more resources identified by the search result and used to assess the correctness of the at least one statement.

21 Claims, 39 Drawing Sheets

(58) Field of Classification Search
USPC .......................................................... 707/769
See application file for complete search history.

(56) References Cited

U.S. PATENT DOCUMENTS

| | | | |
|---|---|---|---|
| 2022/0335221 A1 | 10/2022 | Baumgartner | |
| 2023/0334254 A1 | 10/2023 | Ghulati | |
| 2023/0401213 A1 | 12/2023 | Shrivatsa Bhargav | |
| 2024/0005176 A1 | 1/2024 | Dye | |
| 2024/0012838 A1 | 1/2024 | Gorb | |
| 2024/0281487 A1* | 8/2024 | Bathwal | G06F 16/24575 |

* cited by examiner

401 ～ Receive Fact-Checking Request With Content

403 ～ Identify Statements Meeting Criteria For Correctness Verification

405 ～ Assess Correctness Of Statements

407 ～ Determine Feedback And Improve Fact-Checking Service

409 ～ Prepare And Provide Fact-Checking Results

501 — Perform Speech And Optical Character Recognition

503 — Identify And Extract Factual Claims

505 — Perform Natural Language Processing On Extracted Statements

507 — Determine Confidence Score(s)

509 — Provide Determined Statements For Correctness Verification

Start

601   Perform Search For Statement Resources

603   Identify Relevant And Authoritative Information To Support/ Refute Claim

605   Rank And Filter Claim Information Based On Evaluation Criteria

607   Identify Discrepancies Between Sources

609   Determine Correctness Decision For Claim And Confidence Scores

End

801 — Receive Output From Language Model

803 — Analyze And Improve Language Model Output

805 — Capture Feedback On Language Model Results

807 — Improve Language Model Using Captured Feedback

Start

901 — Receive Correction Assessments For Content Statements

903 — Generate Revisions For Statements

905 — Generate Resource Bias Reports

907 — Generate Detailed Report On Content

909 — Provide Fact-Checking Results

End

Von Wong

1. "Correct Name and Timeline": The correct name of the network is ARPANET, not "DARPANET." ARPANET (Advanced Research Projects Agency Network) was developed in the late 1960s, not the late 1990s. According to History.com, ARPANET was created in 1969 by the U.S. Department of Defense's Advanced Research Projects Agency (ARPA) to enable resource sharing among universities and research institutions.

2. "Initial Purpose": The initial purpose of ARPANET was to facilitate communication and resource sharing among research institutions and the government. The Internet Society notes that ARPANET was designed to allow multiple computers to communicate on a single network, primarily for research purposes.

3. "Evolution into Everyday Communication": The transition from a research tool to a tool for everyday communication happened gradually over several decades. The National Science Foundation played a significant role in expanding the network in the 1980s, leading to the development of the modern internet. By the early 1990s, the internet began to be

Von Wong

The claim that "over 80% of people get their news exclusively from social media platforms" is not supported by the available data. According to the Pew Research Center, as of 2024, about a third of U.S. adults regularly get news from Facebook and YouTube, with smaller percentages for other platforms like Instagram, TikTok, and X (formerly Twitter). This indicates that while social media is a significant source of news, it does not account for over 80% of news consumption.

Furthermore, the claim that social media is the "most trusted source of information" is also not supported. According to a February 2024 analysis from Pew, many users express concerns about the accuracy of news on social media. Additionally, other sources like Statista and JAMA indicate that traditional sources such as physicians (for health information) and official election information sources are still highly trusted.

Therefore, the claim is inaccurate on both counts: the percentage of people getting news exclusively from social media is much lower than 80%, and social media is not considered the most trusted source of information.

FIG. 15

Nancy Pelosi did not accept the offer from Trump of 10,000 soldiers or National Guard on January 6, 2021.

False

The claim that Nancy Pelosi did not accept an offer from Trump of 10,000 soldiers or National Guard on January 6, 2021, is false. Multiple credible sources, including AP News, The Washington Post, and The Dispatch, have debunked this claim. They clarify that Pelosi does not have the authority to direct the National Guard. Additionally, there is no evidence that Trump made such an offer. The January 6 committee and other investigations have shown that the claim is not true.

1. AP News (July 23, 2021): The claim that House Speaker Nancy Pelosi blocked the National Guard from coming to the Capitol during the January 6 insurrection is false. Pelosi does not have the authority to direct the National Guard. AP News 2. Washington Post (December 15, 2021): Trump did not order 10,000 troops to secure the Capitol on January 6. The claim that Trump requested increased National Guard support, which was rejected, is also false. Washington Post 3. AP News (June 28, 2024): Trump falsely claimed that he offered Pelosi 10,000 soldiers or National Guard, and she turned them down. Pelosi does not direct the National Guard. AP News 4. The Dispatch (October 25, 2022): The claim that Pelosi rejected Trump's request for National Guard troops on January 6 is false. Pelosi does not have the authority to approve or reject such requests. The Dispatch 5. AJC (June 27, 2024): Trump's claim that Pelosi turned down his offer to send 10,000 soldiers or National Guard to the Capitol during the January 6 insurrection is false. Pelosi does not have the authority to direct the National Guard. AJC

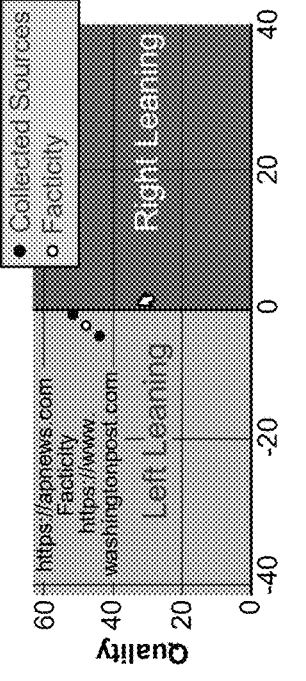

① Let's disambiguate. It would be true if there was evidence that Trump offered 10,000 troops and Pelosi had the authority to accept or reject that offer. It is false because no evidence exists of such an offer, and Pelosi lacked the authority to deploy the National Guard.

Collected Sources
Facticity

Right Leaning

Left Learning https://apnews.com
Facticity
https://www.washingtonpost.com

Political Bias

Quality 60  40  20  0

-40  -20  0  20  40

\* Facticity gathers evidence from the web, and its answers might have biases based on the sources it can find on the issue. Here is a breakdown of the sources and their biases for the claim Nancy Pelosi did not accept the offer from Trump of 10,000 soldiers or National Guard on January 6, 2021.

Based on the Ad fontes Media Chart

FIG. 19 facticity.ai

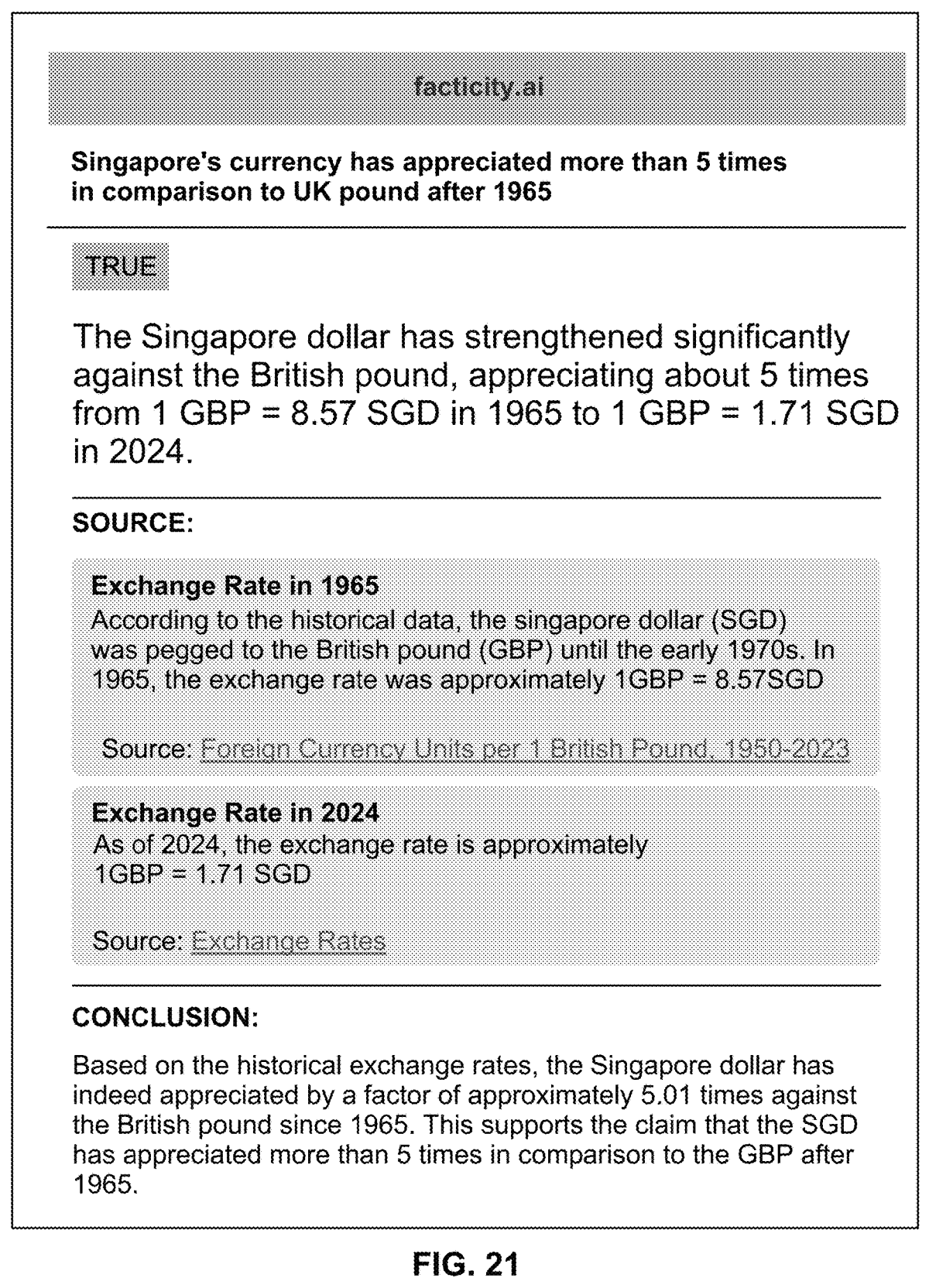

Singapore's currency has appreciated more than 5 times in comparison to UK pound after 1965

TRUE

The Singapore dollar has strengthened significantly against the British pound, appreciating about 5 times from 1 GBP = 8.57 SGD in 1965 to 1 GBP = 1.71 SGD in 2024.

SOURCE:

Exchange Rate in 1965
According to the historical data, the singapore dollar (SGD) was pegged to the British pound (GBP) until the early 1970s. In 1965, the exchange rate was approximately 1GBP = 8.57SGD Source: Foreign Currency Units per 1 British Pound, 1950-2023

Exchange Rate in 2024
As of 2024, the exchange rate is approximately 1GBP = 1.71 SGD Source: Exchange Rates

CONCLUSION:

Based on the historical exchange rates, the Singapore dollar has indeed appreciated by a factor of approximately 5.01 times against the British pound since 1965. This supports the claim that the SGD has appreciated more than 5 times in comparison to the GBP after 1965.

FIG. 21

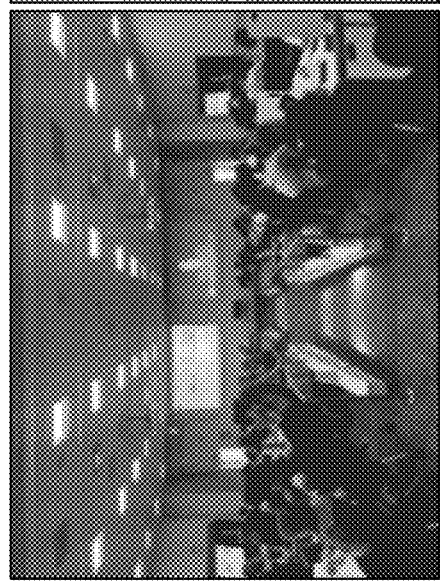
FIG. 22

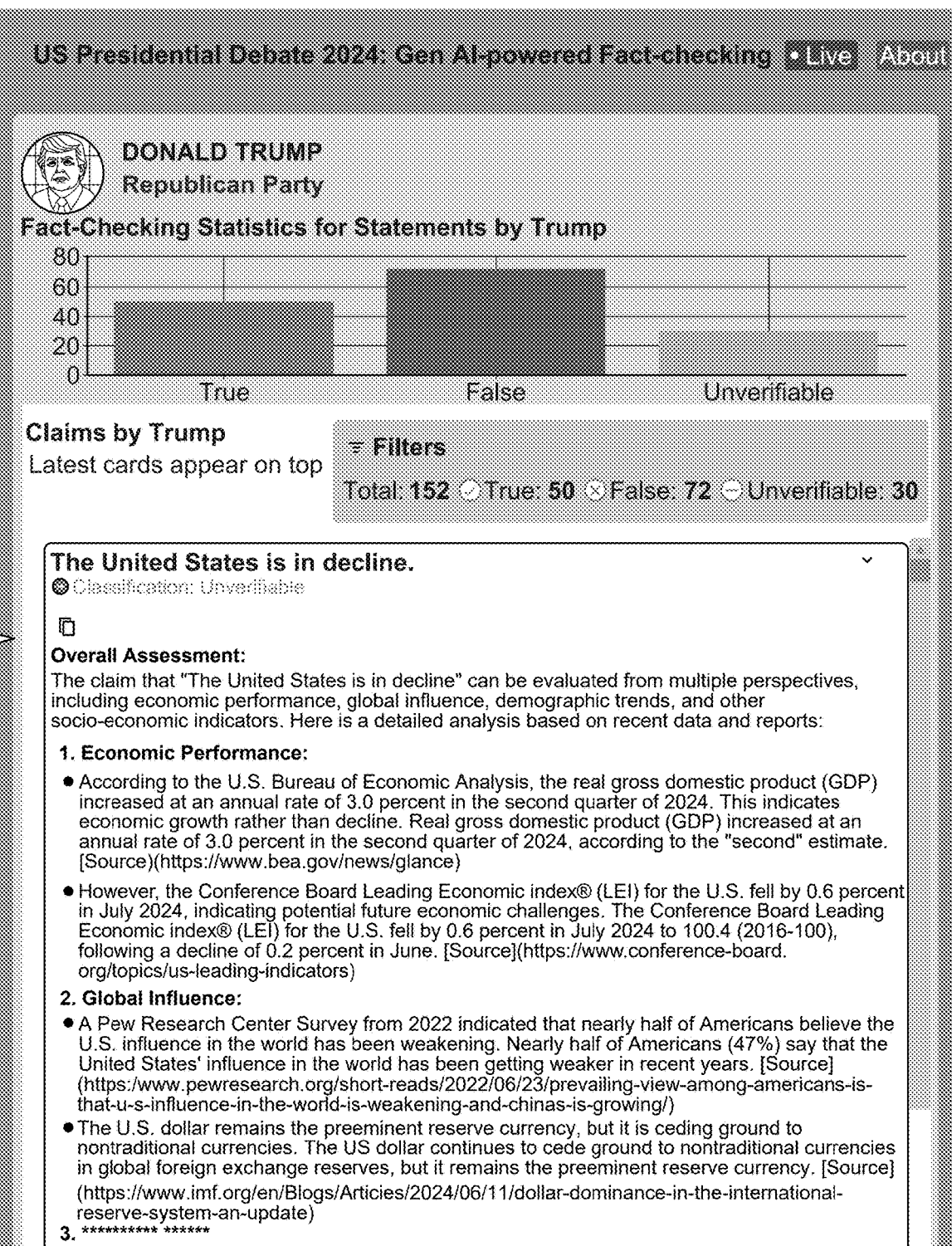

US Presidential Debate 2024: Gen AI-powered Fact-checking ● Live    About

DONALD TRUMP
Republican Party
Fact-Checking Statistics for Statements by Trump

[Bar chart with y-axis labeled 80, 60, 40, 20, 0 and x-axis labeled True, False, Unverifiable]

Claims by Trump
Latest cards appear on top

⚲ Filters
Total: 152 ○ True: 50 ⊗ False: 72 ○ Unverifiable: 30

The United States is in decline.                                    ⌄
⊗ Classification: Unverifiable

▯

Overall Assessment:
The claim that "The United States is in decline" can be evaluated from multiple perspectives, including economic performance, global influence, demographic trends, and other socio-economic indicators. Here is a detailed analysis based on recent data and reports:

1. Economic Performance:
● According to the U.S. Bureau of Economic Analysis, the real gross domestic product (GDP) increased at an annual rate of 3.0 percent in the second quarter of 2024. This indicates economic growth rather than decline. Real gross domestic product (GDP) increased at an annual rate of 3.0 percent in the second quarter of 2024, according to the "second" estimate. [Source](https://www.bea.gov/news/glance)

● However, the Conference Board Leading Economic index® (LEI) for the U.S. fell by 0.6 percent in July 2024, indicating potential future economic challenges. The Conference Board Leading Economic index® (LEI) for the U.S. fell by 0.6 percent in July 2024 to 100.4 (2016-100), following a decline of 0.2 percent in June. [Source](https://www.conference-board.org/topics/us-leading-indicators)

2. Global Influence:
● A Pew Research Center Survey from 2022 indicated that nearly half of Americans believe the U.S. influence in the world has been weakening. Nearly half of Americans (47%) say that the United States' influence in the world has been getting weaker in recent years. [Source](https://www.pewresearch.org/short-reads/2022/06/23/prevailing-view-among-americans-is-that-u-s-influence-in-the-world-is-weakening-and-chinas-is-growing/)

● The U.S. dollar remains the preeminent reserve currency, but it is ceding ground to nontraditional currencies. The US dollar continues to cede ground to nontraditional currencies in global foreign exchange reserves, but it remains the preeminent reserve currency. [Source](https://www.imf.org/en/Blogs/Articles/2024/06/11/dollar-dominance-in-the-international-reserve-system-an-update)

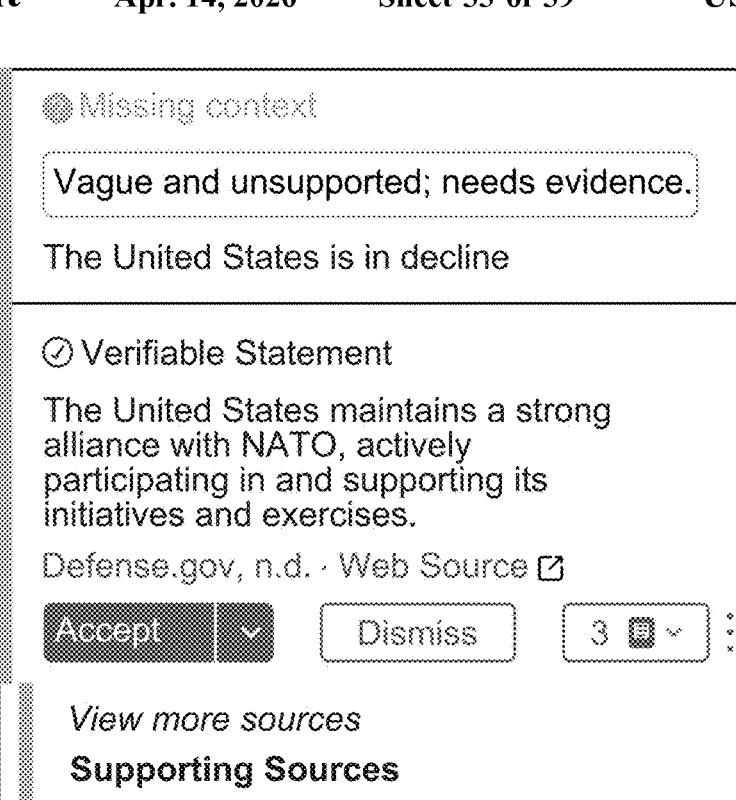

Missing context

Vague and unsupported; needs evidence.

The United States is in decline

⊘ Verifiable Statement

The United States maintains a strong alliance with NATO, actively participating in and supporting its initiatives and exercises.

Defense.gov, n.d. · Web Source ☐

| Accept ▾ | | Dismiss | 3 ▣ ˅ | ⋮ |

*View more sources*

Supporting Sources

The United States is facing a rising national debt, with consistent increases in the total amount of debt over the past decade.

U.S Treasury Fiscal Data, n.d. · Web Source ☐

Counterargument Sources

The United States has a thriving startup culture, marked by a high number of startups, strong infrastructure, and a spirit of innovation, with growth continuing even during economic downturns like the COVID-19 pandemic.

McKinsey, n.d. · Web Source ☐

Neutral Sources

The U.S. is experiencing both economic pressures, such as an overheated economy, and opportunities for renewal and growth, evidenced by robust productivity and employment growth and initiatives like the Good Jobs Challenge.

IMF, n.d. · Web Source ☐

FIG. 28

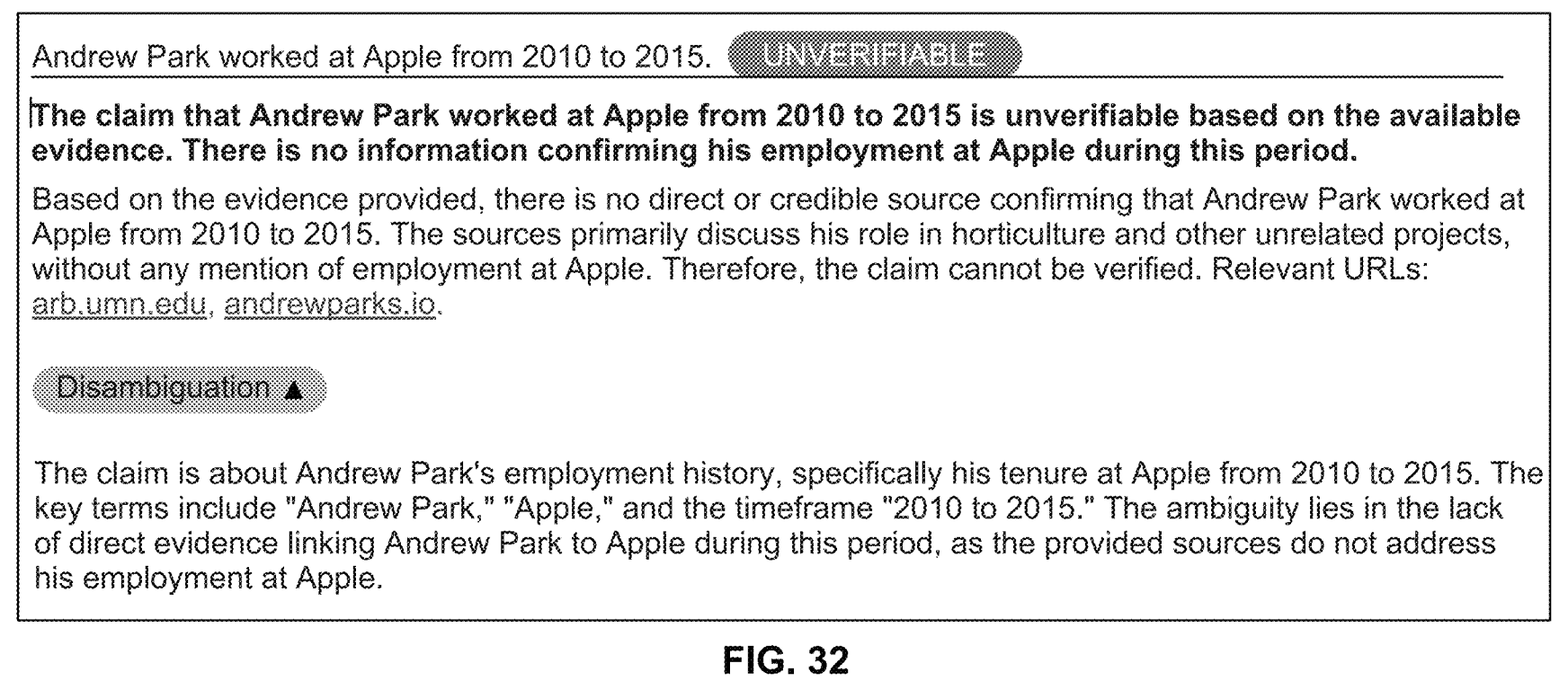

Andrew Park worked at Apple from 2010 to 2015.   UNVERIFIABLE

The claim that Andrew Park worked at Apple from 2010 to 2015 is unverifiable based on the available evidence. There is no information confirming his employment at Apple during this period.

Based on the evidence provided, there is no direct or credible source confirming that Andrew Park worked at Apple from 2010 to 2015. The sources primarily discuss his role in horticulture and other unrelated projects, without any mention of employment at Apple. Therefore, the claim cannot be verified. Relevant URLs: arb.umn.edu, andrewparks.io.

Disambiguation ▲

The claim is about Andrew Park's employment history, specifically his tenure at Apple from 2010 to 2015. The key terms include "Andrew Park," "Apple," and the timeframe "2010 to 2015." The ambiguity lies in the lack of direct evidence linking Andrew Park to Apple during this period, as the provided sources do not address his employment at Apple.

FIG. 32

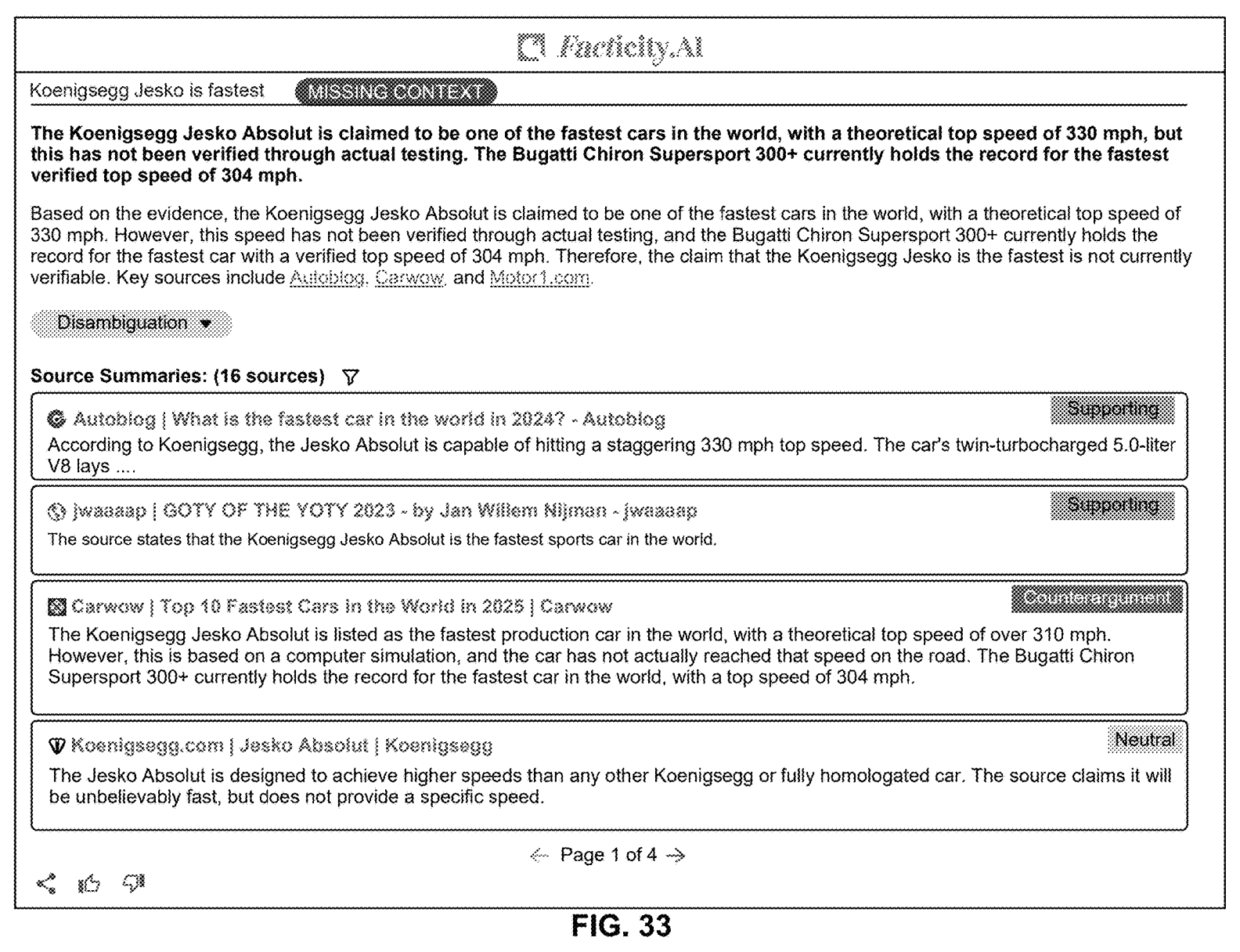

Veracity.AI

Koenigsegg Jesko is fastest    MISSING CONTEXT

The Koenigsegg Jesko Absolut is claimed to be one of the fastest cars in the world, with a theoretical top speed of 330 mph, but this has not been verified through actual testing. The Bugatti Chiron Supersport 300+ currently holds the record for the fastest verified top speed of 304 mph.

Based on the evidence, the Koenigsegg Jesko Absolut is claimed to be one of the fastest cars in the world, with a theoretical top speed of 330 mph. However, this speed has not been verified through actual testing, and the Bugatti Chiron Supersport 300+ currently holds the record for the fastest car with a verified top speed of 304 mph. Therefore, the claim that the Koenigsegg Jesko is the fastest is not currently verifiable. Key sources include Autoblog, Carwow, and Motor1.com.

Disambiguation ►

Source Summaries: (16 sources) ▽

Autoblog | What is the fastest car in the world in 2024? - Autoblog    Supporting
According to Koenigsegg, the Jesko Absolut is capable of hitting a staggering 330 mph top speed. The car's twin-turbocharged 5.0-liter V8 lays ....

jwaaaap | GOTY OF THE YOTY 2023 - by Jan Willem Nijman - jwaaaap    Supporting
The source states that the Koenigsegg Jesko Absolut is the fastest sports car in the world.

Carwow | Top 10 Fastest Cars in the World in 2025 | Carwow    Contradicting
The Koenigsegg Jesko Absolut is listed as the fastest production car in the world, with a theoretical top speed of over 310 mph. However, this is based on a computer simulation, and the car has not actually reached that speed on the road. The Bugatti Chiron Supersport 300+ currently holds the record for the fastest car in the world, with a top speed of 304 mph.

Koenigsegg.com | Jesko Absolut | Koenigsegg    Neutral
The Jesko Absolut is designed to achieve higher speeds than any other Koenigsegg or fully homologated car. The source claims it will be unbelievably fast, but does not provide a specific speed.

← Page 1 of 4 →

FIG. 33

SYSTEM FOR REAL-TIME FACT-CHECKING OF MULTIMEDIA CONTENT

CROSS REFERENCE TO OTHER APPLICATIONS

This application claims priority to U.S. Provisional Patent Application No. 63/621,949 entitled SYSTEM FOR REAL-TIME FACT-CHECKING OF MULTIMEDIA CONTENT filed Jan. 17, 2024 which is incorporated herein by reference for all purposes.

BACKGROUND OF THE INVENTION

With the increased reach and availability of digital media, digital content has become a primary form of media consumption for many. This accelerated adoption has been aided in part by the proliferation of digital devices, the Internet, and media platforms. As barriers to content creation become fewer and as content is more easily shared, the rapid creation and dissemination of misinformation and disinformation through multimedia content presents a challenge. Conventional fact-checking methods are manual, time-consuming, and inadequate in keeping pace with the swift creation and spread of information. Therefore, there exists a need for an automated system capable of accurately checking claims for accuracy and adaptable across various media types.

BRIEF DESCRIPTION OF THE DRAWINGS

Various embodiments of the invention are disclosed in the following detailed description and the accompanying drawings.

FIG. 15 is an example of a user interface view of a content pane for a client application enabled with a content fact-checking extension.

FIG. 19 is an example of a user interface view for interfacing with a content fact-checking service.

FIG. 21 is an example of a user interface for interfacing with a content fact-checking service.

FIG. 22 is a set of images displaying live fact-checking functionality of a content fact-checking service.

FIG. 28 is an example of a user interface of an embodiment of a content fact-checking service for a claim categorized as missing context.

FIGS. 31 and 32 are examples of user interface views for performing disambiguation when interfacing with a content fact-checking service.

FIG. 33 is an example of a user interface of an embodiment of a content fact-checking service with source categorization and labeling.

DETAILED DESCRIPTION

Figure 1:
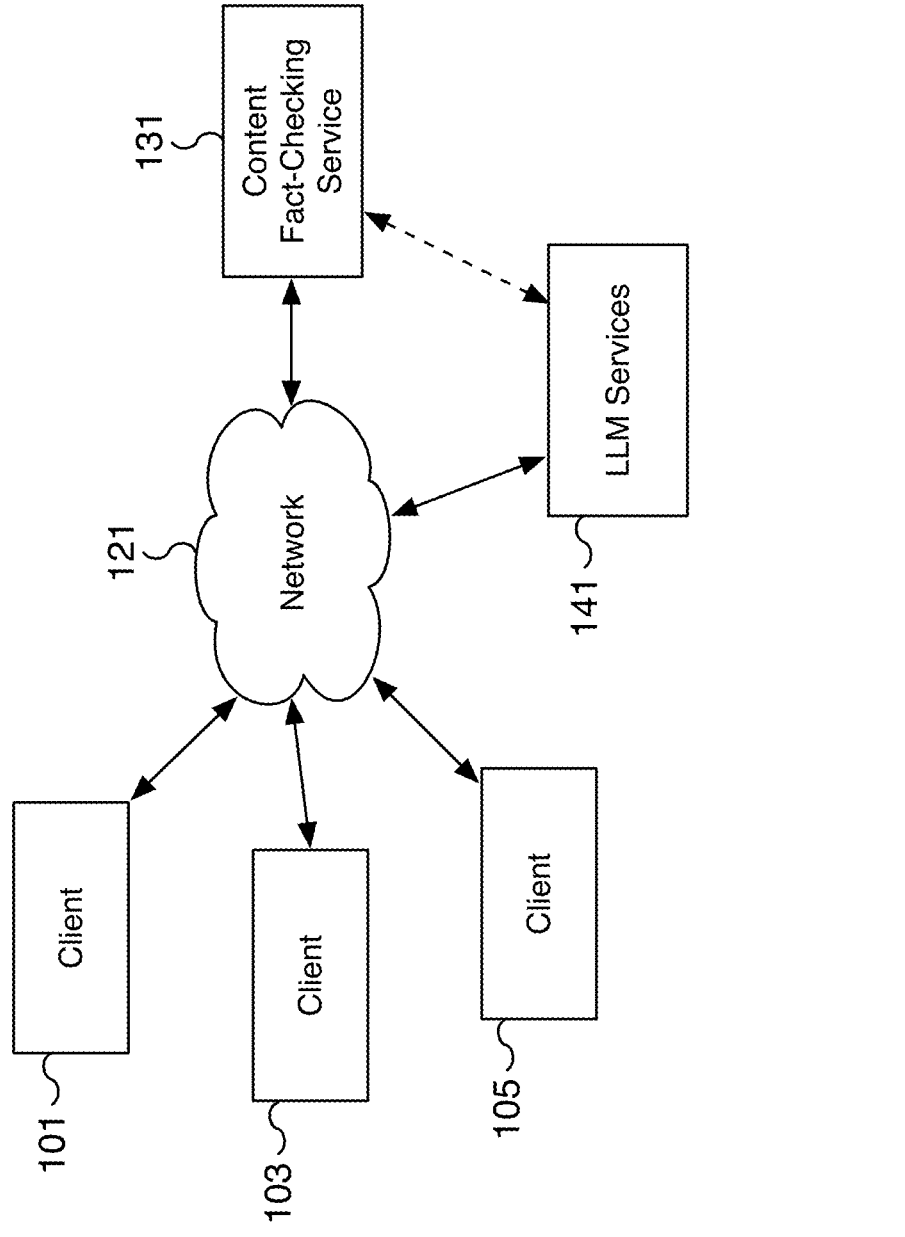
FIG. 1 is a block diagram illustrating an embodiment of a computing infrastructure for a content fact-checking service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment.

The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A content fact-checking service is disclosed. For example, content can be analyzed in real-time using a multimedia content fact-checking service. The disclosed fact-checking service can analyze received content and identify statements within the content, such as purported facts, that require verification for correctness. The analysis can separate statements that are intended to represent facts from non-factual statements such as opinions or subjective statements. In various embodiments, the represented facts are then analyzed for correctness by performing a comprehensive search for verification resources.

In some embodiments, based on a comprehensive search for correctness verification resources, the identified verification resources are ranked, such as based on authority, accuracy, and/or another metric. For example, resources with higher rankings are weighted more highly when applying a resource for evaluating the correctness of a statement. As another example, the different ranks for resources can be used to determine which resources to weight more heavily when determining correctness of a statement. Resources that do not exceed a certain threshold can be excluded from use in evaluating the correctness of a statement.

Figure 24:
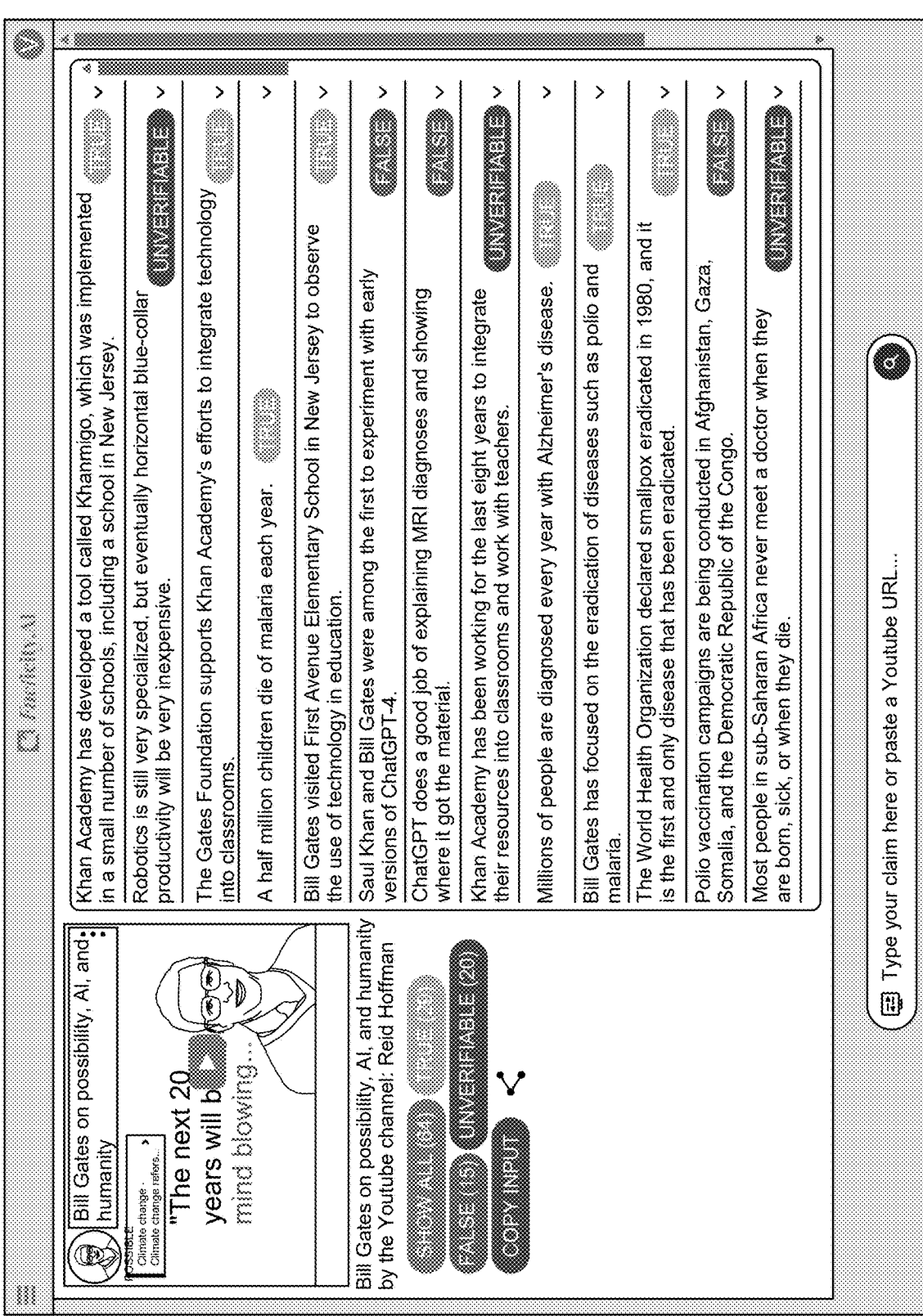
FIGS. 24 and 25 are examples of user interface views for performing content fact-checking on multimedia content.
Figure 25:
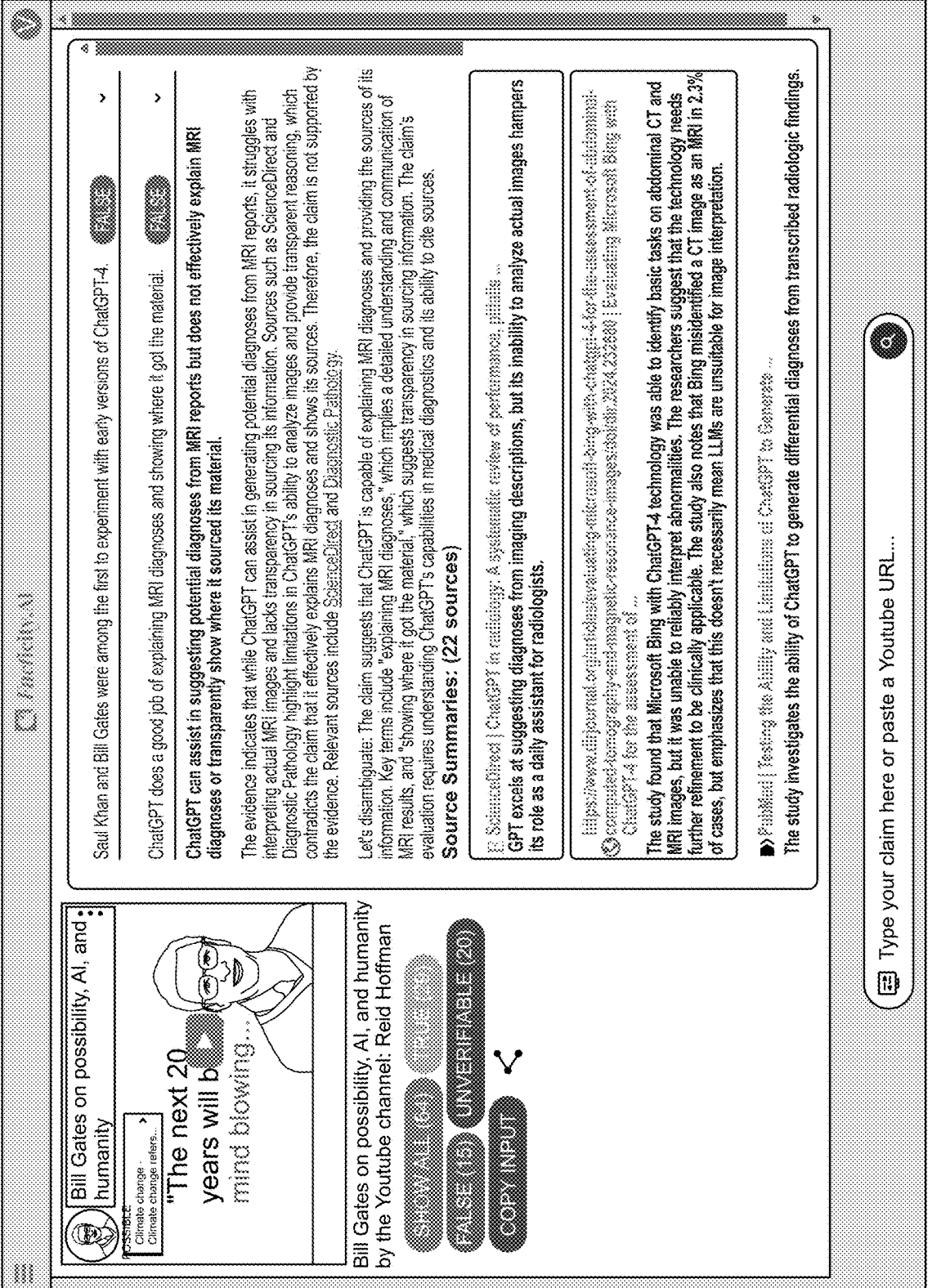

In various embodiments, based on the evaluation of a statement using the identified resources, the statement is categorized into one or more fact-checking categories that reflect the correctness of the statement. For example, a statement can be categorized as true or false. In some embodiments, additional categories exist, such as true, partly or partially true, inconclusive, partly or partially false, and false. As shown below in FIG. 24, a statement can be also categorized as true, false, unverifiable, or missing context. Moreover, as shown in FIG. 25, a missing context category can include multiple categories such as: true if qualified this way, false if qualified this way, and lacking sufficient context to be verified.

In various embodiments, the statement and its determined correctness categories are provided as a fact-checking result. Citations to the identified resources can be provided to justify the determined correctness categories. Based on the application scenario, one or more revisions for the statement, such as revisions that are factually correct or clarify an ambiguity, can be provided and/or used to replace the initial statement. For example, a user modifying content in a word processing application or content creation application can perform fact checking on generated content and selectively replace non-true facts with proposed revisions. In some embodiments, the content creation tool is a word processor such as a desktop client, a cloud-based word processor, and/or another content creation tool. In various embodiments, the content can include non-text-based content such as images, photos, audio, video, and/or other media.

Figure 29:
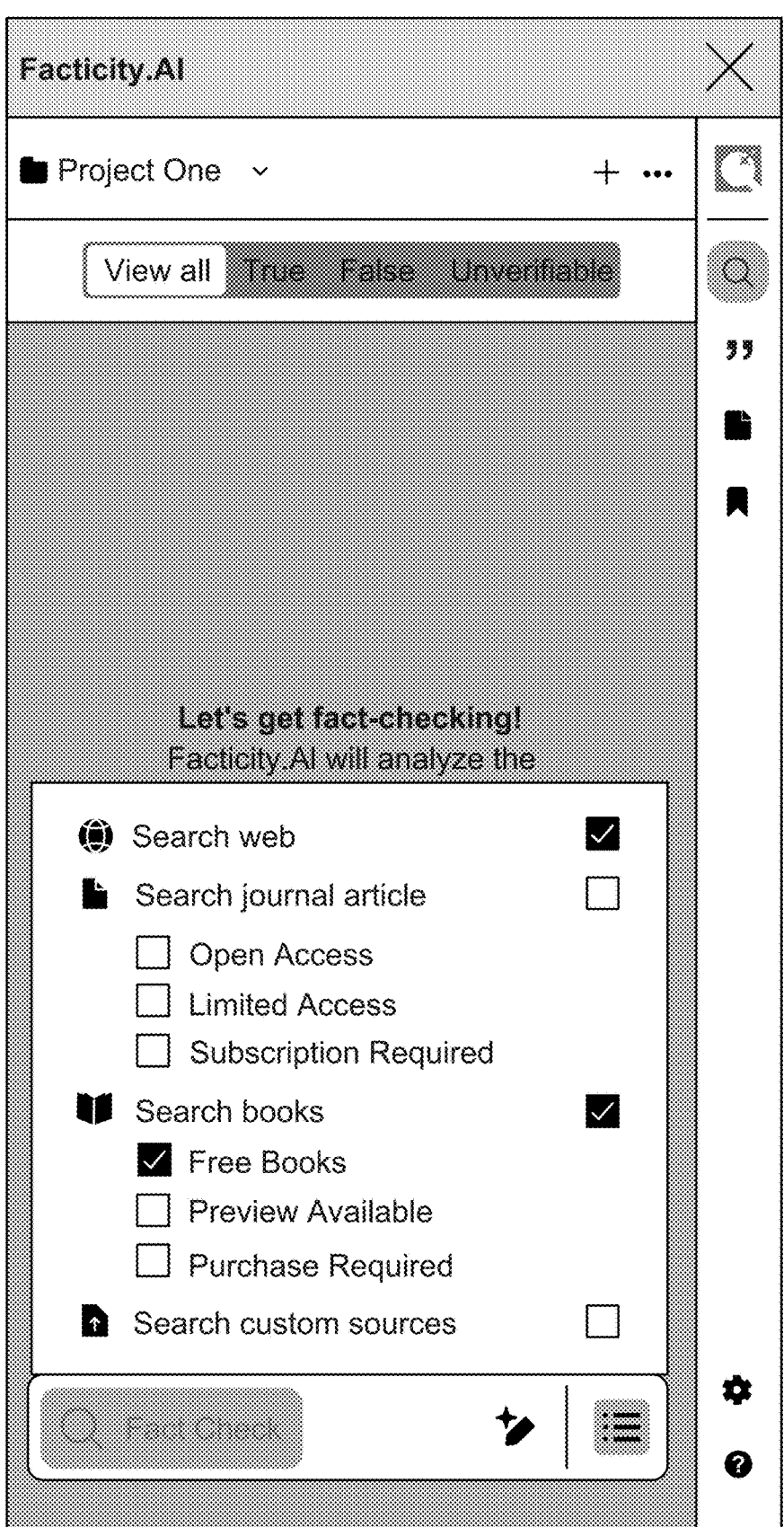
FIG. 29 is an example of a user interface of an embodiment of a content fact-checking service for filtering sources by type.

In some embodiments, a comprehensive system for real-time fact-checking of multimedia content, utilizing advanced linguistic model processing, contextual analysis, and deep web searches, is disclosed. In some embodiments, the system operates asynchronously, seamlessly integrating with various digital platforms, thereby addressing the urgent need for automated and accurate verification of information in today's dynamic digital media landscape. In some embodiments, users can filter the types of sources they wish to receive in the results. An example user interface implementing a source filter is shown in FIG. 29. These options shown include web sources, journal articles (with categories that include open access, limited or semi-public access, and private or subscription required access), books (with categorizes that include free, preview, or purchase required), or a user's own custom sources, which can be uploaded and shared for access. Utilizing advanced technologies such as audio transcripts, contextual analysis, deep web searches, and integration of the entire written and oral knowledge of humanity, the system extends its capability to tap into information at subconscious or unconscious levels through sensor integration, thus ensuring a more holistic and comprehensive approach to fact-checking.

Figure 30:
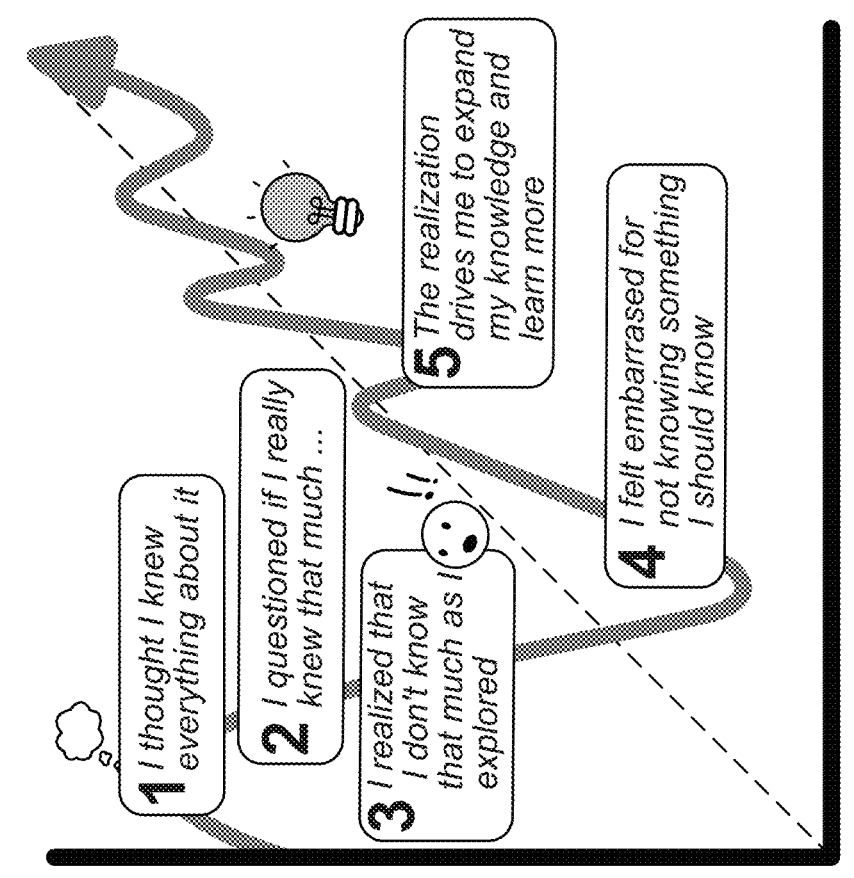
FIG. 30 is a diagram describing the relationship between expressed convictions and knowledge.

In the era of ubiquitous digital media, the rapid creation and dissemination of misinformation and disinformation through multimedia content poses an unprecedented challenge for states, democracies, and citizens. Conventional fact-checking methods are manual, time-consuming, and inadequate in keeping pace with the swift creation and spread of information. The various disclosed embodiments address these challenges with an automated, real-time system capable of accurately clarifying, extracting, analyzing, sorting, and checking claims across various media types. The disclosed content fact-checking service can utilize an extensive repository of human knowledge, rating claims for credibility, correctness, clarity, and accuracy. For example, a politician or news outlet who knowingly and frequently makes erroneous claims will automatically have their credibility rating downgraded. Thus, a politician who repeatedly denies having sex with an intern despite all the evidence pointing to the contrary will receive a downgrade in credibility rating. This could be linked to a scoreboard and/or transaction token where every intelligence born into this world starts with a default amount such as one truth coin. Each time an intentional lie is made, a percentage of the truth coin holdings is deducted, and every time a fact is unknowingly misstated publicly, the corresponding truth coin holdings are reduced by a decimal amount. In some embodiments, the greater the expressed convictions correlate to knowledge, the greater the corresponding transactional truth coin holdings are for the holder. An example of the relationship between expressed convictions to knowledge is shown in FIG. 30. In some embodiments, the impact of a deduction in truth coin holdings can be reversed when a public admission of wrongdoing is made. The disclosed content fact-checking service can attribute more credibility or a higher credibility rating as a source to people with more truth coins. The credibility attribution can be used to fact-check and perform lie detection on people in real time and/or in a decentralized manner.

Additional tuning can be performed for biases. For example, if countries dislike each other and frequently spread false information about one another, views originating from or attributed to particular countries can also be discounted by the content fact-checking service. Sources, such as people or individuals, that tend to make more epistemologically modest claims can receive more credibility. Similarly, a platform may provide ads by entities that are being targeted by disinformation campaigns, wish to clear their name, and/or desire to promote the public interest. In some embodiments, viral misinformation hurting a brand can be mitigated by applying the content fact-checking service on the platform's ads. In one aspect, the disclosed content fact-checking service can perform an evaluative function that filters out less reliable sources of information.

In various embodiments, the disclosed content fact-checking service offers significant advantages over traditional methods of fact-checking. For example, the disclosed service can be provided as an automated, fast, and scalable service that is capable of handling large volumes and varieties of multimedia content in real time. The system includes functionality for fact-checking video content by accepting video links from platforms such as YouTube, Zoom, Otter.AI, and TikTok, etc., and also videos uploaded by the user. Example embodiments of the service and its user interface are shown in FIGS. 24 and 25. Upon receiving a video/link, the system extracts video metadata and processes the audio to generate a transcript (using speech-to-text conversion wherever needed). If necessary, the transcript is translated to the required language for consistency with the fact-checking workflow. The extracted text, enriched with video metadata for additional context, undergoes claim extraction and verification following the established fact-checking pipeline. The verified claims, along with assessments and source information, are presented in the user interface (as shown in FIGS. 24 and 25). Aside from a quantitative summary of the statistics, there are also qualitative assessments of whether mis-statements of facts are big ones (i.e., large and impactful), conflicts of interests (such as where a speaker has invested in a company related to a promotion), and even hazardous ones, such as health claims. There may also be issues when the core atomic facts, context, or criteria for a thesis are false but the peripheral and trivial details are true. The fact-checked claims can be filtered based on final classification, sorted based on timestamp, and/or shared as links.

In various embodiments, the disclosed service is not limited to a particular domain of knowledge and can be configured to cover the entire spectrum of available human knowledge, including the subconscious and unconscious data, offering a comprehensive, accurate, and reliable service for content fact-checking. As part of the content fact-checking process, the content fact-checking results can help users confront when subconscious and unconscious data is creating a bias that does not allow them to easily process the objective factual evidence. For example, the service offers objective fact-checked results on areas that may be traditionally subject to bias, including subconscious bias, such as content covering a minority and/or female leaders in a position of authority. In various embodiments, the disclosed content fact-checking service can be configured as an interactive, adaptive, and user-friendly service for providing clear and concise fact-checking results, along with personalized and contextualized suggestions and feedback. Moreover, the service can be improved based on feedback and can be configured as a collaborative, transparent, and accountable service that involves the participation and contribution of its users and the platforms being fact-checked. As part of the disclosed content fact-checking process, the content fact-checking results can include sources evaluated, citations relied upon, and/or the methods used during the fact-checking process.

In some embodiments, the disclosed content fact-checking service can be integrated as a standalone system, via a plugin, or as a layer that can be integrated into various digital platforms, such as social media, news outlets, or educational resources. The services can be further integrated on top of existing large language models (LLMs), including publicly available LLMs, as an additional step to fact-checked LLM results. In some embodiments, the disclosed content fact-checking service can be used to red-team other models and/or social media outputs including before they are released to the public. Depending on needs and preferences of users and platforms, various embodiments can provide both asynchronous and/or live fact-checking capabilities. Similarly, different embodiments can also be customized and configured to suit different domains, languages, and contexts.

In some embodiments, the fact-checking pipeline can also be integrated with a Retrieval-Augmented Generation (RAG) system. Archives, documents, proprietary sources, and/or other sources of information can be converted into numerical text embeddings and stored as vectors in vector databases (or knowledge bases). Based on the claims extracted from the user query, the knowledge base can be searched for the most similar vectors based on semantic meanings and keywords. The information fetched from the knowledge base can be fed to RAG-based LLM agents as additional context which could be used for verification of the claim.

In some embodiments, the disclosed content fact-checking service is integrated with different online platforms, such as video streaming services, conference tools, and news broadcasting networks. Users can be provided with the option to upload videos and/or utilize the system in real-time, a feature especially beneficial and relevant during live events and broadcasts. In some configurations, the service allows for asynchronous operation, ensuring accuracy and timeliness without disrupting the ongoing content flow.

Some potential use cases for various embodiments include journalists and media consumers, educators and students, politicians and voters, scientists and researchers, and businesses and consumers, among others. For example, journalists and media consumers can use various embodiments to verify the accuracy and credibility of the information they encounter or produce, such as news articles, podcasts, documentaries, or social media posts. Various embodiments can help them avoid falling for misinformation or disinformation and provide them with reliable and relevant sources and evidence to support or challenge their claims. Educators and students can use various embodiments to enhance their learning and teaching experiences, such as by checking the facts and sources of the materials they use or create, such as textbooks, essays, presentations, or quizzes. Various embodiments can help them improve their critical thinking and research skills and provide them with personalized and contextualized feedback and suggestions to improve their understanding and performance. As shown in the example of FIG. 24, politicians and voters can use various embodiments to monitor and evaluate the statements and promises made by political candidates or parties, such as during debates, speeches, or campaigns. Various embodiments can help them detect and expose any lies or inconsistencies and provide them with unbiased and comprehensive information to make informed and rational decisions. Scientists and researchers can use various embodiments to validate and update their findings and hypotheses, such as by checking the facts and sources of the data and literature they use or produce, such as experiments, papers, or reviews. Various embodiments can help them avoid any errors or biases and provide them with the latest and most authoritative information to advance their knowledge and innovation. Businesses and consumers can use various embodiments to verify and compare the claims and features of the products and services they offer or purchase, such as by checking the facts and sources of the reviews and advertisements they encounter or create, such as ratings, testimonials, or commercials. Various embodiments can help them avoid any scams or frauds and provide them with trustworthy and relevant information to make the best choices and deals.

In some embodiments, content is received. For example, content from a client application such as a web application, web browser, network-enabled application, cloud service application, or another client application is received at a content fact-checking service. The client application providing the content can include a variety of applications such as content creation applications including word processors or document editors, among others. In various embodiments, the client application providing the content is configured to access the content fact-checking service, such as via a content fact-checking extension, content fact-checking plug-in, or a content fact-checking service client stub of the client application. The received content can include text content such as a portion of text selected from within the client application. In some embodiments, the content includes other media content such as images, video, audio, etc. For example, the received content can be multimedia content that includes both text and images, among other types of media. For instance, on a social media platform, a viral meme's textual content can be labelled and flagged by an extension or plug-in of the content fact-checking service. Moreover, automatic transcriptions of audio-based media such as podcasts (hosted on a service or locally, such as on a user's mobile device) or cloud-based videos can also be flagged and the user can be alerted to misinformation.

In some embodiments, using a machine learning model query, one or more statements in the content that meet one or more candidate criteria for correctness verification are automatically identified. For example, the received content is automatically analyzed to determine statements within the content, such as within the received text content or other received media content, that can be evaluated with correctness. In various embodiments, the analysis distinguishes between statements such as purported facts that can be verified for correctness and other content such as opinion content that may be subjective and not applicable for correctness verification.

In some embodiments, for at least one statement of the identified one or more statements, using a machine learning model, the correctness of the statement is accessed including by searching resources associated with the statement to determine a search result and evaluating the search result. For example, a statement identified as subject to verification is evaluated for correctness by utilizing one or more machine learning models such as one or more large language models with one or more provided correctness verification prompts. In some embodiments, a specific model is selected based on the type of statement and/or the expected resources required for correctness verification. Based on the statement, multiple resources are searched and used to evaluate the correctness of the statement, such as to support, refute, and/or add clarity to the correctness of the statement. In some embodiments, a comprehensive search is performed to identify available resources which are retrieved and analyzed to determine whether they are consistent or inconsistent with (and/or support, refute, and/or add clarity to) the identified statement. For example, an Associated Press article can be identified and analyzed to determine whether the article supports, refutes, and/or clarifies the correctness of the statement. As another example, a Washington Post article can also be identified and analyzed to determine whether the article supports, refutes, and/or clarifies the correctness of the statement. In some embodiments, the analysis is performed using one or more machine learning models including one or more large language models with customized prompts for performing the analysis.

In various embodiments, the correctness assessment performed on a statement can be further evaluated based on an evaluation of the sources. For example, the disclosed content fact-checking service can evaluate metadata, whether pixels have been adjusted, how many followers are real humans, typos, verifications, number of followers, etc. to help contribute to a credibility profiling of a source. Verification checks can be performed to ensure the authenticity of the profile, the digital footprint of the user, and/or their potential association with any other online misinformation and/or disinformation. Open source intelligence (OSINT) checks, such as reverse image searches on the content posted online, can also be performed. Other factors that can be utilized for evaluation include archives such as the Wayback Machine or other internet archives, authenticity metrics for authors, and/or the appearance and/or inclusion of other URLS on a website. For example, the sources utilized can be evaluated for accuracy and/or ranked based on metrics such as reliability and accuracy. In various embodiments, the sources can also be evaluated on other metrics such as by bias, political leaning, endorsements, purpose, intention, reputation, credibility, transparency, currency, peer review, accuracy, reliability, and/or objectivity. In some embodiments, some of the criteria are evaluated as a single metric and/or additional criteria can be considered.

In some embodiments, a revision of at least one statement assessed to be incorrect in the identified one or more statements is automatically determined. For example, a statement identified as incorrect can be replaced with a revised statement that is correct. Additionally, in some embodiments, the revised statement can be provided as an alternative to replace the incorrect statement. The revision may include citations such as a source or resource for validating the correctness of the revision and/or the incorrectness of the incorrect statement. In some embodiments, the citation is a resource in support of a factual claim made by the revision.

In some embodiments, for at least one statement of the identified one or more statements, a machine learning model is used to identify an ambiguity associated with the at least one statement including by searching resources associated with the at least one statement to determine a search result and evaluating the search result. For example, instead of identifying a statement as definitively true or false, the statement is identified as ambiguous or another similar category. In some embodiments, the ambiguous statement is unable to be verified without additional context. With an ambiguity identified as associated with a statement of the content, a user can be presented with the identification of the ambiguity and the opportunity to provide a user feedback response to clarify the statement and help resolve (or disambiguate) the ambiguity. In some embodiments, a user feedback response is received to clarify the ambiguity of the at least one statement. For example, a user can provide additional information, including by selecting from one or more automatically provided prompts, to resolve the identified ambiguity. In some embodiments, the response is solicited through one or more different means such as via a chat interface, multimedia inputs, an interactive user interface, or another means. In various embodiments, once the ambiguity is clarified and/or resolved, fact-checking can be performed on the statement and/or content using the disclosed fact-checking techniques.

FIG. 1 is a block diagram illustrating an embodiment of a computing infrastructure for a content fact-checking service. In the example shown, clients 101, 103, and 105 are network clients configured to utilize content fact-checking service 131 to verify the correctness of purported factual statements within provided content. Clients 101, 103, and 105 are communicatively connected to content fact-checking service 131 via network 121, and content fact-checking service 131 is communicatively connected to large language model (LLM) services 141. Network 121 can be a public or private network. In some embodiments, network 121 is a public network such as the Internet. Content fact-checking service 131, utilizing LLM services 141, provides content fact-checking services for multimedia content provided by clients 101, 103, and/or 105. For example, a user at clients 101, 103, or 105 can select content, such as a text block on a web page in a web browser or text within a content creation tool, and request that the selected content be fact checked using content fact-checking service 131. In some embodiments, content fact-checking service 131 communicates with a content fact-checking extension, plug-in, or client stub integrated into a content application running on clients 101, 103, or 105. Based on the content fact-checking results, the selected content can be revised and/or citations provided to justify the correctness of a statement within the content. For example, when initiated from a content creation application such as a text editor, presentation editor, or email application, fact-checked content can be revised with provided revisions that have been verified with corresponding citations.

In some embodiments, clients 101, 103, and 105 are each a network client device for interfacing with content fact-checking service 131. Clients 101, 103, and 105 have network access via network 121 to content fact-checking service 131 for performing content fact-checking, including real-time fact checking, and related fact-checking services. In some embodiments, clients 101, 103, and 105 utilize an application client such as an email application, text editor, document creation tool, web application, content consumption application, or another application for accessing content to communicate with content fact-checking service 131. In some embodiments, the content application is configured with a content fact-checking client end-point such as a content fact-checking extension, plugin, or API integration client.

In some embodiments, content fact-checking service 131 corresponds to one or more servers of a content fact-checking service for validating the correctness of provided content. For example, content fact-checking service 131 is an AI-enabled content fact-checking service that identifies statements in a block of provided content and researches resources to determine if the identified statements are accurate. Content fact-checking service 131 can also determine revisions and/or citations for fact-checking results. For example, a revision can be provided to modify an identified incorrect or ambiguous statement. In the example shown, content fact-checking service 131 utilizes one or more deep learning models accessed via LLM services 141. The deep learning models can be used to identify statements within the content that would benefit from correctness verification and/or to research resources used to verify the correctness of identified statements.

In some embodiments, LLM services 141 correspond to one or more different LLM services for generating content fact-checking results using machine learning model queries. LLM services 141 may be first-party and/or third-party LLM services. For example, LLM services 141 may include one or more third-party services that are queried for LLM results. LLM services 141 may also offer multiple different deep learning models, each with different tradeoffs such as speed, resource usage requirements, accuracy, depth of analysis, and cost, among others. In some embodiments, LLM services 141 is a multi-stage deep learning platform that allows for fine-tuning of model results. In some embodiments, one or more LLM services of LLM services 141 are operated by the same entity as content fact-checking service 131. In some embodiments, LLM services 141 may utilize both first-party and third-party services including using a first-party service to fine-tune third-party LLM results. As shown in FIG. 1 by the solid and dotted lines, LLM services 141 may be communicatively connected to content fact-checking service 131 via network 121. For example, LLM services 141 are accessed by content fact-checking service 131 via network 121.

Although single instances of some components have been shown to simplify the diagram of FIG. 1, additional instances of any of the components shown in FIG. 1 may exist. For example, content fact-checking service 131 may be implemented by one or more content fact-checking servers, and LLM services 141 may be implemented by one or more LLM servers. Additionally, clients 101, 103, and 105 are example client devices for accessing and utilizing content fact-checking service 131. Although three clients are shown (clients 101, 103, and 105), many more additional clients can exist and access content fact-checking service 131. In some embodiments, components not shown in FIG. 1 may also exist and/or the network configuration of the included components may differ from what is shown.

Figure 2:
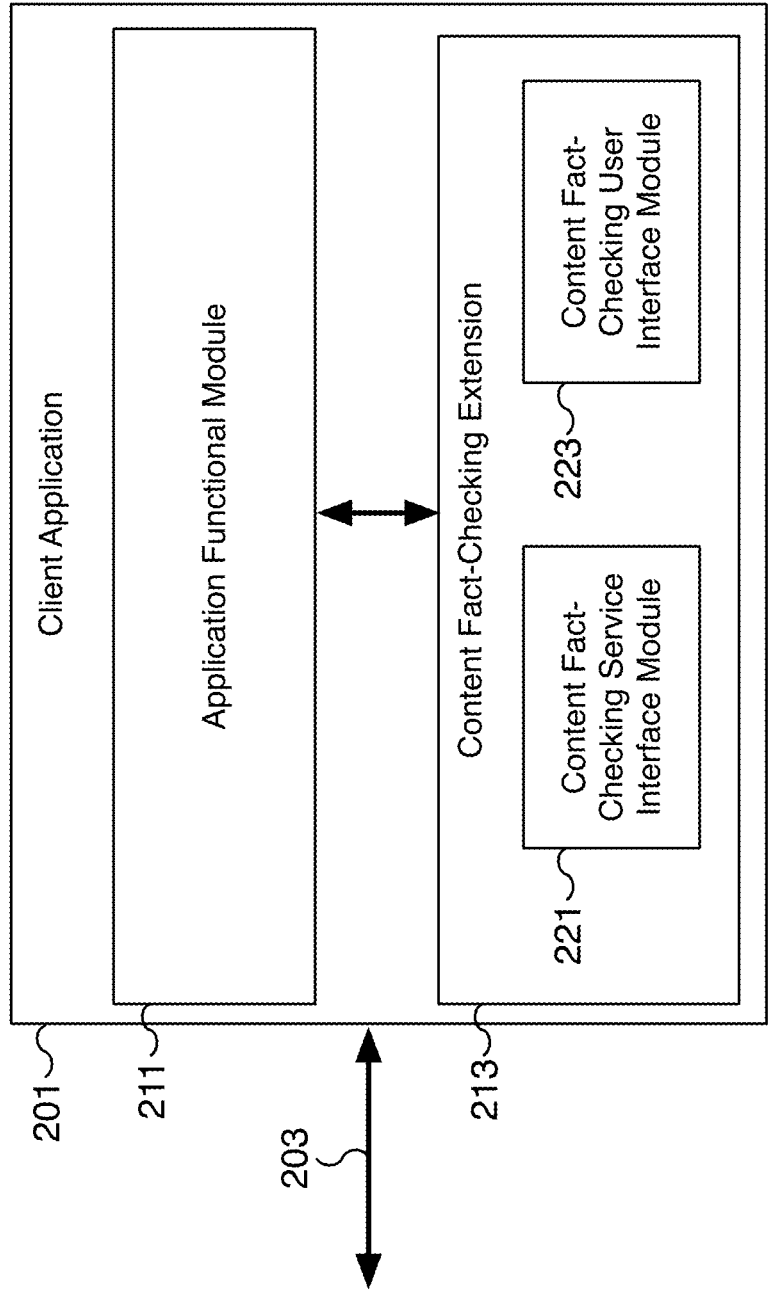
FIG. 2 is a block diagram illustrating an embodiment of a client application configured to support content fact-checking.

FIG. 2 is a block diagram illustrating an embodiment of a client application configured to support content fact-checking. In the example shown, client application 201 includes network interface 203, application functional module 211, and content fact-checking extension 213. Content fact-checking extension 213 includes content fact-checking service interface module 221 and content fact-checking user interface module 223. In various embodiments, client application 201 is an application implemented by application functional module 211 for interfacing with content including multimedia content such as text, images, photos, audio, and video, among other forms of content. Using content fact-checking extension 213, client application 201 is enabled with content fact-checking features. In some embodiments, client application 201 is a content application running on a client such as client 101, 103, and/or 105 of FIG. 1 and, using via network interface 203, accesses a content fact-checking service such as content fact-checking service 131 of FIG. 1.

In some embodiments, application functional module 211 is a processing module for implementing the core functionality of client application 201. For example, for a cloud-based document editing application, application functional module 211 implements the document editing features including the content editing and cloud-based features. In order to enable content fact-checking, application functional module 211 interfaces with content fact-checking extension 213. For example, application functional module 211 can utilize a content fact-checking extension 213 to perform content fact-checking on content managed by application functional module 211. In some embodiments, a user selects content from within client application 201 and application functional module 211 passes the selected content to content fact-checking extension 213. Content fact-checking extension 213 performs the requested fact-checking on the received content and provides a content fact-checking result.

In some embodiments, content fact-checking extension 213 can interface with the user interface of client application 201, for example, to display content fact-checking results and/or to revise the selected content.

In some embodiments, content fact-checking extension 213 is an application extension that enables content fact-checking support within client application 201. Content fact-checking extension 213 may be an extension, a plug-in, a library, an add-on, a widget, a component, a script, a package, or another similar or appropriate module for enabling content fact-checking with a client application. In the example shown, content fact-checking extension 213 includes content fact-checking service interface module 221 and content fact-checking user interface module 223. Content fact-checking service interface module 221 can be used to communicate with a content fact-checking service and content fact-checking user interface module 223 can be used to support user interface interactions with the content fact-checking features.

In some embodiments, content fact-checking extension 213 corresponds to a browser or web browser extension. As a browser extension (or plug-in), content fact-checking extension 213 can provide content fact-checking results on content accessed or viewed via a browser application. For example, content fact-checking results can be provided for web content including multimedia content such as on-demand, streaming, and/or live videos. An example of content fact-checking results provided for multimedia web-content is shown in FIG. 22. Content fact-checking extension 213 can interface with a content fact-checking service and content fact-checking user interface module 223 to provide content fact-checking alerts on accessed content, including previously reviewed material. For example, if granted access to a user's browsing history, content fact-checking extension 213 can analyze past viewed or previously accessed content and provide retrospective alerts, such as a retrospective alert on an article that was read an hour, a day, or a week earlier. Retrospective alerts can inform the user of misleading or debunked content that has only recently been found and/or identified as such.

In some embodiments, content fact-checking extension 213 includes functionality to analyze content referenced by a link or similar reference. For example, using a content fact-checking service, content fact-checking extension 213 can analyze and perform fact-checking on a provided and/or extracted link that references content such as text, video, multimedia, or content of other formats. In some embodiments, the link is embedded in content that is already being analyzed and/or fact-checked by content fact-checking extension 213. For example, content fact-checking extension 213 can extract links included in content and proceed to analyze the content referenced at the extracted link. In various embodiments, the provided and/or extracted link may specifically reference video-based content that includes video content with associated metadata. The video content may be hosted on a content-sharing, video-sharing, streaming, social media, and/or another video platform and can further include videos uploaded and/or shared by the user. Example platforms can include YouTube, TikTok, and others.

In some embodiments, content fact-checking service interface module 221 is a processing module for interfacing with a content fact-checking service such as content fact-checking service 131 of FIG. 1. Content fact-checking service interface module 221 may implement support for an application programming interface (API) supported by the content fact-checking service. Using content fact-checking service interface module 221, content fact-checking queries can be performed on selected content. The corresponding content fact-checking service may be a remote or local content fact-checking service and can receive the selective content of client application 201 for fact-checking via content fact-checking service interface module 221. In various embodiments, content fact-checking service interface module 221 utilizes network interface 203 to communicate with the content fact-checking service.

In some embodiments, content fact-checking user interface module 223 is a processing module for implementing user interface functionality including user interface interactions for content fact-checking features. For example, application functional module 211 may utilize functionality of content fact-checking user interface module 223 to support user interface elements for selecting content for fact-checking, updating the selected content with revision and/or citations, showing fact-checking results, and/or allowing the user to engage in other fact-checking features, among other user interactions. Moreover, the fact-checking results received at content fact-checking service interface module 221 can be utilized by content fact-checking user interface module 223 for displaying the results and allowing the user to interface with the results. For example, a user may be able to scroll through fact-checking results, select proposed revisions, select citations, and/or interact with other aspects of the fact-checking results. In various embodiments, different types or instances of content fact-checking extensions may support different user interactions by implementing different features in content fact-checking user interface module 223. For example, a voice application and a touchscreen application may utilize different user interface paradigms and require different implementations of content fact-checking user interface module 223 to support the different types of user interactions. In some embodiments, once content is verified, verified claims, along with assessments and source information, are presented in the user interface. The fact-checked content can be filtered based on final classification, sorted based on timestamp (such as for analyzed video), and/or shared as links.

Figure 3:
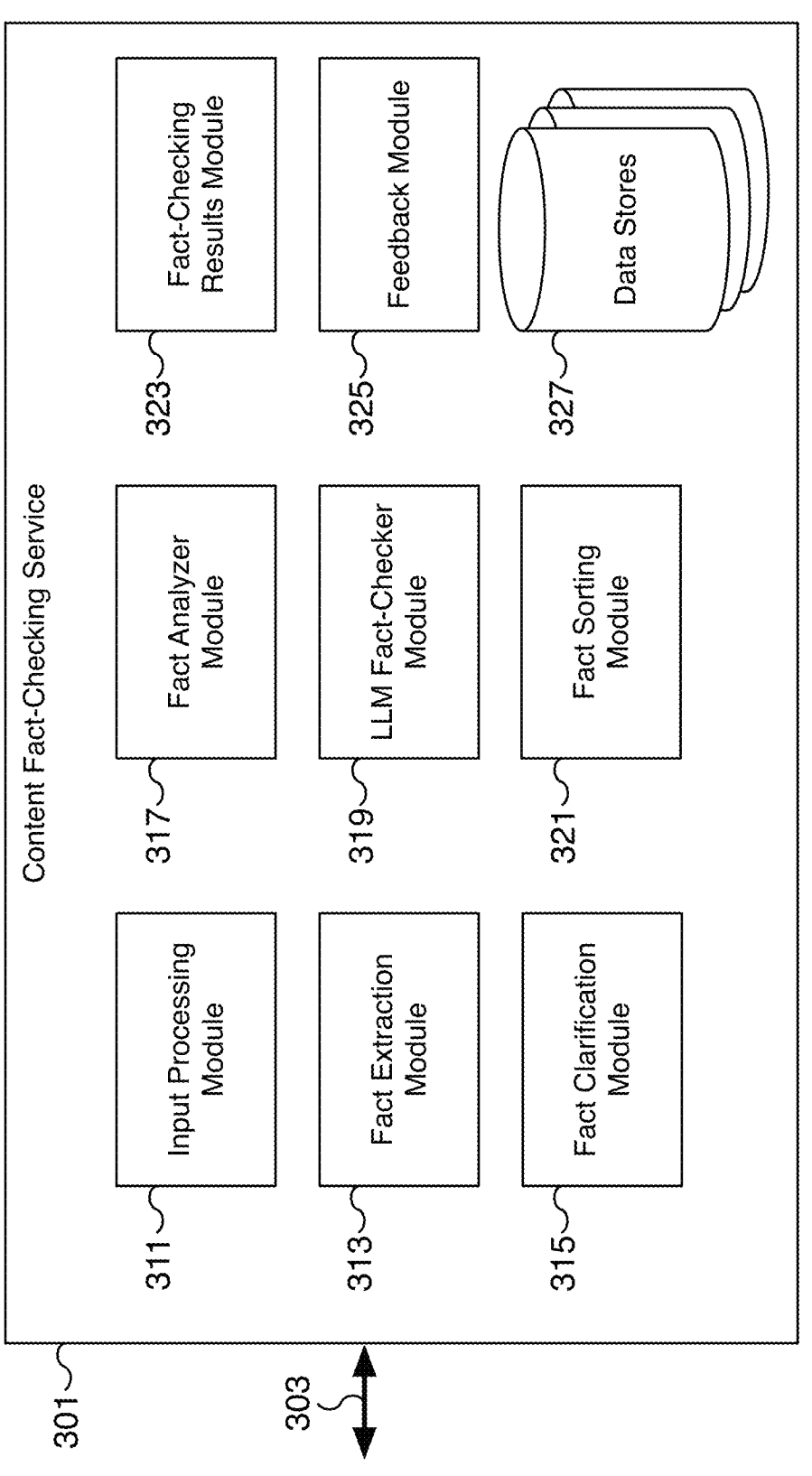
FIG. 3 is a block diagram illustrating an embodiment of a content fact-checking service.

FIG. 3 is a block diagram illustrating an embodiment of a content fact-checking service. In the example shown, content fact-checking service 301 includes network interface 303, multiple processing modules including input processing module 311, fact extraction module 313, fact clarification module 315, fact analyzer module 317, large language model (LLM) fact-checker module 319, fact sorting module 321, fact-checking results module 323, and feedback module 325, and data stores 327. In various embodiments, content fact-checking service 301 receives a content fact-checking query with provided content via network interface 303. The content is analyzed for statements that can be verified for correctness. The statements are verified for correctness, and the content fact-checking results are provided in response to the query. The content fact-checking results can include a determination on the correctness of identified statements in the content along with citations, potential or suggested revisions, and/or other details related to fact-checking the received content. In some embodiments, content fact-checking service 301 is content fact-checking service 131 of FIG. 1 and the content fact-checking query is received from a client application such as client application 201 of FIG. 2 running on a client such as client 101, 103, and/or 105 of FIG. 1.

In some embodiments, content fact-checking service 301 is a content fact-checking service that utilizes technologies such as audio transcription, contextual analysis, deep web searches, subjective searches, and integration of the available written and oral knowledge. Different search engines with different languages may be used as well. Different pictographic LLMs and the Rosetta Stone could be used to crack pre-written languages such as the Nazca Lines, cave drawings, etc. to extend written knowledge backwards. The service can extend its capabilities to tap into information at subconscious or unconscious levels through sensor inputs. Additionally, content fact-checking service 301 can also function with additional layers that perform additional fact-checking analysis on the output of large language models (LLMs), improving on the raw results from LLMs to minimize issues such as hallucinated and confabulated results.

In some embodiments, input processing module 311 is a processing module for processing input such as content provided as part of a content fact-checking query. For example, text, image, audio, video, and other forms of input can be processed by input processing module 311. In various embodiments, input processing module 311 analyzes at least video and audio content in real time, extracting and categorizing facts from written, aural, or visual outputs. Input processing module 311 can utilize advanced language processing models, contextual analysis algorithms, and a robust web search mechanism to convert input content into a format that can be analyzed. In some embodiments, audio and video content can be converted to a text-based format, such as with a large language model. For example, audio can be transcribed using speed recognition techniques, and optical character recognition can be performed on digital images including videos. As another example, an image or video can be summarized in text form, such as by using a large language vision model.

In some embodiments, input processing module 311 receives a link referencing content to be analyzed as part of a content fact-checking query. The referenced content can be text, video, multimedia, or content of other formats. Input processing module 311 can extract the referenced content, including its associated metadata. For example, for video content, both the video content and its associated metadata can be extracted for processing. In various embodiments, input processing module 311 extracts video metadata and processes the audio components of the video content to generate a transcript. The audio portion of a video can be analyzed using speech-to-text processing to create a text transcript of the content. When appropriate, the transcript can be translated to other target languages, including for maintaining language consistency within the fact-checking workflow. In various embodiments, the extracted text, enriched with video metadata for additional context, can be further processed by other processing modules such as fact extraction module 313. For example, the enriched text can be used for fact extraction, verification, and/or other processing steps.

In some embodiments, fact extraction module 313 is a processing module for extracting potential facts, statements purported to be facts, or statements meeting the candidate criteria for correctness verification. Fact extraction module 313 can receive content that has been processed by input processing module 311. In some embodiments, with respect to fact extraction module 313, the input corresponds to text, video, and audio inputs from various sources, such as live streams, recorded files, or user-generated content. Fact extraction module 313 can identify and extract factual claims from the processed input (including input in text or other formats) using one or more techniques. For example, statements that qualify for correctness verification can be identified using a large language model with a customized prompt. As another example, the statements can be identified using natural language processing techniques, such as named entity recognition, relation extraction, and semantic role labeling. In various embodiments, fact extraction module 313 can assign one or more scores such as one or more confidence scores based on the quality and reliability of the fact extraction. For example, a high confidence score can correspond to a purported fact and a low confidence score can correspond to a statement that fact extraction module 313 has difficulty categorizing. In various embodiments, the determined confidence scores can be based on the presence of qualifiers of the factual claim, such as hedging, inconsistency, or contradiction. In some embodiments, fact extraction module 313 may utilize fact clarification module 315 and/or fact analyzer module 317 for additional analysis in analyzing a purported fact.

In some embodiments, fact clarification module 315 is a processing module for processing an identified statement to clarify its role within the content. For example, an identified statement may be inconclusively a purported fact or a subjective statement, and additional processing is required to clarify its role in the provided content. Fact clarification module 315 can be utilized by fact extraction module 313 to apply additional analysis such as additional searches and/or queries such as LLM analysis queries to determine the role of a statement and a corresponding confidence score. In some embodiments, fact clarification module 315 identifies additional candidate criteria that is required for a statement to qualify for correctness verification. In some embodiments, fact clarification module 315 applies a threshold evaluation to determine whether a statement (or claim) is vague and can generate, if needed, additional prompts and queries to clarify the role of the statement or claim.

In some embodiments, fact clarification module 315 is used to perform statement or fact disambiguation including to identify ambiguous statements and to receive user feedback to resolve the identified ambiguities. For example, before a full fact-check can be performed with respect to a user query, any ambiguities are identified and resolved before continuing with a full fact-check search and evaluation. In some embodiments, the additional user feedback in response to an identified ambiguity clarifies and/or resolves the ambiguity such that the clarified statement can be verified as either true or false. For example, a query asking when a user was employed for a particular company can be initially identified as ambiguous due to the broad and open time frame. However, a user provided feedback response to limit the query to a specific time frame can disambiguate the query and allow the more narrow query to be fact checked.

In some embodiments, fact analyzer module 317 is a processing module for analyzing a fact to determine whether an identified statement is a purported fact. Fact analyzer module 317 can be called from fact extraction module 313 with extracted statements and corresponding confidence scores for correctness verification. Fact analyzer module 317 can perform a comprehensive search on data sources including online databases and other Internet resources (such as the web and third-party resources), and other databases including internal or private databases to find relevant and authoritative information that can support or refute the claims of extracted statements. In some embodiments, fact analyzer module 317 ranks and filters the information including retrieved resources based on various criteria, such as relevance, recency, bias, accuracy, and credibility, among others. For example, after performing a comprehensive search on sources to verify a statement, fact analyzer module 317 can rank and filter the resources to determine which ones are useful for analyzing correctness and how to weight each resource. In some embodiments, fact analyzer module 317 analyzes the information, such as by comparing and contrasting information from different sources, to identify any discrepancies or conflicts in an identified statement. Fact analyzer module 317 can generate a verdict or content fact-checking result for each statement or claim, indicating, for example, whether the statement is true, false, or belongs to another category such as uncertain, inconclusive, ambiguous, partly or partially true, or partly or partially false. In some embodiments, fact analyzer module 317 also determines one or more scores including one or more confidence scores. For example, fact analyzer module 317 can determine a confidence score associated with the assessed correctness of a statement. The confidence score can be determined using a machine learning model. In some embodiments, the confidence score can be based on ranking the resources identified during a search and used to support or refute the assessed correctness of a statement. Fact analyzer module 317 can further determine citations, potential revisions to the statement, and/or a summary of the supporting or refuting evidence for identified statements.

In some embodiments, large language model (LLM) fact-checker module 319 is a processing module for applying one or more LLMs to determine fact-checking results. The most powerful LLM for a particular subject or type of knowledge can be identified and used, when appropriate. For example, LLM fact-checker module 319 can utilize an LLM service for performing fact-checking analysis such as analyzing an extracted statement for correctness. LLM fact-checker module 319 can receive input from fact analyzer module 317 and query an LLM service for applying one or more specific models with the appropriate generative artificial intelligence (AI) prompts. By applying selected LLM models with the appropriate generative AI prompts, LLM fact-checker module 319 is able to identify the correctness of statements. In some embodiments, LLM fact-checker module 319 can process the results and corresponding feedback on the results to improve the fact-checking process. For example, feedback that corrects factual errors or inconsistencies that may arise from the language models can be used to retrain the models for improved factual accuracy and consistency. In some embodiments, the feedback and retraining process is managed by feedback module 325, which can collect feedback on model results for retraining and improving models. In some embodiments, the analysis results of LLM fact-checker module 319 can further identify potential biases, such as biases in resources or origin, such as knowledge generated from a particular country or language. For example, Simplified Chinese may be used by websites with origins tied to both Singapore and China, but the different websites may reflect different values and can be differentiated by properties such as IP address.

In some embodiments, fact sorting module 321 is a processing module for sorting fact-checking results such as initial and/or intermediate fact-checking results of fact analyzer module 317 and/or LLM fact-checker module 319. For example, fact sorting module 321 can receive initial and/or intermediate fact-checking results such as fact-checking verdicts and corresponding evidence from fact analyzer module 317. Fact sorting module 321 can organize and categorize statements and/or claims and the associated evidence and/or resources into a structured and user-friendly format, such as a table, a graph, or a timeline. In some embodiments, fact sorting module 321 highlights the most important, relevant, and/or interesting portion of the results such as including portions of the statement facts and/or evidence. Fact sorting module 321 can provide links to the original sources for further reference such as by providing citations with hyperlinks to online resources. In some embodiments, fact sorting module 321 further integrates the feedback from the users and/or from different platforms, such as ratings, comments, notes, and/or corrections, to update and improve the fact-checking results over time. For example, fact sorting module 321 can provide feedback to feedback module 325 for improving the LLM models used for fact-checking analysis.

In some embodiments, fact-checking results module 323 is a processing module for processing results of the content fact-checking process for a client. For example, fact-checking results module 323 can integrate proposed revisions and citations as part of a fact-checking result. Depending on the use case, different clients may require citations or a listing of resources in a particular format, and fact-checking results module 323 can prepare the results using the desired format. Similarly, some clients may require proposed revisions or other options related to fact-checking such as different granularities of verification. Fact-checking results module 323 can prepare the results for the client based on the client preferences, the type of results determined during the fact-checking process, and/or other properties. As another example, different clients may request that the results are mapped to different verification result categories. Some clients may require answers as either true or false while others may require answers as one of: true, false, or inconclusive. Still others may allow five or more categories such as true, partly true, ambiguous, inconclusive, partly false, and false.

In some embodiments, feedback module 325 is a processing module for managing feedback from the content fact-checking process. The managed feedback can be used for retraining models used for content fact-checking. For example, feedback can be used to improve the fact identification and analysis steps. In some embodiments, the data tracked by feedback module 325 includes the provided content, fact-checking results, and user or system provided feedback on the fact-checking results. By incorporating feedback module 325, the accuracy of the content fact-checking results can improve over time.

In some embodiments, data stores 327 are one or more data stores used by content fact-checking service 301 and its modules. For example, data stores 327 can include a data store for storing different generative artificial intelligence (AI) prompts for querying different deep learning models such as different large language models. In some embodiments, data stores 327 include a database of facts or verified correct statements such as a cached store of statements previously analyzed and verified as correct. The verified statements database can be a vector database to allow for high performing equivalence or similarity calculations to match the cached statements with other similar statements. In some embodiments, data stores 327 can include a misinformation data store for tracking known falsehoods such as scams, hoaxes, and other forms of incorrect information or misinformation. Data stores 327 can further include one or more ranking stores for ranking sources by different metrics such as accuracy, consistency, bias, country, audience, etc. Other tracked and stored metrics can include political leaning, endorsements, purpose, intention, reputation, credibility, transparency, currency, peer review, reliability, and/or objectivity. For example, if Alan Turing tends to err on the side of under-statement when talking about his accomplishments but Elon Musk tends to err on the side of over-statement when talking about causality, then the disclosed system will remember who tends to be under-stated vs who tends to be hyperbolic. This applies to non-human sources such as artificial intelligence (AI) agents and models as well. For example, if one AI source (e.g., ChatGPT) tends to sound overconfident but another AI source (e.g., Claude) is more epistemologically modest, the disclosed system will assign each a rating accordingly. Additionally, if a speaker tends to be directionally correct but specifically wrong, for example when talking about the guinea worm's confinement in Africa, then the disclosed system will assign an appropriate sincerity score. If a speaker apologizes for their mistakes publicly, this will also reflect on their sincerity score but if instead they try to defend themselves in court or even sue someone to cover up for their factual mistakes, the disclosed system will deem them as insincere. In some embodiments, some of the criteria are tracked as a single metric and/or additional criteria are stored in data stores 327. In some embodiments, data stores 327 are used to store model data including training data, feedback, and model weights.

Although not shown in FIG. 3, in some embodiments, content fact-checking service 301 can incorporate sensor data such as via sensor integration. For example, a sensor integration module may exist that receives and integrates sensor inputs from various sources including sensor-enabled devices, such as wearable gadgets, biometric scanners, and/ or brain-computer interfaces, among other sensor-enabled devices. The sensor input may include sensor data corresponding to contactless physiological and biometric data, including deception cues from audio or visual data. In various embodiments, a sensor integration module can analyze the received sensor data to infer information of users and/or sources, such as emotions, intentions, preferences, or biases. The inferred information can include both subconscious or unconscious information. In various embodiments, the information is used to enhance the fact-checking process, such as by adjusting the confidence scores, providing personalized recommendations, and/or detecting and/or correcting biases. For example, if a user wants to know which area of their knowledge might be biased, they can opt in to seeing how their physiological or emotional reactions below the level of their full consciousness may be influencing how they process objective facts.

In some embodiments, content fact-checking service 301 may include additional or fewer modules. For example, one or more of the modules shown in FIG. 3 may be integrated into a single or merged module. In some embodiments, additional modules not shown may exist, such as the above-described sensor integration module. Similarly, a described module may be implemented by two or more separate modules. Moreover, the modules shown in FIG. 3 may be further replicated and/or distributed across one or more computer servers. For example, in some embodiments, content fact-checking service 301 may be implemented by multiple different computer systems each with one or more instances of the modules shown in FIG. 3.

Figure 4:
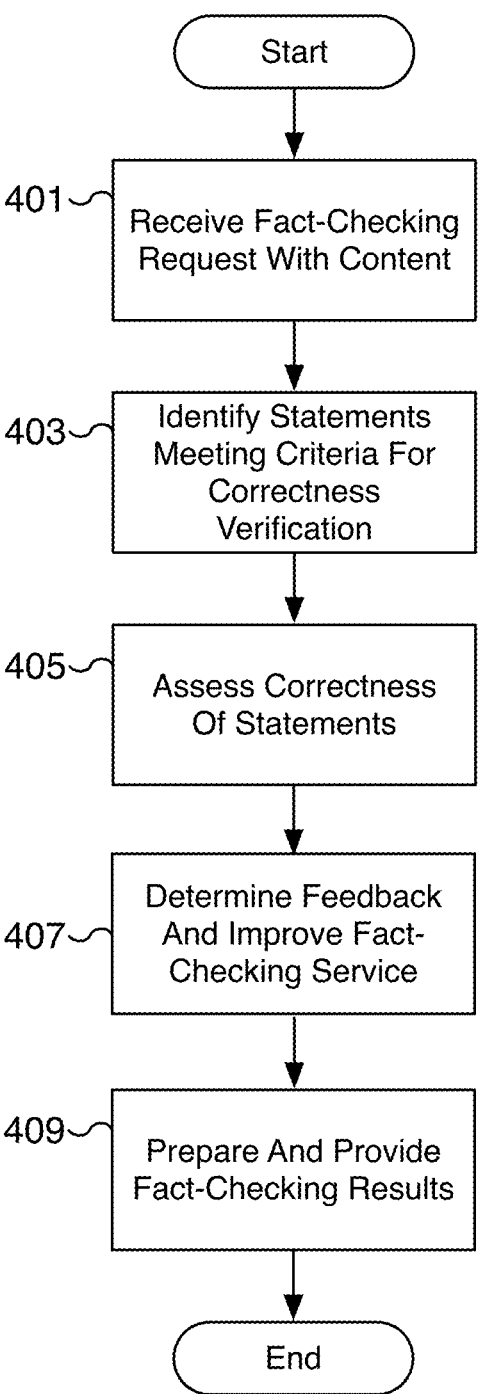
FIG. 4 is a flow chart illustrating an embodiment of a process for performing content fact-checking.

FIG. 4 is a flow chart illustrating an embodiment of a process for performing content fact-checking. For example, using the process of FIG. 4, a content fact-checking service can respond to received content and an associated fact-checking query with fact-checking results. The received content is analyzed to identify statements that require correctness verification. The identified statements are then analyzed for correctness and the results returned to the requesting client. In some embodiments, the process of FIG. 4 is performed by a content fact-checking service such as content fact-checking service 131 of FIG. 1 and/or content fact-checking service 301 of FIG. 3. In some embodiments, the received content and an associated fact-checking query are provided by a client application such as client application 201 of FIG. 2 running on a client such as client 101, 103, and/or 105 of FIG. 1.

At 401, a fact-checking request with content is received. For example, a fact-checking query is received with the content to be fact-checked. The query information included in the request and/or the type of query can describe the type and extent of the type of fact-checking requested. In various embodiments, the content received can include multimedia content such as text, images, audio, video, photos, and/or digital documents or media such as slideshows, eBooks, PDFs, etc., among other forms of content. In some embodiments, the format of the expected results to the request can be determined by the request or query request. For example, a query may request a simple correctness determination or may request that additional details such as resources examined, citations, and proposed revisions be included in the returned results. Similarly, in some embodiments, users can customize search parameters based on specific needs, such as focusing on certain types of sources and/or the depth of search. In some embodiments, the content is encoded and/or encrypted during transport and/or the sender client can be anonymized. In some embodiments, the request and associated content can include request parameters identifying that the included data can be used for further training or that the included data should not be used for training.

At 403, statements meeting criteria for correctness verification are identified. For example, the content received is analyzed to identify statements that are purported facts or claims. The statements can be identified by determining whether each statement meets one or more candidate criteria for correctness verification. In various embodiments, the identification process is performed by applying one or more large language models to identify statements that are candidates for correctness verification. Depending on the difficulty in identifying statements that meet the candidate criteria, different models can be utilized including more comprehensive and computationally expensive models along with different generative artificial intelligence (AI) prompts. In some embodiments, the statements are identified by contextual analysis to extract atomic facts and less atomic claims from the claims classified as factual and by considering the broader context provided by the full content.

In some embodiments, an additional processing layer or plugin can be applied after the output results created by LLMs. For example, an additional hidden layer can mediate what generative AI more broadly creates before passing the results downstream. Additionally, in various embodiments, natural language processing (NLP) models are employed to identify the statements from within the content. For example, NLP models can be used to transcribe content and semantic analysis can be applied to identify and categorize factual and non-factual claims.

In the event the content may be difficult to parse, advanced signal processing algorithms can be applied to handle diverse audio and video formats and to ensure high-quality transcription. Moreover, a disambiguation step can be performed to check and clarify whether the content received meets the criteria to be verified for correctness and/or whether additional generative AI prompts are needed to clarify the content. For example, the content can be processed for more refined results and/or additional input can be requested from the content provider to help remove ambiguities from the content.

In some embodiments, the initial identified statements are found to be ambiguous. For example, preprocessing of statements within the content and/or query can result in identifying one or more ambiguities. At 403, the identified ambiguities can be identified and resolved, including by prompting for one or more user feedback responses. For example, user feedback responses can be received that clarify or disambiguate an identified ambiguity. In various embodiments, an identified ambiguity must be resolved prior to performing a full and extensive fact check on an associated statement purported to be a fact. In some embodiments, the additional user feedback in response to an identified ambiguity clarifies and/or resolves the ambiguity such that the clarified statement can be verified as either true or false. For example, a query asking when a user was employed for a particular company can be initially identified as ambiguous due to the broad and open time frame. However, a user provided feedback response to limit the query to a specific time frame can disambiguate the query and allow the more narrow query to be fact checked.

At 405, the correctness of statements is assessed. For example, the statements identified at 403 that meet the criteria for correctness verification are assessed for correctness. In various embodiments, a comprehensive search is performed for resources to analyze and validate the correctness of each identified statement. For example, one or more searches can be performed to identify relevant resources including by performing a web search, performing internal and/or external database searches, performing online and/or offline resource searches, and identifying existing similar statements that have already been verified. The search can include a scan of a wide array of resources, including news archives, almanacs, social media platforms, library archives, academic journals, and specialized databases. Some resources such as a private social media site may only be semi-accessible to the public.

Based on the identified resources, the statement is analyzed for correctness. In some embodiments, the correctness verification process includes categorizing the statement into one of a set of correctness categories. The number of available categories may be correctness configurable, for example, including using two categories (e.g., true or false), five or more categories (e.g., true, partly true, inconclusive, partly false, and false), or another number of categories. In some embodiments, the resources are ranked, and the analysis incorporates the rankings to determine the fact-checking result. In some embodiments, the resources are used to validate the atomic facts and less atomic claims of the statement.

At 407, feedback is determined, and the fact-checking service is improved. For example, feedback can be gathered based on the content and corresponding fact-checking results including identified statements, resources, and/or proposed revisions, if available. The feedback can be used for subsequent improvement of the fact-checking service including by retraining the model weights for the applied deep learning models. In some embodiments, the feedback includes user feedback provided by the requesting client. In various embodiments, the feedback can result in modifications to the quality and performance of the content fact-checking service, changes to the user interface, increased functionality, and/or modification to the configuration settings of the content fact-checking service.

At 409, fact-checking results are prepared and provided. For example, the results from fact-checking are prepared into a format usable for the requesting client and are provided as fact-checking results to the client. In some embodiments, the fact-checking results may include additional information in addition to correctness categories such as confidence scores, detailed descriptions on how the correctness results were reached, and/or a summary of the fact-checking results. In some embodiments, the fact-checking results can include suggested revisions, for example, to clarify or replace an identified statement that is determined to be partly false, partly true, ambiguous, or inconclusive. In some embodiments, the revisions include citations to resources used to support factual claims made by the revisions. In various embodiments, different clients can receive different fact-checking results based on the configuration of the client and the specific content fact-checking query parameters.

Figure 5:
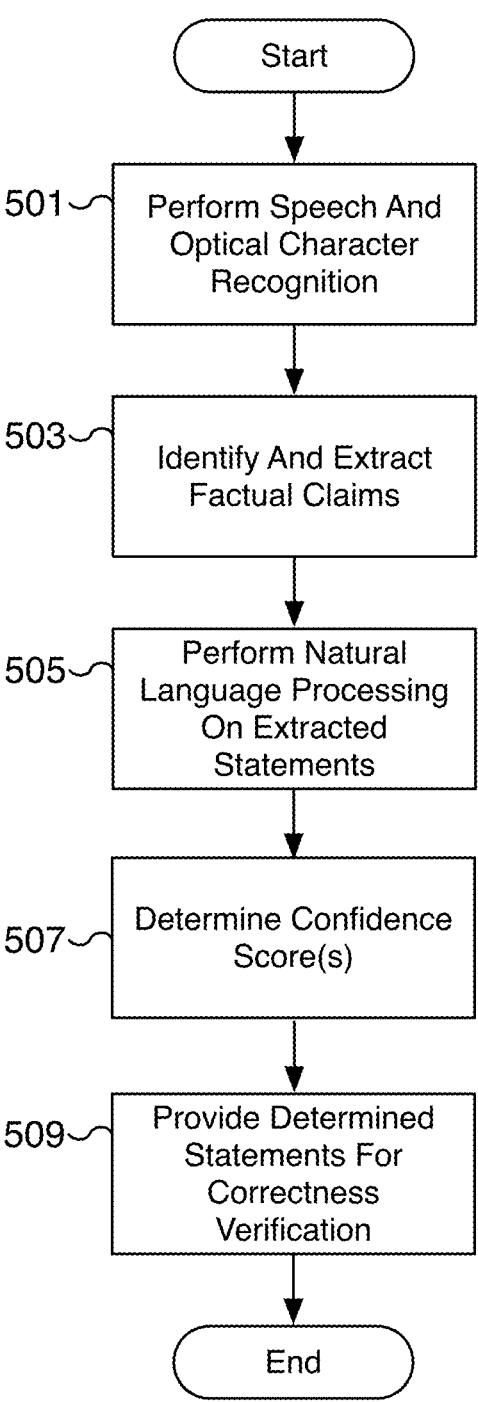
FIG. 5 is a flow chart illustrating an embodiment of a process for identifying statements within content for correctness verification.

FIG. 5 is a flow chart illustrating an embodiment of a process for identifying statements within content for correctness verification. For example, using the process of FIG. 5, a content fact-checking service can identify the statements within a content source that meet one or more candidate criteria for correctness verification. In some embodiments, the process of FIG. 5 is performed at 401 and/or 403 of FIG. 4 by a content fact-checking service such as content fact-checking service 131 of FIG. 1 and/or content fact-checking service 301 of FIG. 3. In some embodiments, the content fact-checking service utilizes one or more modules of the content fact-checking service to implement the process of FIG. 5 such as input processing module 311 of FIG. 3, fact extraction module 313 of FIG. 3, and/or fact clarification module 315 of FIG. 3.

At 501, speech and optical character recognition are performed. For example, the received content may be transformed by applying speech and/or optical character recognition. In some embodiments, non-text content may be first converted or mapped to text-based content such as by applying speech recognition, optical character recognition, or other similar techniques. The transcribed content, a description of the content, and/or a summary of the content may be used as an alternative to the original content or to supplement the original content. In some embodiments, content, such as images, video, and/or audio content, is directly analyzed using deep learning models without additional transcription. Alternatively, a transcription, description, and/or summary of the content can be used either as an alternative or in addition to the original content.

At 503, factual claims are identified and extracted. For example, the content is analyzed to identify and extract factual claims or statements that purport to be facts. In various embodiments, the content is analyzed to determine whether a statement within the content meets one or more candidate criteria for correctness verification. The process can be performed using a deep learning model such as a large language model with the appropriate generative AI prompt. In various embodiments, different models are applied depending on the content. For example, for scientific content such as medical content, a particular model may be applied. As another example, for historical content, a different model may be applied. Although deep learning techniques can be utilized, other appropriate techniques, such as natural language processing, can be applied as well or utilized in addition to deep learning approaches.

At 505, natural language processing is performed on extracted statements. For example, natural language processing techniques can be applied to refine the identification and extraction results from step 503. Using natural language processing techniques, such as named entity recognition, relation extraction, and semantic role labeling, the statements identified and extracted at 503 can be verified and/or the quality of the identification and extraction performed at 503 can be improved. As an alternative to refining the results from step 503, in some embodiments, the content is analyzed using natural language processing to identify and extract statements for correctness verification and the results are compared to the results from step 503.

At 507, confidence score(s) are determined. For example, one or more confidence scores are determined for the statements identified and extracted at 503 and/or 505. A confidence score can correspond to the confidence that an identified and extracted statement is a purported fact that warrants correctness verification. The confidence score can be based on the resources relied upon in the content, the context of the content, and/or the subject domain of the content, among other factors. In various embodiments, the confidence score(s) can be further based on the quality and reliability of the source content, the context and coherence of the statement, and/or the presence of any qualifiers within the content or identified statement, such as qualifiers demonstrating hedging, inconsistency, or contradiction.

At 509, the determined statements are provided for correctness verification. For example, once the statements meeting the criteria for correctness verification are identified and extracted, the statements are provided for correctness verification. In some embodiments, the statements are provided along with their context, such as the surrounding text or other media, the source of the content, and authors of the content, etc. In some embodiments, the confidence scores are also provided to the correctness verification process.

Figure 6:
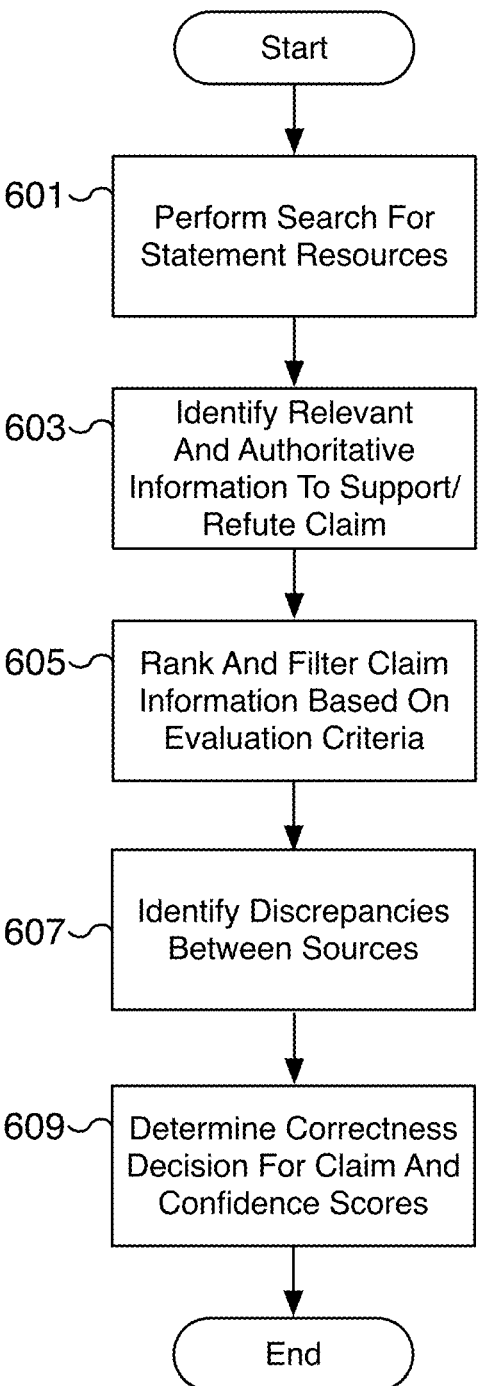
FIG. 6 is a flow chart illustrating an embodiment of a process for verifying the correctness of a statement.

FIG. 6 is a flow chart illustrating an embodiment of a process for verifying the correctness of a statement. For example, using the process of FIG. 6, a content fact-checking service can perform fact-checking on a statement to verify its correctness. In various embodiments, a purported factual statement is extracted from content and analyzed to determine whether the purported facts are accurate. Depending on the result, the statement's correctness can be categorized into one of a set of correctness categories. Example categories include true, false, partly true, partly false, and inconclusive. Other categories and number of categories are appropriate as well. In some embodiments, the process of FIG. 6 is performed at 405 of FIG. 4 by a content fact-checking service such as content fact-checking service 131 of FIG. 1 and/or content fact-checking service 301 of FIG. 3. In some embodiments, the content fact-checking service utilizes one or more modules of the content fact-checking service to implement the process of FIG. 6 such as fact analyzer module 317 of FIG. 3, large language model (LLM) fact-checker module 319 of FIG. 3, and/or fact sorting module 321 of FIG. 3.

At 601, a search is performed for statement resources. For example, one or more searches are performed as part of a comprehensive search to identify relevant resources for correctness verification. The search can include performing a web search, an internal and/or external database search, an online and/or offline resource search, and/or identifying existing similar statements that have already been verified. In various embodiments, the search includes a scan of a wide array of resources, including news archives, almanacs, social media platforms, library archives, academic journals, and specialized databases. Some resources such as a private social media site that may only be semi-accessible to the public are also searched. In some embodiments, a database of existing statements and corresponding statement correctness verification results is similarly searched. For example, a vector database used to cache past content fact-checking results can be used to retrieve previous results for similar statements.

At 603, relevant and authoritative information is identified to support or refute the claim. For example, each of the resources identified at 601 are analyzed and may be used to support or refute a claim made by the identified statement. In some embodiments, each resource is analyzed using a large language or deep learning model. For example, depending on the type of content, the statement and its context, and/or an identified resource, a specific deep learning model may be used to analyze the correctness of the statement based on the resource. In some embodiments, the model used may also depend on a resource or computation budget, and different generative AI prompts may be used to refine the analysis results. In the event an initial model result is inconclusive or vague, additional analysis can be performed including using a refined prompt and/or a different model.

In some embodiments, a generative AI prompt used for a language model provides the appropriate context, directions, and restrictions for performing the analysis. The prompt can specify the role of the language model, such as to research and analyze resources to evaluate the correctness of a statement. Additionally, the prompt can require that citations within the resource are cited and/or referenced in the provided results. In some embodiments, the prompt can require a summary of the results and/or an explanation of the analysis. Additionally, the prompt can provide criteria for analyzing the statement such as factors including accuracy, relevance, consistency, bias, country, audience, recency, and credibility, among others. In various embodiments, the prompt may perform one or more tasks related to fact-checking in a single step.

At 605, claim information is ranked based on evaluation criteria. For example, the claim information, related resources, and analysis results can be ranked based on evaluation criteria. In some embodiments, the resources identified during the search performed at 601 are tracked in a database and ranked based on evaluation criteria such as accuracy, authority, consistency, currency, and bias, among other factors. In some embodiments, the resources may be further classified as primary, secondary, and tertiary sources. For example, a resource that is classified as a non-primary source, such as a secondary or tertiary source, may not be used alone (or without a primary resource) to verify the correctness of a statement. In various embodiments, the results of the analysis performed at 603, including resource information and information related to the claim based on the identified resources, are augmented by ranking the information.

In some embodiments, the ranking can be performed using one or more language models and corresponding generative AI prompts. For example, a language model can be provided with existing resource ranking information including whether a resource is a primary or another category of resource. The prompt provided to the model can further require that the correctness analysis utilizes the provided ranking information and to rank the different resources against one another using the provided ranking information. In some embodiments, the prompt can further require that the model generate a summary and/or explanation of the analysis and the impact of the provided ranking information.

At 607, discrepancies between sources are identified. For example, in the event different resources are used to reach different correctness results, such as when two resources conflict with one another, the discrepancies between the resources are identified. In various embodiments, the identified discrepancies are justified by citations to their respective resources. In some embodiments, the evaluations of a resource are included in the discrepancy results, such as the biases of a resource, its currency, and its credibility, among other factors. In the event insufficient evidence is available, the discrepancy results can indicate insufficient evidence as a reason for the discrepancies along with an explanation on what areas lacked sufficient information.

At 609, a correctness decision and confidence scores are determined for the claim. For example, based on the analysis performed at 603, 605, and 607, a correctness decision is determined for the statement. In some embodiments, the correctness verification process includes categorizing the statement into one of a set of correctness categories. The number of available categories for correctness may be configurable, for example, a configuration or query can use two categories (e.g., true or false), five or more categories (e.g., true, partly true, inconclusive, partly false, and false), or another number of categories. Additionally, one or more confidence scores are determined for the correctness verification results. For example, an overall confidence score can be determined for the correctness determination. Additionally, other confidence scores can be determined such as the currency of the determination, the potential bias of the determination, and the expected audience of the determination, among others. In some embodiments, confidence scores can be determined using a machine learning model and/or can be based on ranking the resources identified during a search and used to support or refute the assessed correctness of a statement or claim. In some embodiments, the correctness determination includes an explanation or summary of the analysis results. For example, a language model can be prompted to provide a conclusive correctness decision along with a summary of the analysis and/or a detailed conclusion explaining the reasoning with supporting evidence and citations. The results can further identify resources that are in agreement and those that are in disagreement. In the event the correctness decision is categorized as inconclusive, the decision can include an explanation on why the results were inconclusive and what areas lacked sufficient evidence.

Figure 7:
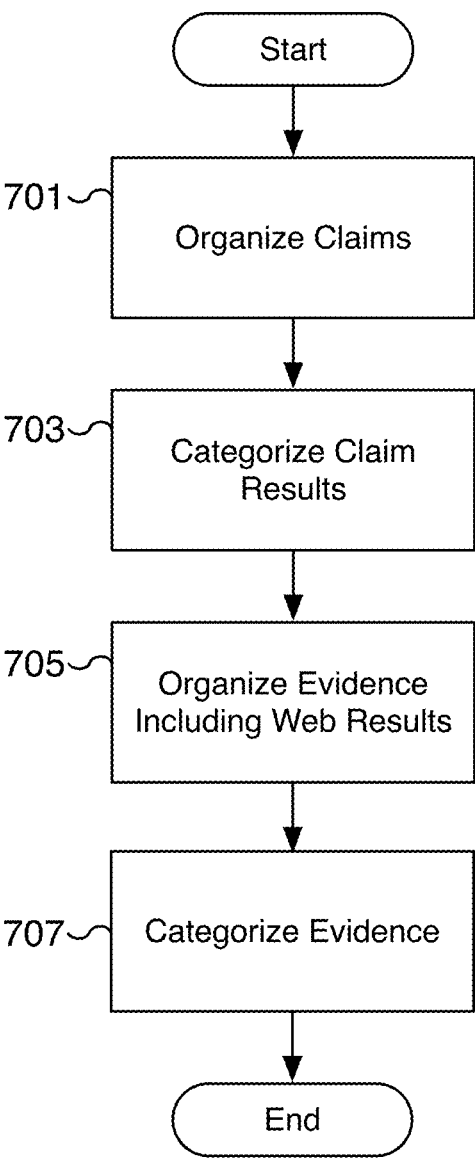
FIG. 7 is a flow chart illustrating an embodiment of a process for sorting fact-checking analysis results for a statement.

FIG. 7 is a flow chart illustrating an embodiment of a process for sorting fact-checking analysis results for a statement. For example, using the process of FIG. 7, interim content fact-checking results based on different resources can be organized and categorized. In various embodiments, the organization is performed based on the evaluated resources and may include citations to the resources. In some embodiments, the process of FIG. 7 is performed at 405 of FIG. 4 and/or at 605 of FIG. 6 by a content fact-checking service such as content fact-checking service 131 of FIG. 1 and/or content fact-checking service 301 of FIG. 3. In some embodiments, the content fact-checking service utilizes one or more modules of the content fact-checking service to implement the process of FIG. 7 such as fact sorting module 321 of FIG. 3.

At 701, claims are organized. For example, claims made within a statement are organized. In some embodiments, a single statement may include multiple purported factual claims, and the claims may have dependencies between one another. At 701, the identified claims within a statement are organized including by dependency or relationship. Once organized, the claims can be individually and/or collectively evaluated. For example, a claim can be evaluated on its own and/or within the context of other claims of the statement.

At 703, claim results are categorized. For example, each purported factual claim made in a statement is assigned a correctness verification category. In various embodiments, each claim can be assigned a correctness category such as true, false, partly true, partly false, or inconclusive. Other categories and the number of categories can be utilized and configured for a particular content fact-checking request. In some embodiments, the categorization is performed by a language model such as a large language model with the appropriate generative AI prompt. In some embodiments, the organization performed includes organizing the formatting and presentation of the claim results. For example, the claim results and corresponding references, citations, and/or evidence can be organized into structured and/or user-friendly formats, such as tables, graphs, and/or timelines.

At 705, evidence including web results is organized. For example, the resources and relevant citations used as evidence for the categorization results determined at 703 are organized. In some embodiments, the evidence corresponds to different identified resources and the resources are ranked by one or more factors. For example, factors for ranking a resource can include whether the resource is a primary resource as well as evaluation criteria of the resource such as accuracy, relevance, consistency, bias, country, audience, recency, and credibility factors, among other factors. Additionally, relationships between the evidence and resources can be determined, such as which resources are dependent on and/or cite to one another.

At 707, evidence is categorized. For example, the evidence organized at 705 is categorized including by application to the content fact-checking results. In some embodiments, the evidence is categorized based on factors with respect to how the evidence is used to support and/or explain the correctness verification results of a statement and/or the claims of a statement. For example, the factors used to evaluate a resource are then used to evaluate the resource as applied to the correctness verification. In some embodiments, based on the application of a resource to a correctness verification determination, the evidence can be categorized as a primary, secondary, or another ordered-type of reference. Other categories are appropriate as well such as by accuracy, relevance, consistency, bias, country, audience, recency, and credibility, among others. In some embodiments, the organization performed includes organizing the formatting and presentation of the evidence. For example, the evidence and corresponding claims can be organized into structured and/or user-friendly formats, such as tables, graphs, and/or timelines.

Figure 8:
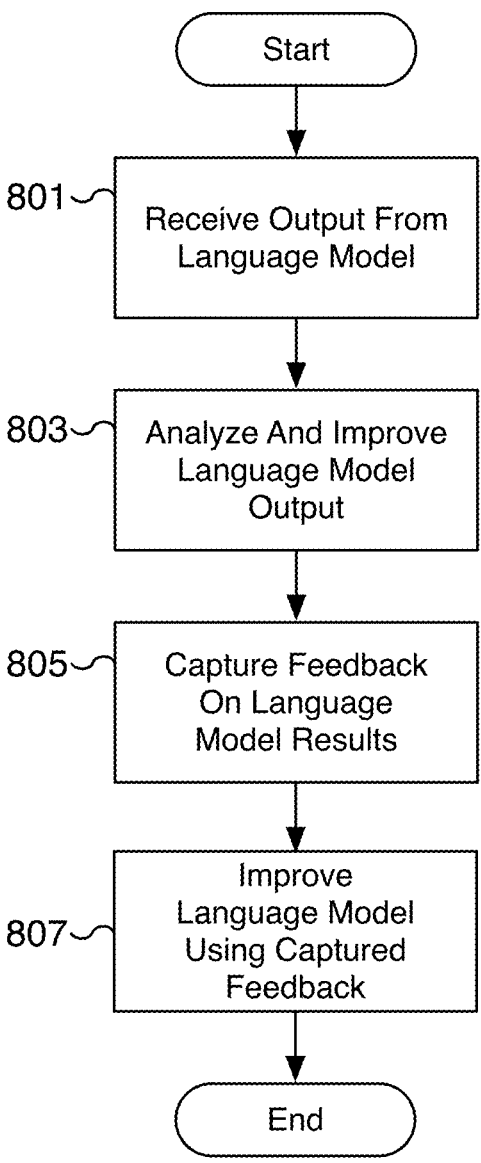
FIG. 8 is a flow chart illustrating an embodiment of a process for capturing and applying feedback for a content fact-checking service.

FIG. 8 is a flow chart illustrating an embodiment of a process for capturing and applying feedback for a content fact-checking service. For example, using the process of FIG. 8, feedback on content fact-checking results is gathered and used to improve the accuracy and/or performance of the content fact-checking service. In various embodiments, the improvements can include retraining the underlying models used for performing content fact-checking tasks, such as identifying statements within content that meet the candidate criteria for correctness verification, performing the correctness verification of an identified statement, and generating of proposed revisions for statements determined to be incorrect, ambiguous, or inconclusive. In some embodiments, the process of FIG. 8 is performed at 407 of FIG. 4 by a content fact-checking service such as content fact-checking service 131 of FIG. 1 and/or content fact-checking service 301 of FIG. 3. In some embodiments, the content fact-checking service utilizes one or more modules of the content fact-checking service to implement the process of FIG. 8 such as feedback module 325 of FIG. 3.

At 801, output from a language model is received. For example, the output results of a language model such as a large language model are collected. The results can include predicted correctness verification results such as a correctness category for a statement or claim and/or corresponding confidence scores. In some embodiments, the results include the results from identifying statements within content for correctness verification and generated revisions for statements. In various embodiments, the received output is collected and can include output from different stages of the content fact-checking process as well as a final output result such as a correctness verification decision.

At 803, the language model output is analyzed and improved. For example, the language model output is analyzed to identify areas for improvement such as by identifying inconsistencies, hallucinations, and/or performance errors, among other analysis results. In some embodiments, the output is analyzed in comparison to other predicted results including past results. In various embodiments, the output can be improved where appropriate. For example, vague or inconsistent results can be improved such as by applying additional analysis including using a different language module such as a larger model trained on more parameters or with a different training dataset. The output results can be further improved based on new information, such as newly identified resources. In various embodiments, the improved results are collected and used to differentiate initial results.

At 805, feedback on the language model results is captured. For example, feedback including user feedback on results is collected and captured. In some embodiments, the user feedback is client provided feedback such as feedback collected via a user client enabled to support a content fact-checking service. The user feedback can also include human feedback collected out-of-band by analyzing the language model results. In some embodiments, the feedback is machine generated feedback that is predicted based on a trained feedback model. In various embodiments, the feedback can provide information on the accuracy and performance of a language model.

At 807, the learning model is improved using the captured feedback. For example, using the feedback captured at 805, training data for a language model is created and used to retrain the language model. In various embodiments, the training data includes the initial output received at 801 and/or the improved language model results generated at 803. In some embodiments, the training is performed at different intervals and may be based on the expected improvement to be gained by retraining a model. In various embodiments, the language model can be improved by applying a second or another model layer after the initial language model that improved the output of the initial language model. The additional layer can be trained using the captured feedback. In some embodiments, the feedback and related output data are used to implement reinforcement learning including reinforcement learning from human feedback (RLHF). In various embodiments, the improvement process is performed regularly including via regular updates to database and models based on new information and user feedback.

Figure 9:
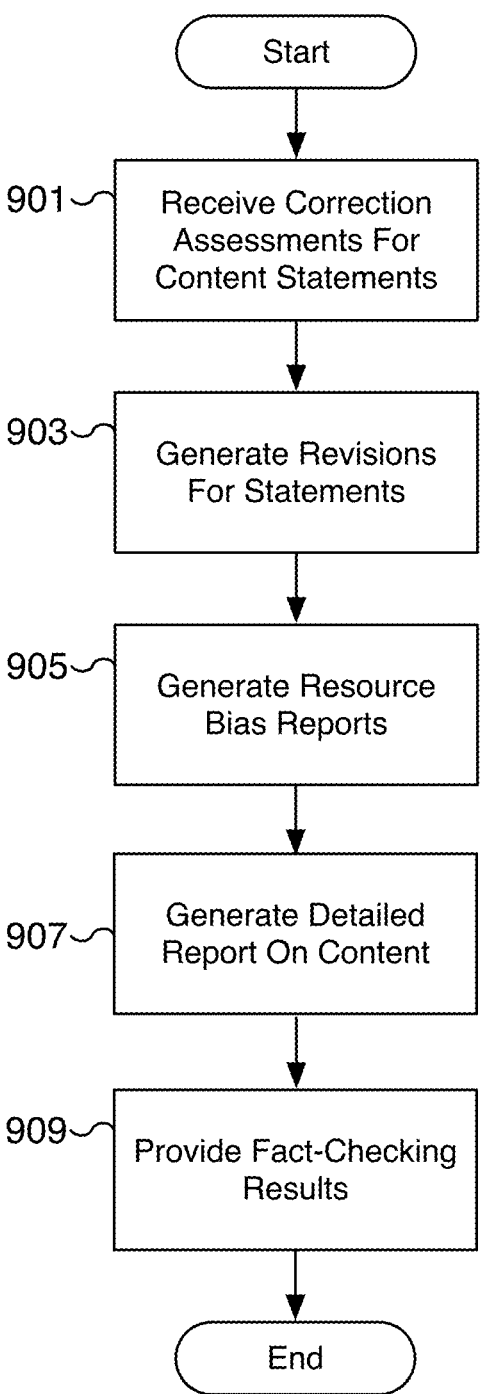
FIG. 9 is a flow chart illustrating an embodiment of a process for providing content fact-checking results for a content fact-checking service.

FIG. 9 is a flow chart illustrating an embodiment of a process for providing content fact-checking results for a content fact-checking service. For example, using the process of FIG. 9, correctness verification results for each statement of a content can be provided to a client in response to a content fact-checking request. The specific content fact-checking results can be dependent on the client including the capabilities of the client and the parameters of the client request. For example, a detailed content fact-checking request can include proposed revisions to purported statements of fact found incorrect along with citations supporting the different revisions and an analysis of how each revision addresses inaccuracies in the original statement. In contrast, another content fact-checking request can request a more simplified response such as a true or false response to whether a statement is correct. The example of FIG. 9 is one format of content fact-checking results. In some embodiments, the process of FIG. 9 is performed at 409 of FIG. 4 by a content fact-checking service such as content fact-checking service 131 of FIG. 1 and/or content fact-checking service 301 of FIG. 3. In some embodiments, the content fact-checking service utilizes one or more modules of the content fact-checking service to implement the process of FIG. 9 such as fact-checking results module 323 of FIG. 3.

At 901, correction assessments for content statements are received. For example, correction assessments such as determined correction categories for statements identified with the content are received. In various embodiments, the correction assessments are provided only for statements within the content that were identified as meeting the candidate criteria for correctness verification. Example categories can include true, partly or partially true, inconclusive, partly or partially false, and false. Other categories can be appropriate as well.

At 903, revisions for statements are generated. For example, one or more revisions for identified statements are generated. The revision can be generated for any type of statement including true statements. For example, a revision that is clearer and/or more concise can be generated for a statement that is true. Similarly, revisions can be generated for partly true, false, inconclusive, or other types of statements. The generated revision can remove ambiguity, remove any inconsistent or false claims, and/or provide a clear and concise true statement as an alternative to an existing statement. In some embodiments, the revisions are generated using a large language model (LLM) including by providing the appropriate context to the LLM such as the statement, the resources that support and/or refute the statement, and a prompt to generate a revision that meets the required goals of the user, and other context and guidelines. In various embodiments, the generated revisions can include citations to resources to support the accuracy of the revision and/or a summary and/or explanation of the revision and how it relates to the original statement.

At 905, resource bias reports are generated. For example, resource bias reports are generated for the content and/or for statements within the content. The type of resource bias reports generated can depend on the type of resources identified, configuration settings, and or query parameters, among other factors. In some embodiments, the resource bias reports cover political bias and can utilize third-party databases and/or reputation scores for mapping the potential bias of a resource. In some embodiments, the resource bias reports are further based on the origin country and/or audience of the resource. Other factors can be used when generating a bias report, such as author reputation, date of publication, references cited within the resource, etc. In various embodiments, the resource bias reports can be optional, and the level of detail included in the report can be configurable. In some embodiments, the bias reports are generated based on presentation and/or formatting parameters. For example, the bias reports can include graphics or visualizations including graphs and/or tables or other visual presentation elements. For example, a bias report can include a visualization of the different resources identified by the content fact-checking search results that are used to assess the correctness of a statement. In various embodiments, the size, color scheme, and other parameters of the generated structured report can be configured.

In some embodiments, the generated resource bias reports can include multiple different dimensions in addition to quality and/or political bias dimensions. For example, an additional language dimension can be added to a resource bias report along with quality and bias dimensions. Other dimensions can be added as desired and can provide additional and valuable insight into the analyzed content. For example, a top-down ideological dimension can be included in a generated bias report, such as to supplement a left-right ideological axis. In some embodiments, an ideological dimension describes the content along an ideological continuum corresponding to the degree of state intervention. For example, an ideological dimension can include values corresponding to totalitarianism, authoritarianism, semi-authoritarianism, corporatism, centrism in liberal democracy, and libertarianism. Other ideological values or states may be appropriate as well. As another example, an additional dimension (or axis) can describe the analyzed content along a continuum corresponding to far-fetched vs. far-sighted crazed-delusional-contrarian-to never bet against scale. Related to the earlier disclosed truth coin metric, people or sources can also receive extra rewards, such as for contrarian predictions. For example, sources of contrarian predictions, such as a predicted ridesharing and transportation platform and the effectiveness and feasibility of a four-hour work week, can be rewarded extra rewards when their contrarian predictions become reality. This approach rewards members of the futurist community when predictions are correct, sending a positive signal for information that enriches society, helps overturn Sturgeon's law, and/or creates helpful content that is ahead of its time.

At 907, a detailed report on the content is generated. For example, a detailed report describing the fact-checking results can be generated. In some embodiments, the included depth and detail can be configured. For example, for a mobile application in a read-only context, less detail may be generated in the detailed report than for a desktop application designed for drafting research and/or academic papers. In some embodiments, the detailed report includes an explanation or summary of the analysis results. For example, a language model can be prompted to provide a summary of the analysis used to reach a correctness decision and/or a detailed conclusion explaining the reasoning with supporting evidence and citations. The detailed report can further identify resources that are in agreement and those that are in disagreement. For statements that are inconclusive, the detailed report can include an explanation on why the results were inconclusive, what areas lacked sufficient evidence, and potential solutions for addressing the inconclusive result.

At 909, fact-checking results are provided. For example, the fact-checking results including the correction assessments received at 901 and the revisions, bias reports, and detailed report generated at 903, 905, and 907, respectively, are prepared for a client. In various embodiments, the fact-checking results are provided to the client in response to a content fact-checking request. The client receiving the results can utilize the results, such as displaying the content fact-checking results in a user interface along with the fact-checked content. In some embodiments, the results are interactive and allow the user viewing the results to interact with the results and/or modify the original content, such as by replacing statements with proposed revisions and/or including citations for factual claims of the content. In various embodiments, the results are integrated into a user interface and can allow users to view real-time analysis results. In some embodiments, a client user interface provides options to dive deeper into additional detail including specific statements, claims made by the statements, and their verification status. Further, in some embodiments, the user interface allows the user to provide feedback on the provided fact-checking results. For example, in certain embodiments, users can vote on whether they think a specific claim is true or false as the content fact-checking service is preparing an answer. As another example, the user can provide feedback on whether a revision is helpful, clear, concise, and/or appropriate for replacing a statement, whether the citations are appropriate including the format and presentation of the citations, and/or whether the provided resources meet the expected type and/or format of resources, among other feedback.

Figure 10:
FIG. 10 is an example of a user interface view for a content fact-checking extension.

FIG. 10 is an example of a user interface view for a content fact-checking extension. The content fact-checking extension user interface view shown in FIG. 10 can be displayed within a client application and can be used for accessing a content fact-checking service. In the example shown, the content fact-checking extension user interface view includes multiple tabs including a "fact check" tab that allows the user to upload a document and to check facts. Other tabs include "history," "search," and "cite" tabs that allow a user to access functionality for reviewing the history of fact checking performed, for performing a search related to fact checking, and for exploring citation details related to fact checking. In some embodiments, the content fact-checking extension user interface view is installed as part of a client application such as client application 201 of FIG. 2 of a client such as client 101, 103, and/or 105 of FIG. 1. In some embodiments, the fact-checking extension user interface view is implemented by content fact-checking extension 213 of FIG. 2. For example, the user interface elements can be implemented by content fact-checking user interface module 223 of FIG. 2 and the functionality for accessing a content fact-checking service can be implemented by content fact-checking service interface module 221 of FIG. 2. In some embodiments, the content fact-checking service accessible by the content fact-checking extension user interface view is content fact-checking service 131 of FIG. 1 and/or content fact-checking service 301 of FIG. 3. In some embodiments, the content fact-checking features enabled by the fact-checking extension are implemented by the processes of FIGS. 4-9.

Figure 11:
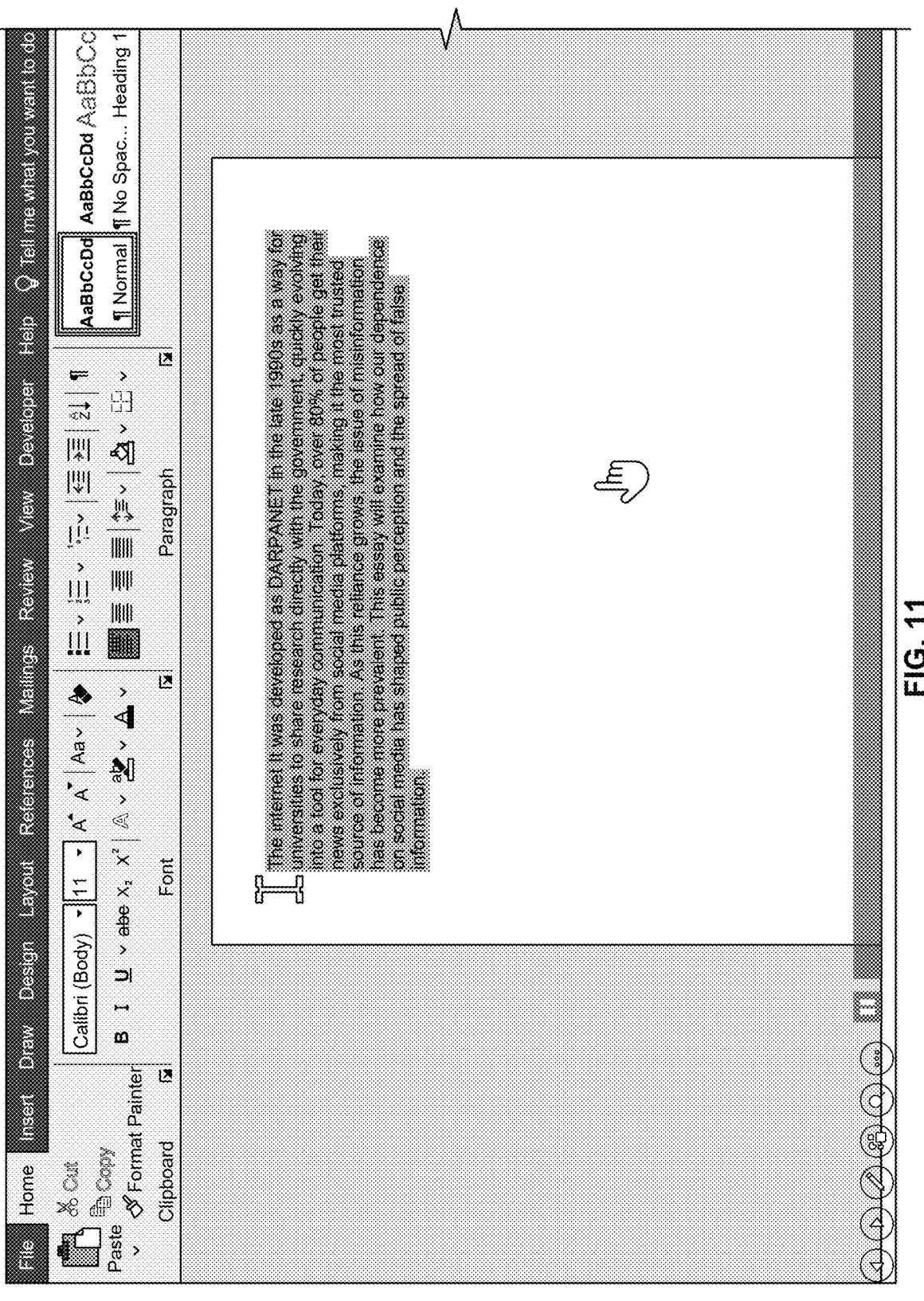
FIG. 11 is an example of a user interface view for a client application enabled with a content fact-checking extension.
Figure 11:
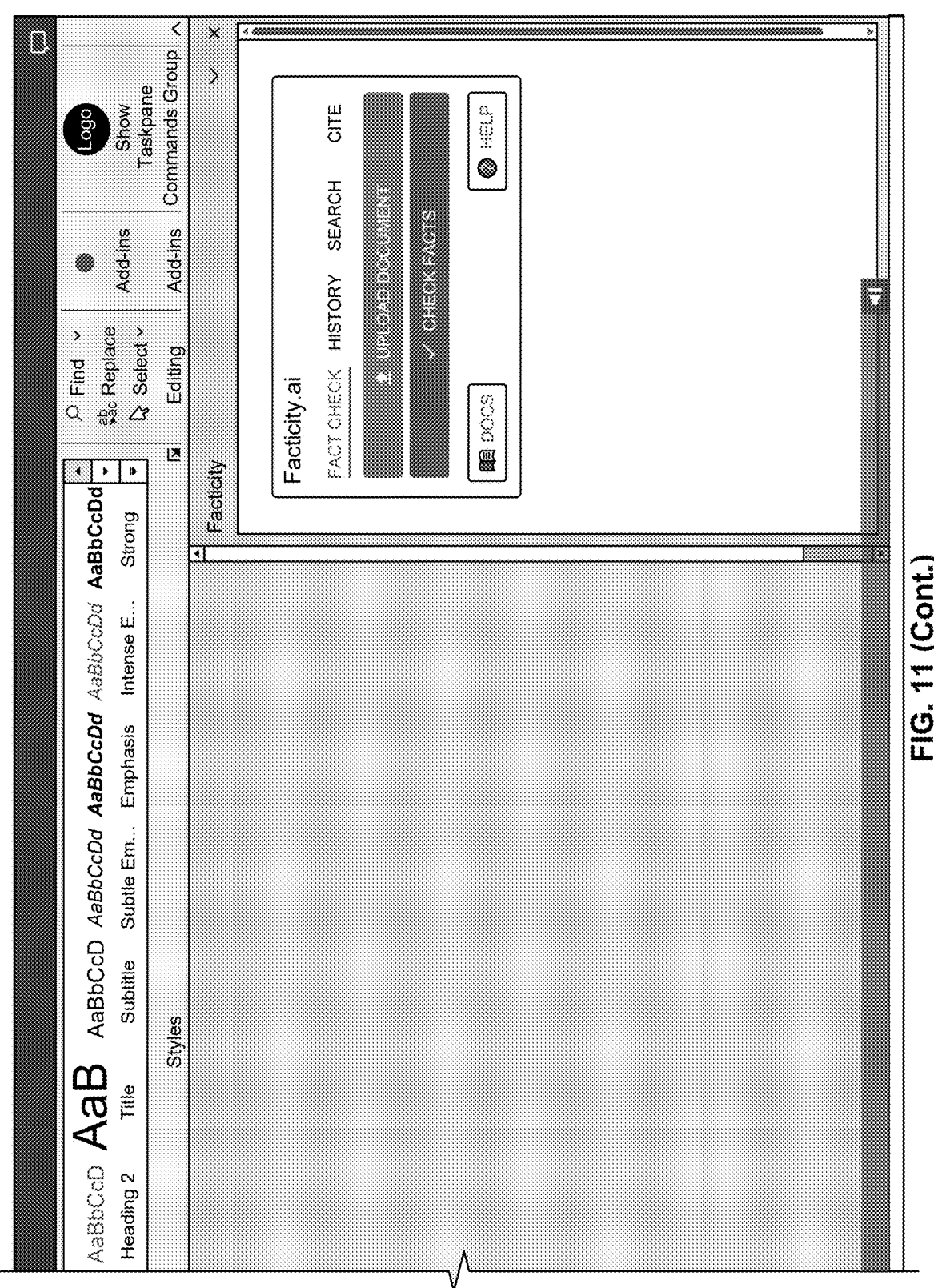

FIG. 11 is an example of a user interface view for a client application enabled with a content fact-checking extension. The client application shown in FIG. 11 is a document editing application enabled with a content fact-checking extension. In some embodiments, the content fact-checking extension shown in FIG. 11 corresponds to the content fact-checking extension user interface view shown in FIG. 10. As shown in FIG. 11, the text content is highlighted within the content editing pane of the document editing application. Once selected, the content can be fact-checked using the content fact-checking features exposed by the content fact-checking extension. In some embodiments, the client application corresponds to client application 201 of FIG. 2 of a client such as client 101, 103, and/or 105 of FIG. 1. In some embodiments, the fact-checking extension is implemented by content fact-checking extension 213 of FIG. 2. For example, the user interface elements can be implemented by content fact-checking user interface module 223 of FIG. 2 and the functionality for accessing a content fact-checking service can be implemented by content fact-checking service interface module 221 of FIG. 2. In some embodiments, the content fact-checking service accessible by the content fact-checking extension is content fact-checking service 131 of FIG. 1 and/or content fact-checking service 301 of FIG. 3. In some embodiments, the content fact-checking features enabled by the fact-checking extension are implemented by the processes of FIGS. 4-9.

Figure 12:
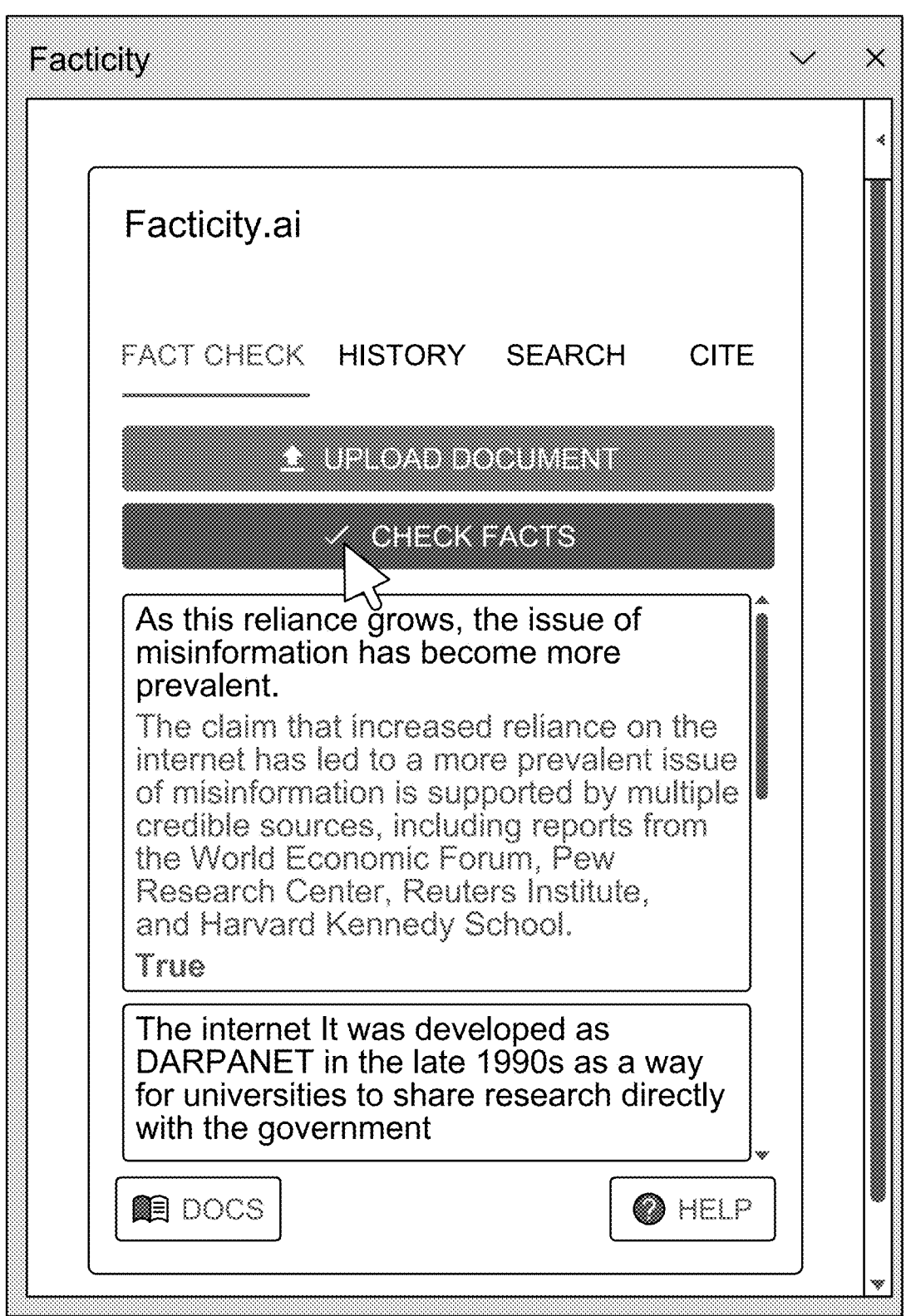
FIGS. 12 and 13 are examples of a user interface view for a content fact-checking extension.
Figure 13:
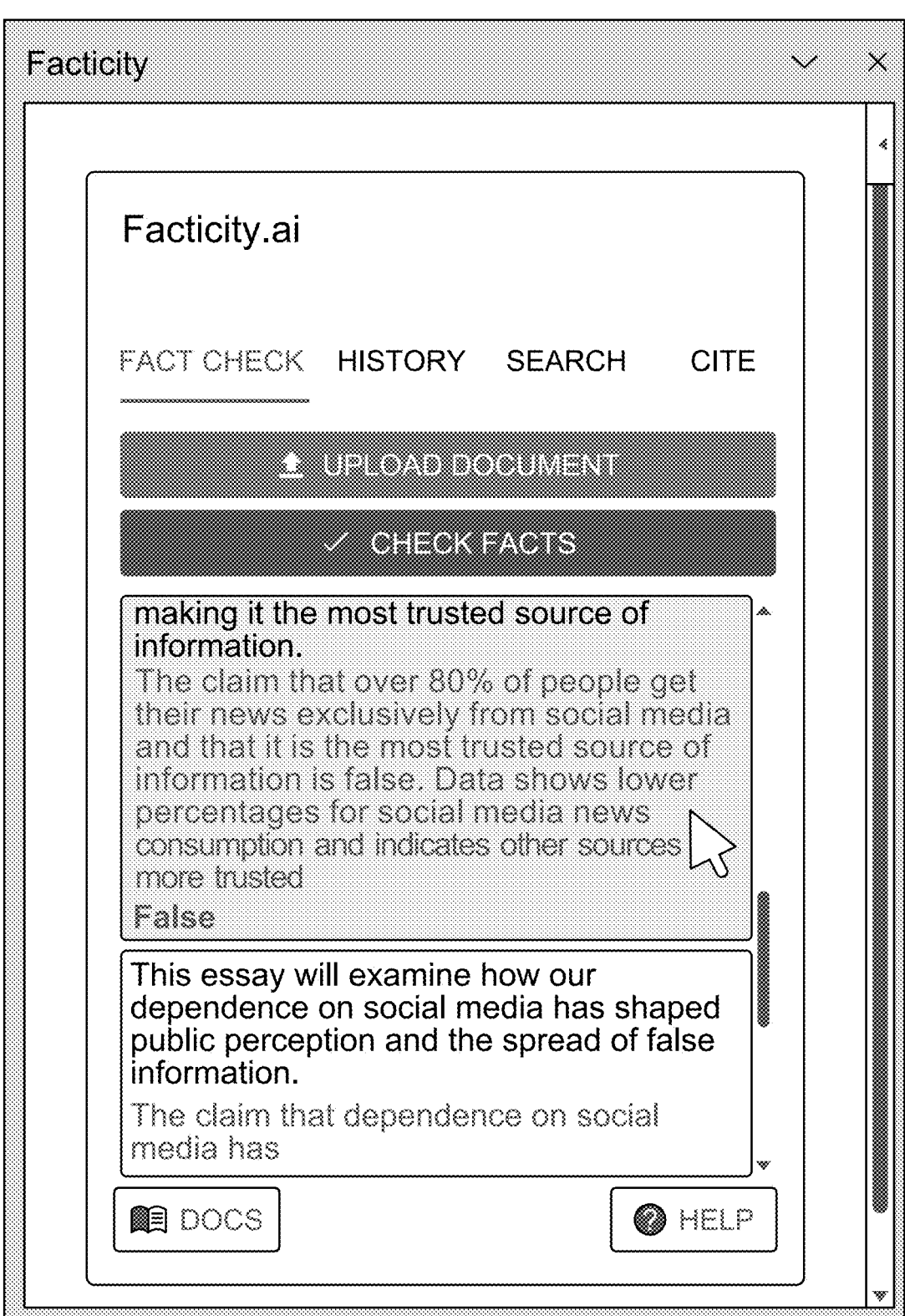

FIGS. 12 and 13 are examples of a user interface view for a content fact-checking extension. The content fact-checking extension user interface views shown in FIGS. 12 and 13 can be displayed within a client application such as the client application shown in FIG. 11. In the examples of FIGS. 12 and 13, the content fact-checking extension user interface views show content fact-checking results after the "check facts" button has been clicked by a user. In various embodiments, the fact-checked content corresponds to the content selected in the document editing pane of FIG. 11. As shown in FIGS. 12 and 13, the content fact-checking results span more than can be shown in a single content fact-checking extension user interface view, and a user can scroll through the results to review additional fact-checking results. In FIG. 12, a first statement of the selected content has been fact-checked and the result shows that the first statement was found to be "true." In contrast, in FIG. 13, a second statement of the content has been fact-checked and the result shows that the second statement was found to be "false." As shown in FIGS. 12 and 13, both correctness decisions (e.g., true and false) are preceded by an explanation of the findings. In some embodiments, the content fact-checking extension user interface views of FIGS. 12 and 13 are installed as part of a client application such as client application 201 of FIG. 2 of a client such as client 101, 103, and/or 105 of FIG. 1. In some embodiments, the fact-checking extension user interface view is implemented by content fact-checking extension 213 of FIG. 2. For example, the user interface elements can be implemented by content fact-checking user interface module 223 of FIG. 2 and the functionality for accessing a content fact-checking service can be implemented by content fact-checking service interface module 221 of FIG. 2. In some embodiments, the content fact-checking service accessible by the content fact-checking extension user interface view is content fact-checking service 131 of FIG. 1 and/or content fact-checking service 301 of FIG. 3. In some embodiments, the content fact-checking features enabled by the fact-checking extension are implemented by the processes of FIGS. 4-9.

Figure 14:
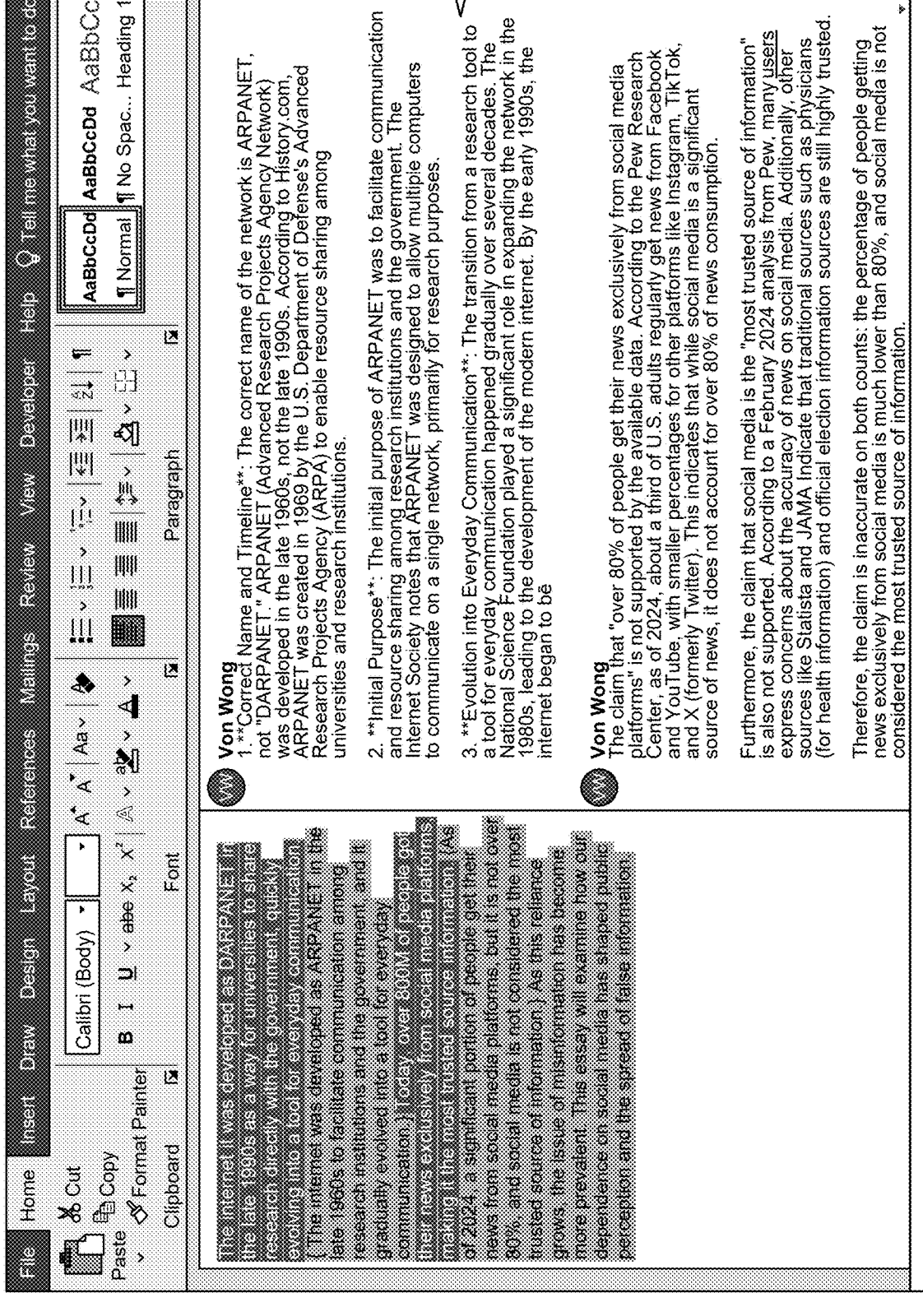
FIG. 14 is an example of a user interface view for a client application enabled with a content fact-checking extension.
Figure 14:
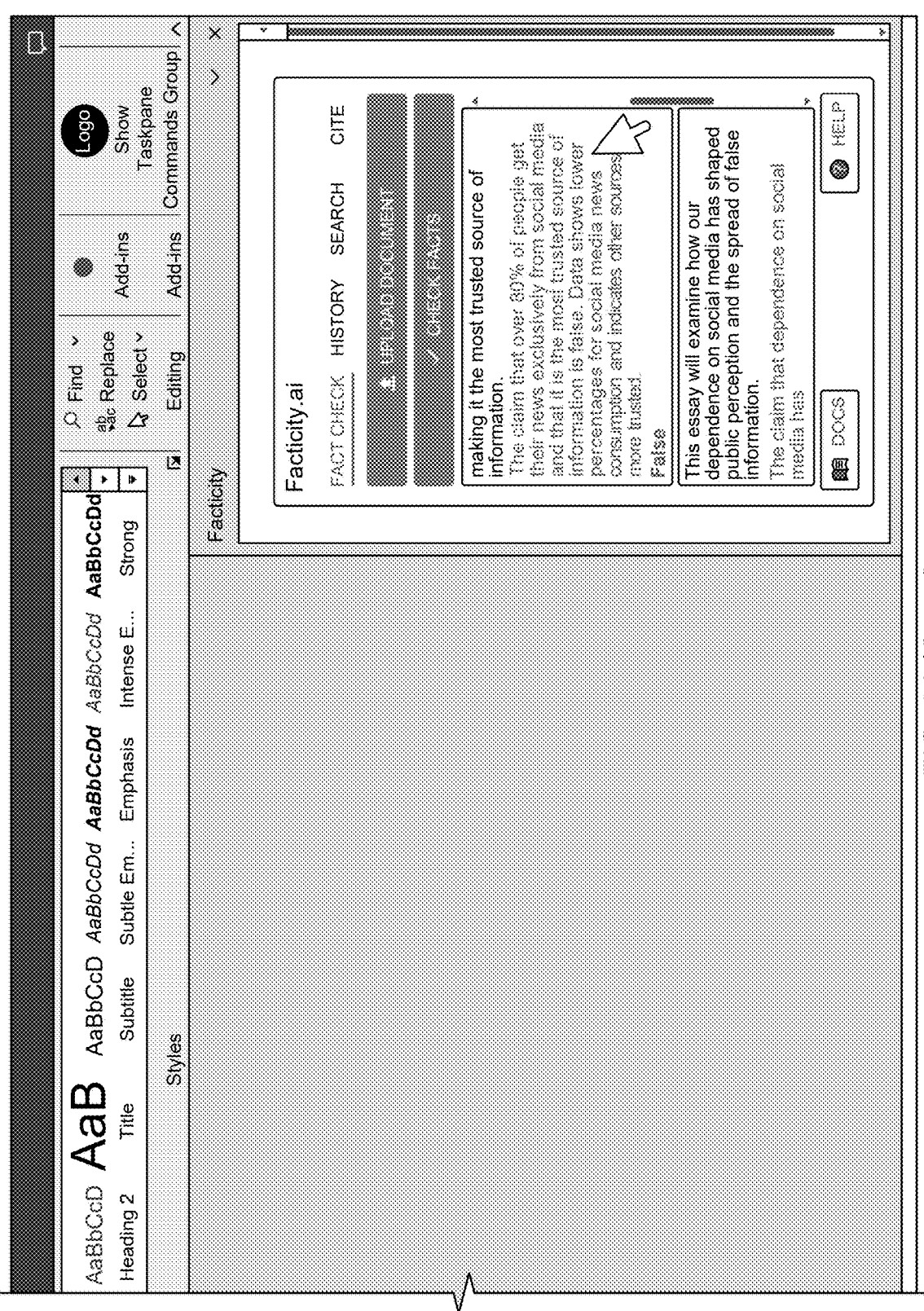

FIG. 14 is an example of a user interface view for a client application enabled with a content fact-checking extension. The client application shown in FIG. 14 is a document editing application enabled with a content fact-checking extension. In some embodiments, the content fact-checking extension shown in FIG. 14 corresponds to the content fact-checking extension shown in FIGS. 12 and 13 and further corresponds to after content-fact checking has been performed on selected content. As shown in FIG. 14, the text content is highlighted within the content editing pane of the document editing application. In contrast with FIG. 11, the content in FIG. 14 has been fact-checked using a content fact-checking service accessed via the content fact-checking extension. For example, the selected content now includes two statements that are highlighted differently (in red) than the selected content. The highlighted statements correspond to statements that have had correctness verification performed on them. In addition to highlighting the statements within the selected content, a comments sidebar of the document editor shows comments for each statement. The included comments can be inserted by the content fact-checking extension and the substance of the comments can be provided by the content fact-checking service as part of the content fact-checking results. Similar to FIGS. 12 and 13, the content fact-checking extension also shows the content fact-checking results for the selected content. In some embodiments, the client application corresponds to client application 201 of FIG. 2 of a client such as client 101, 103, and/or 105 of FIG. 1. In some embodiments, the fact-checking extension is implemented by content fact-checking extension 213 of FIG. 2. For example, the user interface elements can be implemented by content fact-checking user interface module 223 of FIG. 2 and the functionality for accessing a content fact-checking service can be implemented by content fact-checking service interface module 221 of FIG. 2. In some embodiments, the content fact-checking service accessible by the content fact-checking extension is content fact-checking service 131 of FIG. 1 and/or content fact-checking service 301 of FIG. 3. In some embodiments, the content fact-checking features enabled by the fact-checking extension are implemented by the processes of FIGS. 4-9.

FIG. 15 is an example of a user interface view of a content pane for a client application enabled with a content fact-checking extension. The client application of the content pane shown in FIG. 15 is a document editing application enabled with a content fact-checking extension. The client application of FIG. 15 corresponds to the document editing application of FIG. 14, but to emphasize the content fact-checking features enabled for the content pane, the client application is now shown without the corresponding content fact-checking extension. In the example shown, FIG. 15 shows the content pane with the results of the content fact-checking performed by a content fact-checking service. For example, the selected content now includes two statements that are highlighted differently (in red) than the selected content. The highlighted statements correspond to statements that have had correctness verification performed on them. In addition to highlighting the statements within the selected content, a comments sidebar of the document editor shows comments for each statement. The included comments can be inserted by the content fact-checking extension and the substance of the comments can be provided by the content fact-checking service as part of the content fact-checking results. In some embodiments, the client application corresponds to client application 201 of FIG. 2 of a client such as client 101, 103, and/or 105 of FIG. 1. In some embodiments, the fact-checking extension (not shown) is implemented by content fact-checking extension 213 of FIG. 2. In some embodiments, the content fact-checking service used to perform the content fact checking is content fact-checking service 131 of FIG. 1 and/or content fact-checking service 301 of FIG. 3. In some embodiments, the content fact-checking service is implemented by the processes of FIGS. 4-9.

Figure 16:
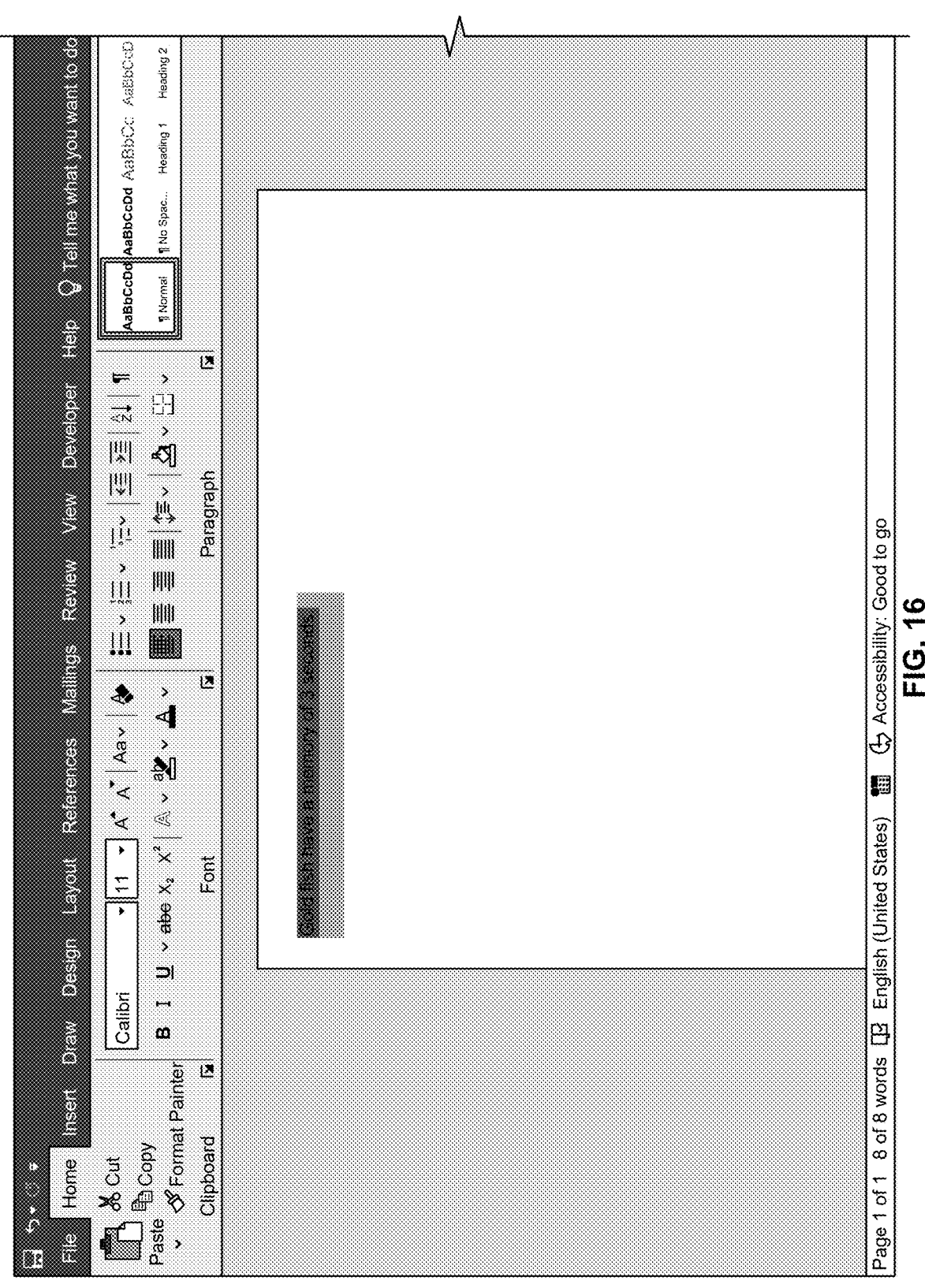
FIGS. 16 and 17 are examples of a user interface view for a client application enabled with a content fact-checking extension that provides fact-checked revisions.
Figure 16:
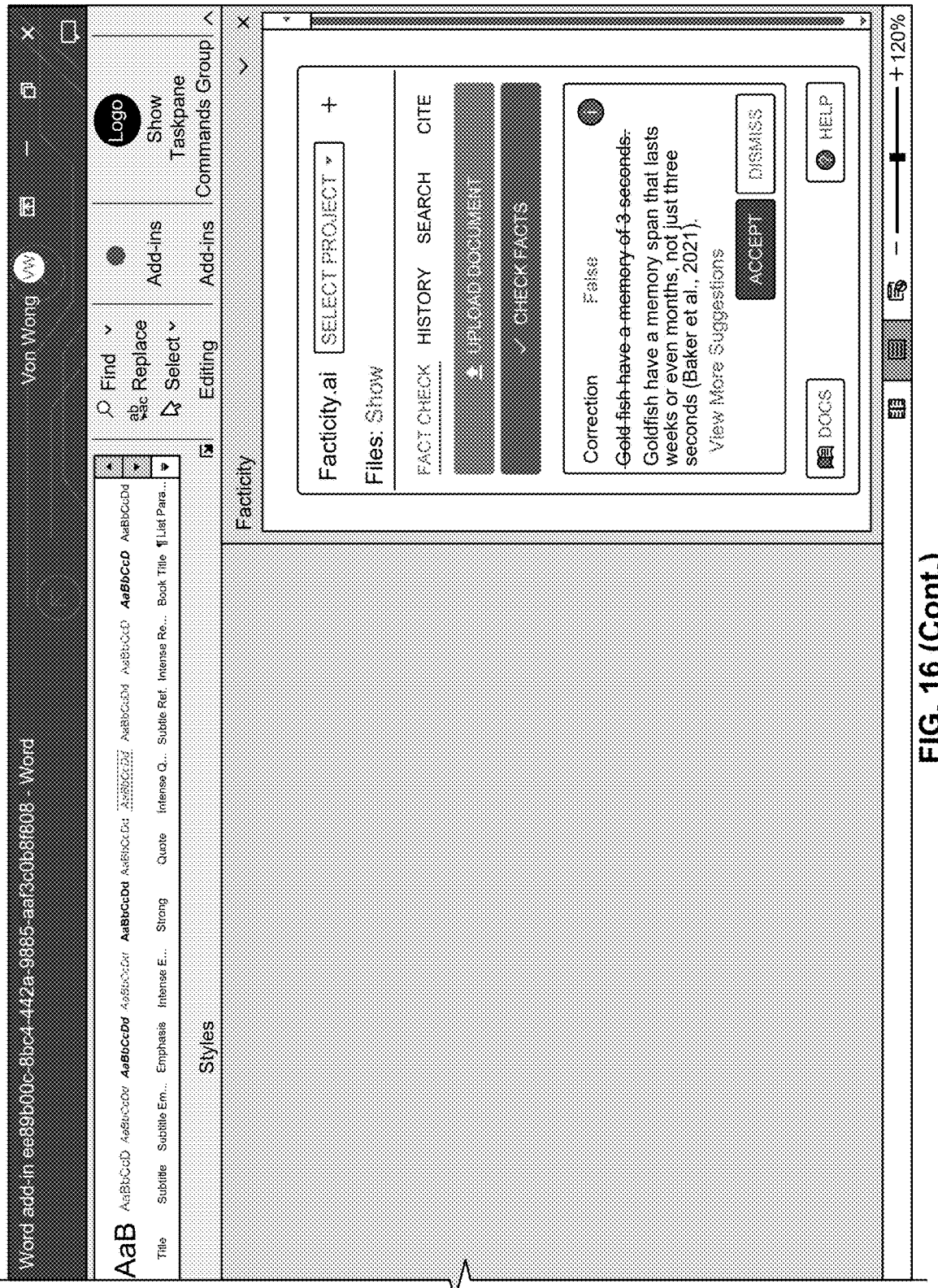
Figure 17:
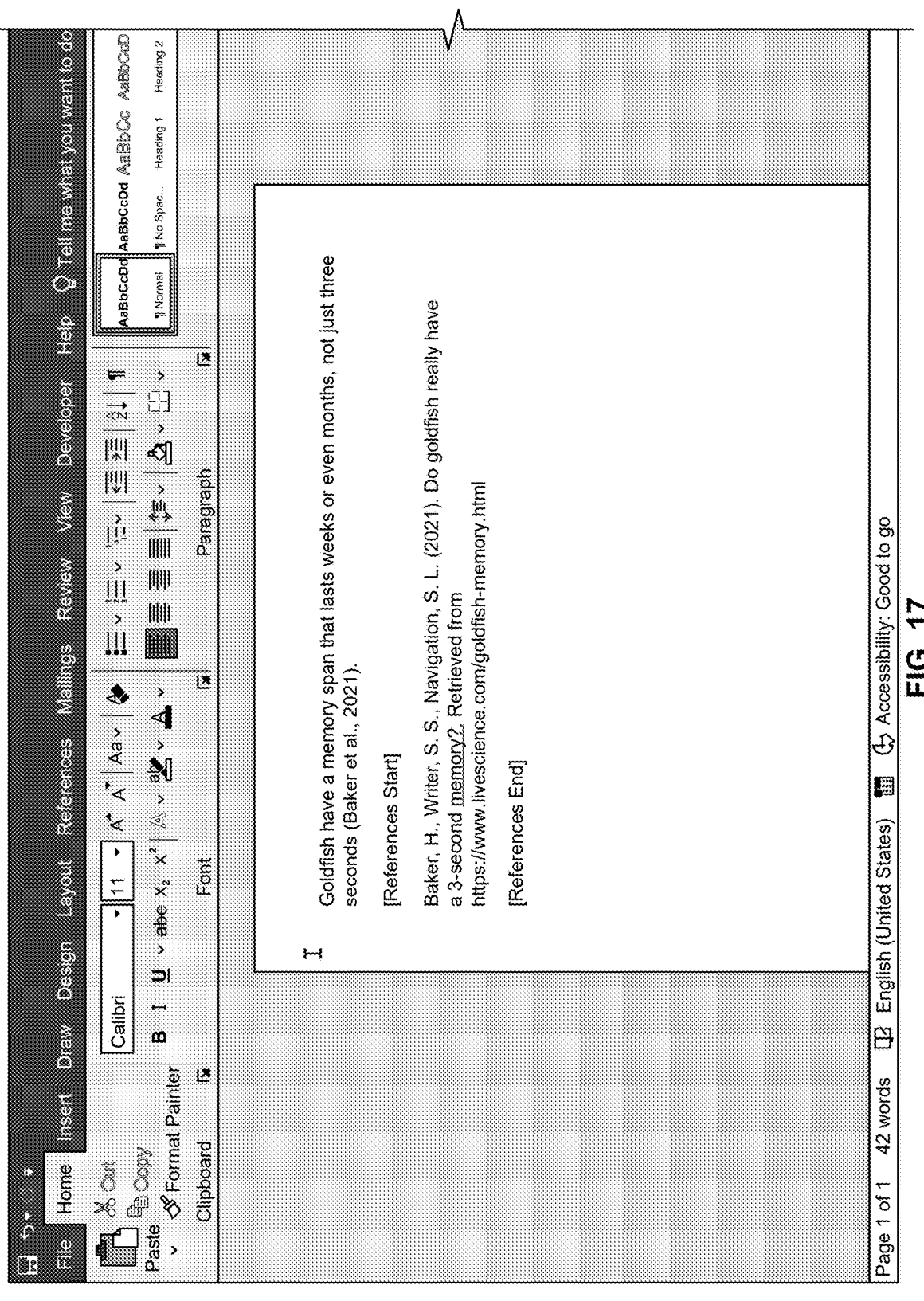
Figure 17:
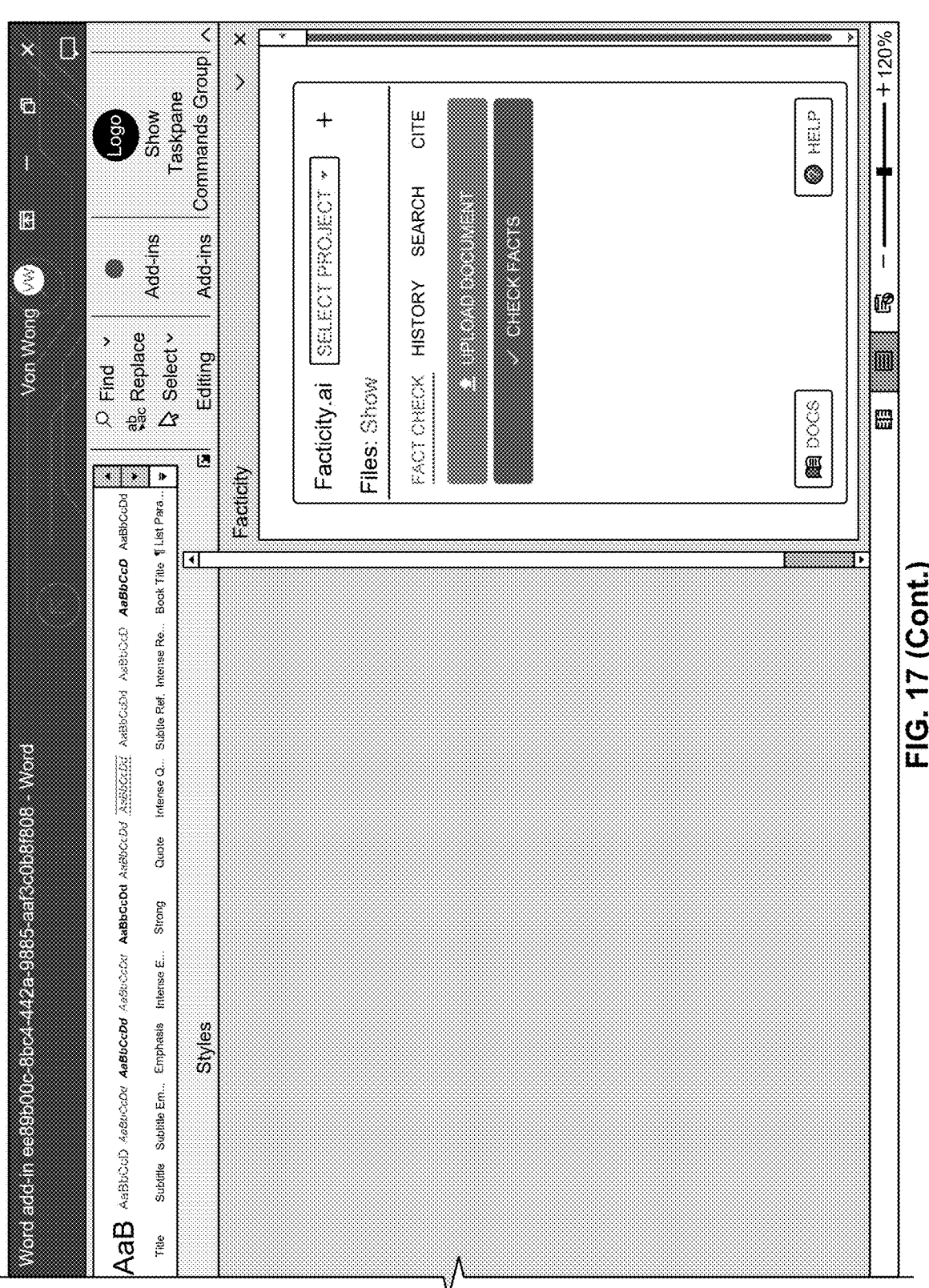

FIGS. 16 and 17 are examples of a user interface view for a client application enabled with a content fact-checking extension that provides fact-checked revisions. The client application shown in FIGS. 16 and 17 is a document editing application enabled with a content fact-checking extension. As shown in FIG. 16, the text content ("Gold fish have a memory of 3 seconds.") is highlighted and fact-checking has already been performed on the content. The single statement within the content is further highlighted to identify that the statement has been verified for correctness. As shown in the content fact-checking extension in FIG. 16, the statement was found to be "false." The false statement is shown in the content fact-checking extension with a strikethrough format and a revision to the statement is shown just below. The proposed revision ("Goldfish have a memory span that lasts weeks or even months, not just three seconds (Baker et al., 2021).") is provided along with the option to view more suggested revisions. The user is provided with the option to replace the fact-checked statement (found false) with the proposed revision by selecting the "Accept" button. The "Dismiss" button allows the user to dismiss the proposed revision. In the event the user selects the "Accept" button, the proposed revision replaces the selected content statement that was found false. FIG. 17 shows the document editing application once the proposed revision has been accepted. For example, the content pane now includes the revised statement along with citations to references identified by the content fact-checking service. Since the revision has been accepted, the content fact-checking extension no longer shows details of the fact-checked statement that was found false. In various embodiments, the format used for revisions including the format for citations can be configured. For example, different citation format preferences can be configured by and/or for the user. In some embodiments, the client application of FIGS. 16 and 17 corresponds to client application 201 of FIG. 2 of a client such as client 101, 103, and/or 105 of FIG. 1. In some embodiments, the fact-checking extension is implemented by content fact-checking extension 213 of FIG. 2. In some embodiments, the content fact-checking service used to perform the content fact checking is content fact-checking service 131 of FIG. 1 and/or content fact-checking service 301 of FIG. 3. In some embodiments, the content fact-checking service is implemented by the processes of FIGS. 4-9.

Figure 18:
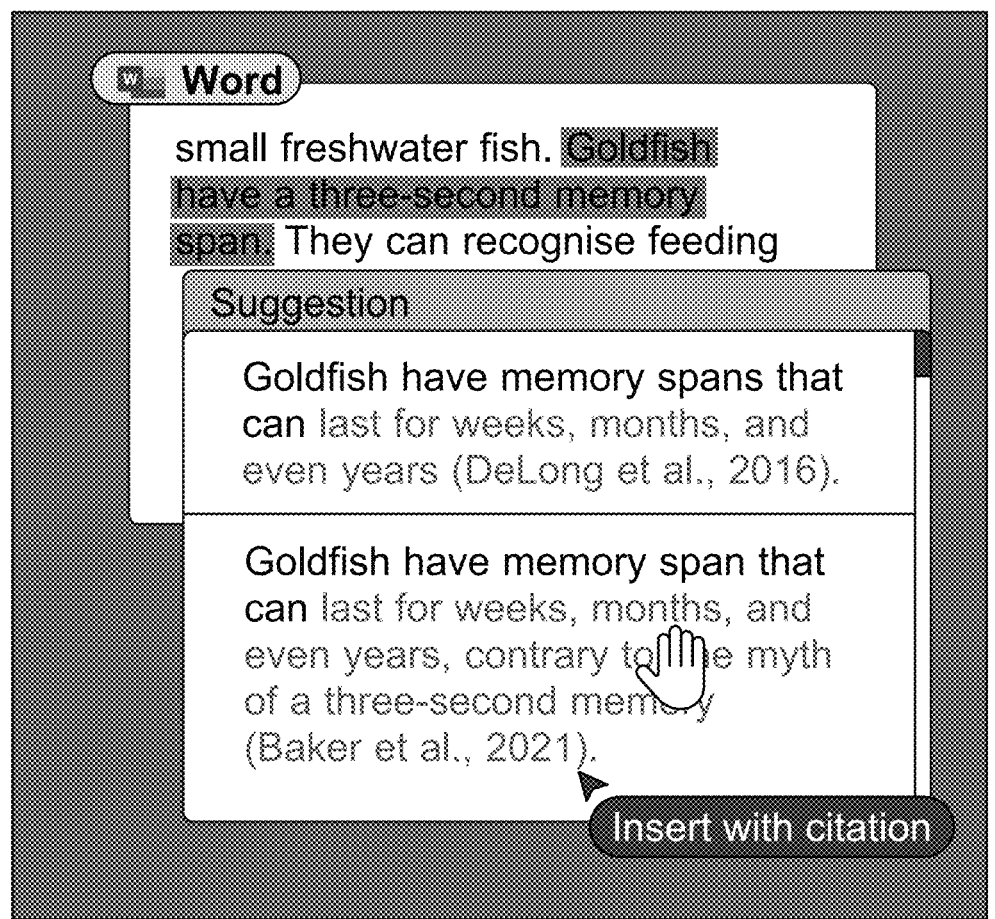
FIG. 18 is an example of a user interface for interfacing with a content fact-checking service.

FIG. 18 is an example of a user interface for interfacing with a content fact-checking service. The example user interface views shown in FIG. 18 correspond to two user interface windows that support features of the content fact-checking service. The bottom user interface window includes content that has been fact-checked by the content fact-checking service. The statement ("Goldfish have a three-second memory span.") has been identified as meeting the criteria for correctness verification and has been fact-checked. The content fact-checking results are shown as two suggestions in the top user interface window. As shown in FIG. 18, each suggestion includes a corresponding citation. In the example shown, the top user interface window allows the user to insert either of the proposed revisions and optionally insert the generated citation. In some embodiments, the top user interface window and the corresponding content fact-checking features can be implemented by a content fact-checking extension or plugin. In some embodiments, the user interface windows shown in FIG. 18 correspond to a client application such as client application 201 of FIG. 2 of a client such as client 101, 103, and/or 105 of FIG. 1. In some embodiments, the fact-checking extension is implemented by content fact-checking extension 213 of FIG. 2. In some embodiments, the content fact-checking service used to perform the content fact checking is content fact-checking service 131 of FIG. 1 and/or content fact-checking service 301 of FIG. 3. In some embodiments, the content fact-checking service is implemented by the processes of FIGS. 4-9.

FIG. 19 is an example of a user interface view for interfacing with a content fact-checking service. The user interface view shown in FIG. 19 can be displayed within a client application such as a web browser (or another client application) and includes content fact-checking results performed by a content fact-checking service. In the example shown, a statement ("Nancy Pelosi did not accept the offer from Trump of 10,000 soldiers or National Guard on Jan. 6, 2021.") has been fact-checked by the content fact-checking service and found to be false. The user interface view displays a detailed analysis (shown on the left) explaining the correctness decision along with multiple resources used as citations. Additionally, the user interface view includes a bias report (shown on the right). The bias report can be generated as part of the content fact-checking results. In the example shown, the bias report maps the cited resources by their determined political bias. In some embodiments, the political bias for each resource is determined by a third-party service. In some embodiments, the user interface view shown in FIG. 19 corresponds to a client application such as client application 201 of FIG. 2 of a client such as client 101, 103, and/or 105 of FIG. 1. In some embodiments, the user interface view utilizes a content fact-checking extension, and the content fact-checking extension is implemented by content fact-checking extension 213 of FIG. 2. In some embodiments, the content fact-checking service used to perform the content fact checking is content fact-checking service 131 of FIG. 1 and/or content fact-checking service 301 of FIG. 3. In some embodiments, the content fact-checking service is implemented by the processes of FIGS. 4-9.

Figure 20:
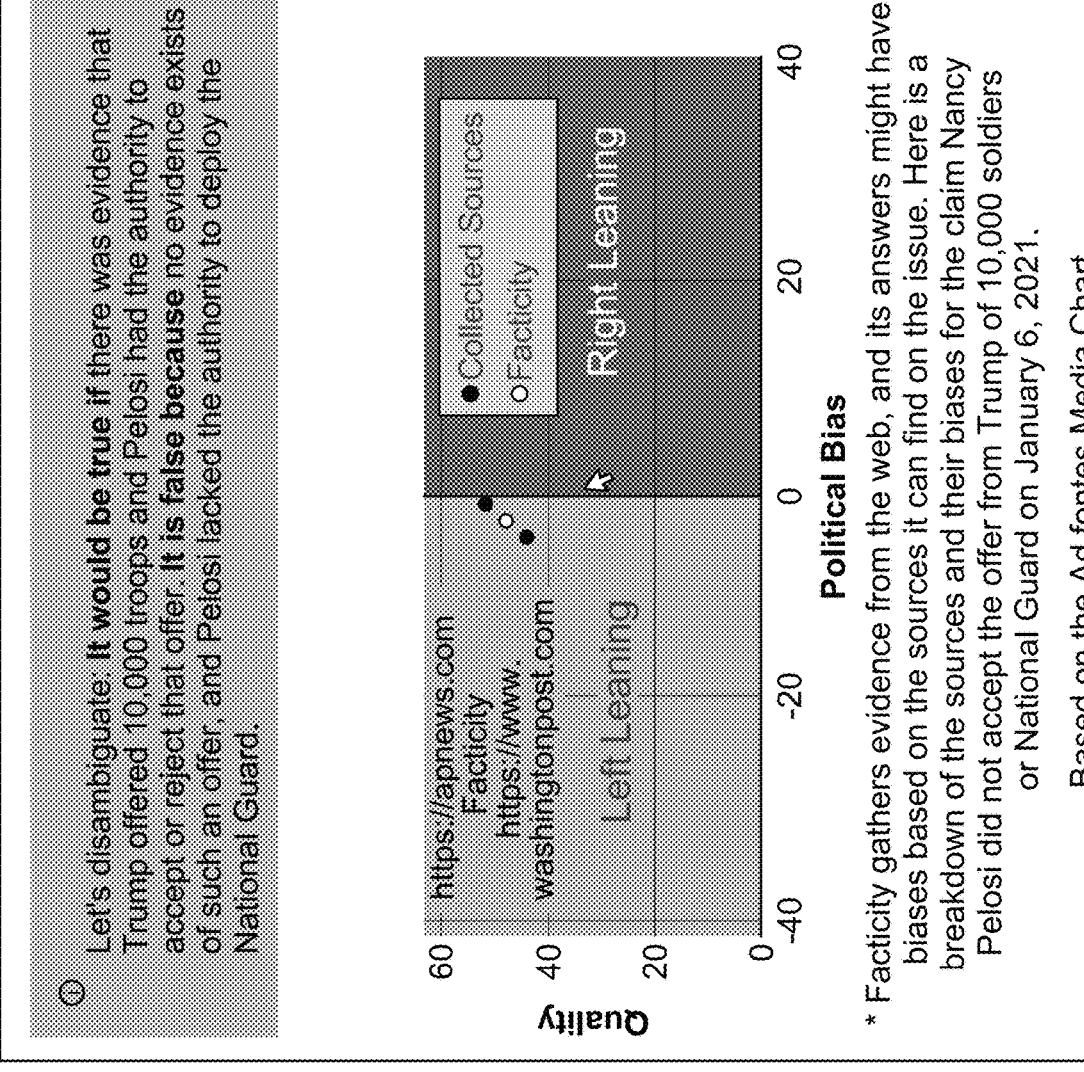
FIG. 20 is an example of a bias report generated by a content fact-checking service.

FIG. 20 is an example of a bias report generated by a content fact-checking service. The bias report shown in FIG. 20 can be displayed within a client application such as a web browser (or another client application) and includes content fact-checking results performed by a content fact-checking service. In various embodiments, the bias report shown in FIG. 20 corresponds to the bias report shown in FIG. 19. In the example shown, resources are used to verify correctness of a statement as shown mapped by their political bias along with an analysis and explanation of the results. In various embodiments, the bias report can be generated as part of content fact-checking results performed on an identified statement purported as a fact. As shown in FIG. 20, the political bias for each resource is determined by a third-party service and other services can be used as appropriate. For example, different services for determining political bias may be appropriate for resources based on the subject domains or language of the resource. In some embodiments, the content fact-checking service used to perform the content fact checking and to generate the bias report is content fact-checking service 131 of FIG. 1 and/or content fact-checking service 301 of FIG. 3. In some embodiments, the content fact-checking service is implemented by the processes of FIGS. 4-9.

FIG. 21 is an example of a user interface for interfacing with a content fact-checking service. The example user interface view shown in FIG. 21 displays content fact-checking results for a statement that has been fact-checked using a content fact-checking service. In some embodiments, the user interface is shown in a client application such as a client browser. As shown in FIG. 21, the content fact-checking results include a correctness decision (i.e., true), an explanation of the decision, citations to resources, and a summary of the fact-checking analysis. In some embodiments, the user interface shown in FIG. 21 corresponds to a client application such as client application 201 of FIG. 2 of a client such as client 101, 103, and/or 105 of FIG. 1. In some embodiments, the client application uses a content fact-checking extension to access the content fact-checking service, and the content fact-checking extension is implemented by content fact-checking extension 213 of FIG. 2. In some embodiments, the content fact-checking service used to perform the content fact checking is content fact-checking service 131 of FIG. 1 and/or content fact-checking service 301 of FIG. 3. In some embodiments, the content fact-checking service is implemented by the processes of FIGS. 4-9.

FIG. 22 is a set of images displaying live fact-checking functionality of a content fact-checking service. In the images shown in FIG. 22, students at the University of North Carolina at Chapel Hill Hussman School of Journalism and Media view the live fact-checking of the 2024 U.S. Presidential Debate. Alongside a live broadcast of the debate, live fact-checked results from the disclosed content fact-checking service are shown. In the examples shown, the content fact-checking results are provided in real-time for the content presented during the live multimedia televised and streamed debate.

Figure 23:
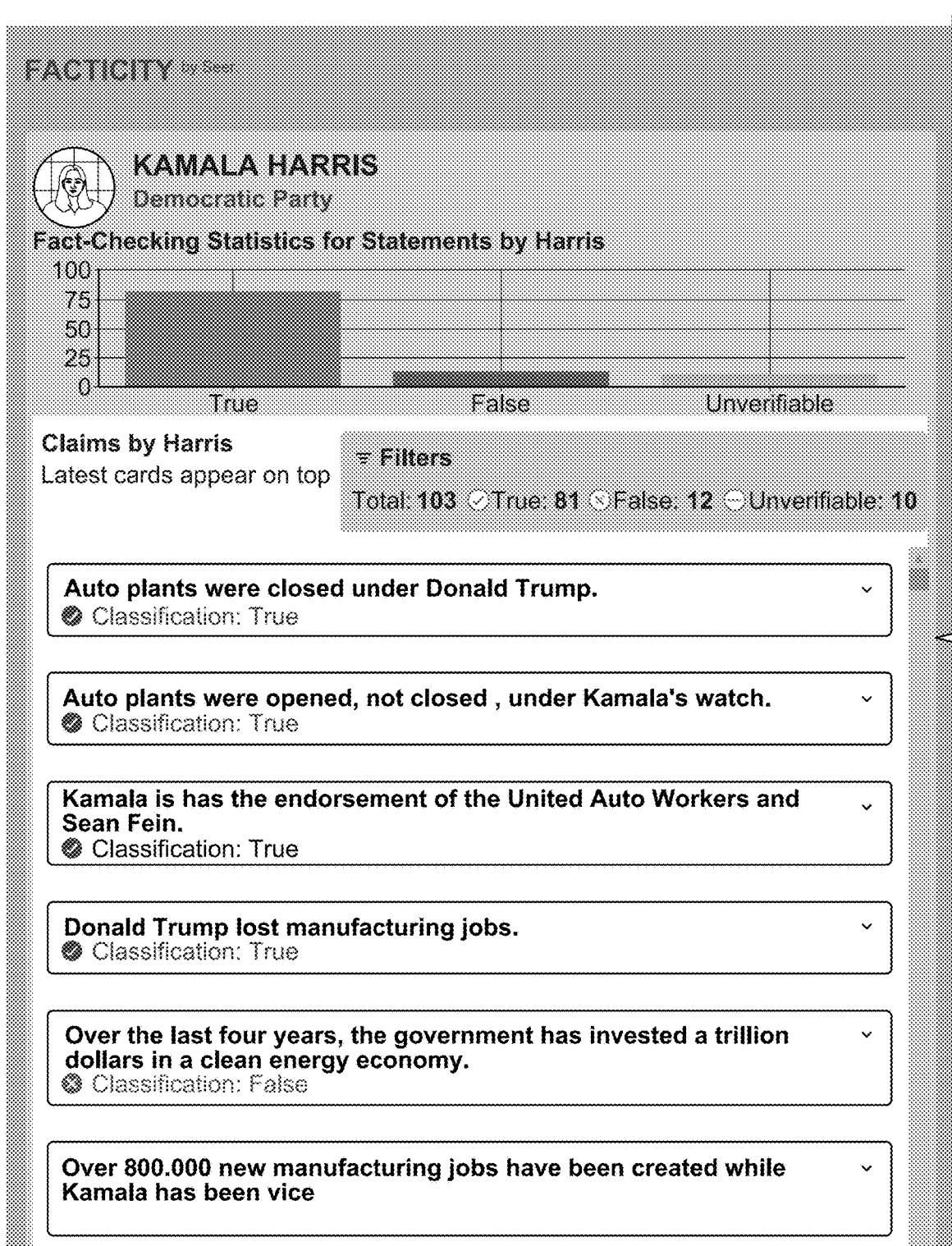
FIG. 23 is an example of a user interface for interfacing with a content fact-checking service when performing live fact-checking.

FIG. 23 is an example of a user interface for interfacing with a content fact-checking service when performing live fact-checking. As shown in FIG. 23, the user interface displays live fact-checking results for the 2024 U.S. Presidential Debate includes results for claims made by each candidate. The content fact-checking results are provided in real-time by the disclosed content fact-checking service.

FIGS. 24 and 25 are examples of user interface views for performing content fact-checking on multimedia content. In the examples shown, claims made within a video are identified and analyzed for accuracy. For example, the claims are analyzed by the content fact-checking service and the results are displayed in the corresponding user interface. As shown, analyzed claims can be evaluated as true, false, unverifiable, or missing context. For example, the user interface shown in FIG. 24 shows claims evaluated as true, false, and unverifiable, and the user interface shown in FIG. 25 shows claims evaluated as false and missing context.

Figure 26:
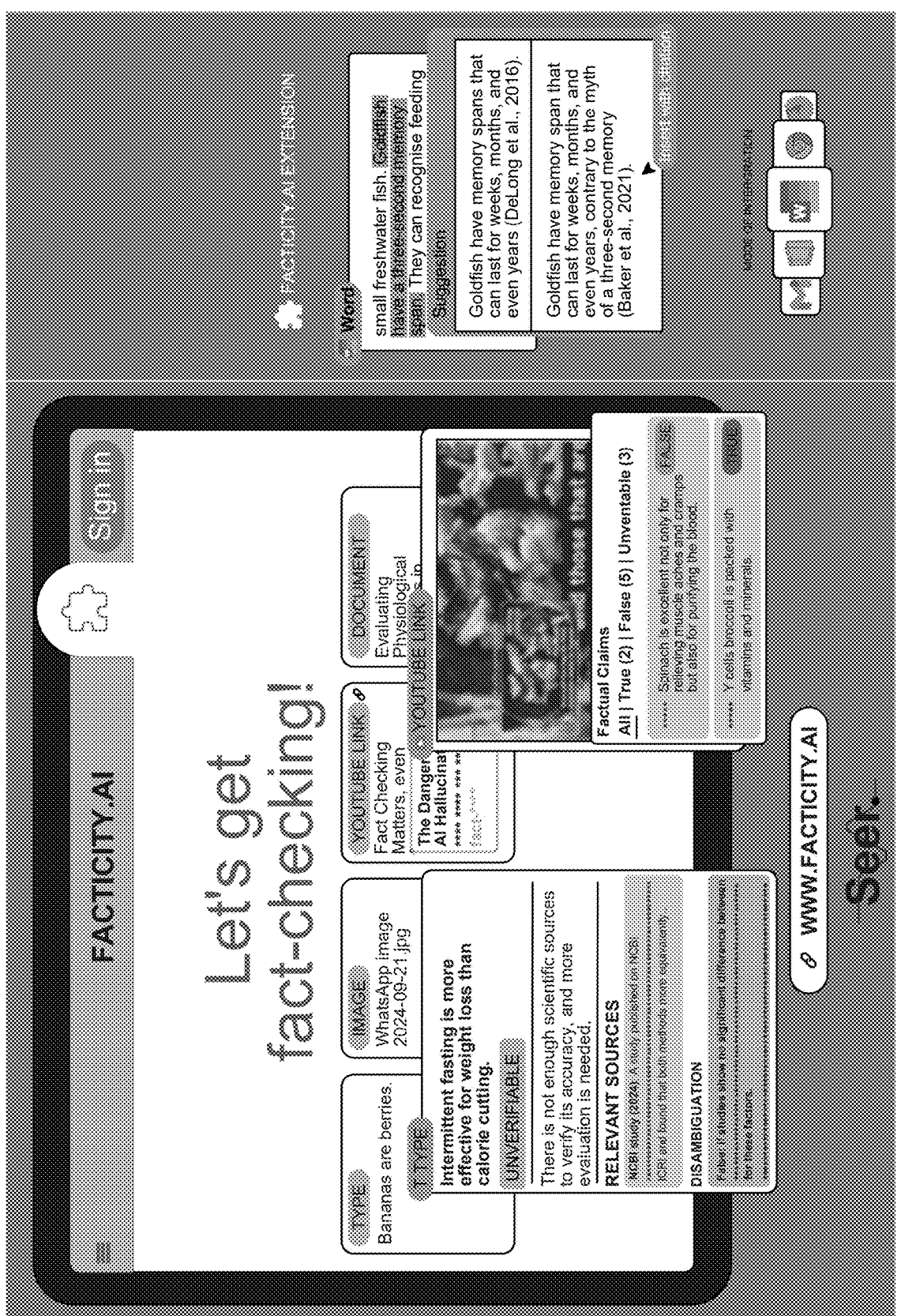
FIG. 26 is an example of a user interface of an embodiment of a content fact-checking service.

FIG. 26 is an example of a user interface of an embodiment of a content fact-checking service. In the example shown, highlighted features of an embodiment of a content fact-checking service are shown including interactive elements, such as buttons, icons, and dropdown menus, each designed to enhance user navigation. In various embodiments, features of the user interface are clearly highlighted with color coding and tooltips to guide users. The user interface includes intuitive navigation panels, search functionalities, and filters, allowing users to easily sort through content. Moreover, the user interface can emphasize key actions such as saving, bookmarking, and/or customizing settings. The interactive elements can be further designed for responsiveness, ensuring an optimized experience across various devices. In various embodiments, each feature is strategically placed to ensure usability, with a focus on clean design and efficient task completion.

Figure 27:
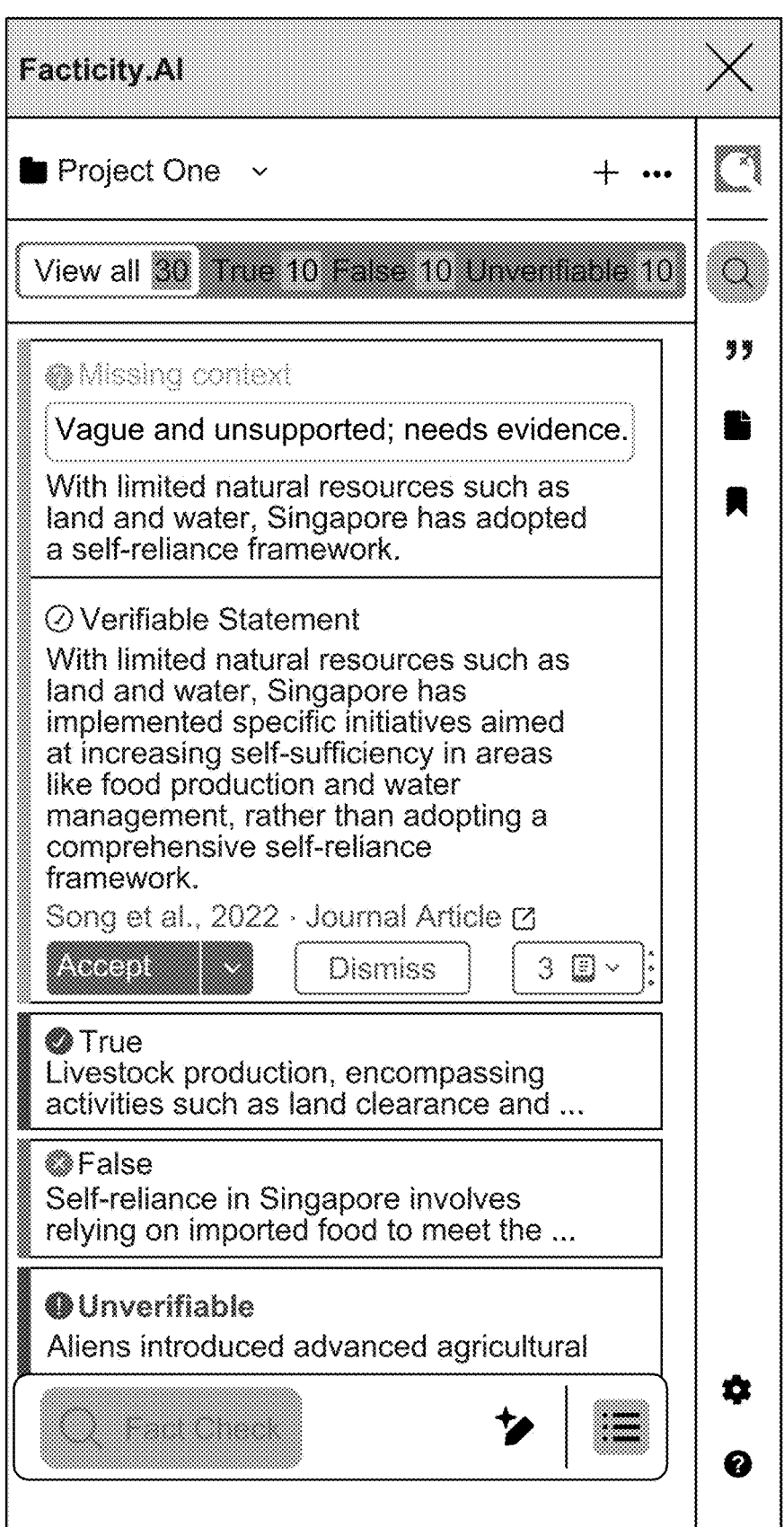
FIG. 27 is an example of a user interface of an embodiment of a content fact-checking service.

FIG. 27 is an example of a user interface of an embodiment of a content fact-checking service. In the example user interface view shown, claims have been analyzed by the content fact-checking service and categorized as true, false, unverifiable, or missing context. In some embodiments, the user interface view corresponds to a client extension or plugin for accessing a content fact-checking service.

FIG. 28 is an example of a user interface of an embodiment of a content fact-checking service for a claim categorized as missing context. In the example user interface view shown, a claim ("The United States is in decline.") is evaluated and found by the content fact-checking service to be missing context, and is thus categorized and displayed with the category "missing context" along with sources that are categorized into the categories: supporting sources, counterargument sources, and neutral sources. The example user interface allows users to select from the provided sources, view additional sources, and/or revise the initial claim with a statement that no longer context.

FIG. 29 is an example of a user interface of an embodiment of a content fact-checking service for filtering sources by type. In the example user interface view shown, a user can select from different source filtering options to filter sources to be searched by type. As shown in FIG. 29, the options provided by the filter include web sources, journal articles, books, and custom sources. Each source type can include sub-types and customized filtering parameters. For example, journal articles can be filtered by open access, limited access (or semi-public), and subscription required (or private) journal articles. Similarly, books can be filtered by free, preview available, or purchase required books. The user interface further allows a user to upload and share custom sources for performing fact-checking. In some embodiments, the custom sources are uploaded into a user cloud-based knowledge database.

FIG. 30 is a diagram describing the relationship between expressed convictions and knowledge. For example, the diagram of FIG. 30 shows the correlation between convictions expressed by an individual as it relates to the individual's knowledge, which typically increases over time. As knowledge increases, in general or for a specific subject domain, the conviction expressed by the individual will fluctuate as shown in FIG. 30. Understanding this relationship and where an individual that is making a claim resides with respect their knowledge and expressed convections can be used by a content fact-checking service. In some embodiments, a credibility rating system such as one based on truth coins is used, and the greater the expressed convictions correlate to knowledge, the greater the corresponding transactional truth coin holdings are for the holder. The disclosed content fact-checking service can attribute more credibility or a higher credibility rating as a source to people with more truth coins. The credibility attribution can be used to fact-check and perform lie detection on people in real time and/or in a decentralized manner.

Figure 31:
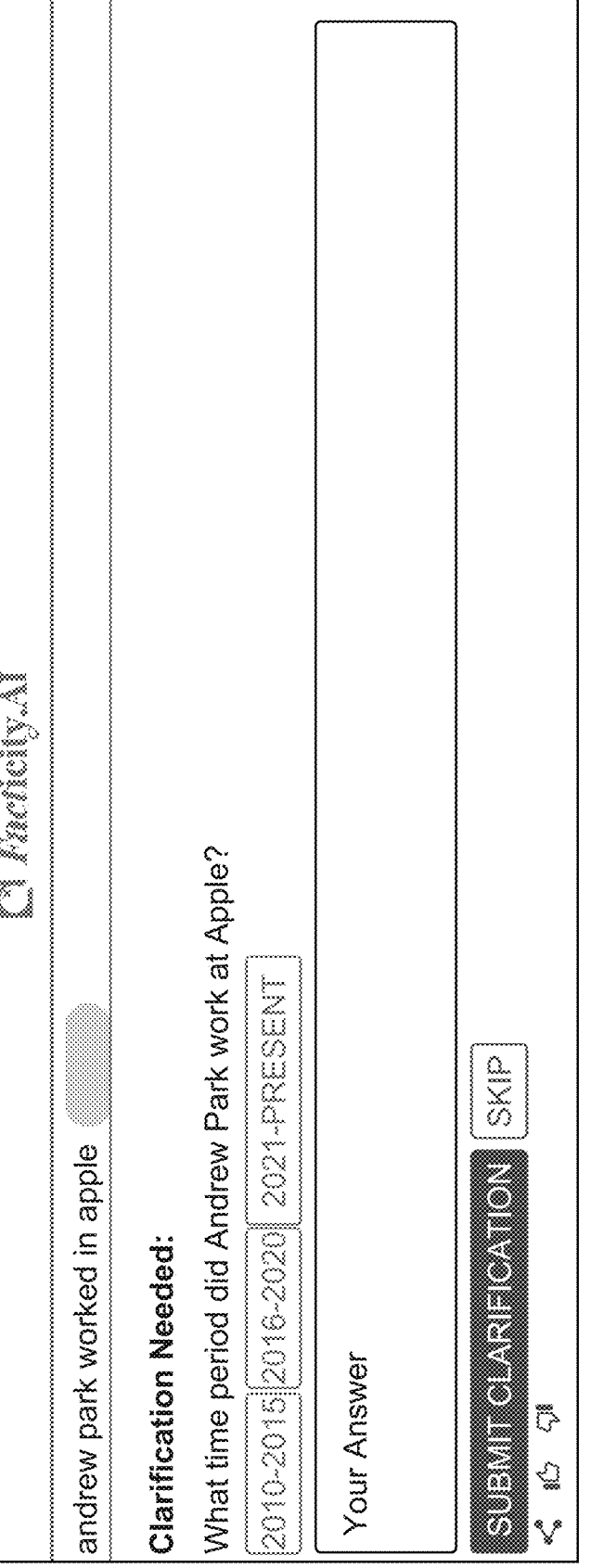

FIGS. 31 and 32 are examples of user interface views for performing disambiguation when interfacing with a content fact-checking service. The user interface views shown in FIGS. 31 and 32 allow a user to respond to and resolve an identified ambiguity. For example, as shown in FIG. 31, a user query "andrew park worked in apple" is found to be ambiguous and additional clarification is requested. The user interface view of FIG. 31 allows a user to provide a user feedback response to clarify the identified ambiguity. In some embodiments, the user feedback response can be selected from one or more automatically provided response selections, here shown as three different time frames (2010 to 2015, 2016 to 2020, and 2021 to present). In some embodiments, the automatically provided response selections are determined after an initial analysis of the query (or statement) and from potential clarifying answers that can resolve the identified ambiguity. As shown in FIG. 32, a continuation of the disambiguation and fact-checking process, the ambiguity has been clarified with a user response specifying the time period 2010 to 2015. With the ambiguity resolved, the claim has been fully fact-checked and a fact-check result determined by the content fact-checking service is presented based on the clarifying response. In the scenario shown in FIGS. 31 and 32, even with the clarifying information, the now non-ambiguous claim cannot be verified and the fact-checking results show that the clarified statement is unverifiable based on the available evidence. In this manner, statements can be initially ambiguous, but even when clarified, can be found to be true, false, or unverifiable. In some embodiments, the particular clarified employment statement shown in FIGS. 31 and 32 ("Andrew Park worked at Apple from 2010 to 2015") can be verified as true or false by providing user-supplied sources such as confidential employer employment records. In some embodiments, the disambiguation is performed by a content fact-checking service such as content fact-checking service 131 of FIG. 1 and/or content fact-checking service 301 of FIG. 3. In some embodiments, the disambiguation is performed by a fact clarification module such as fact clarification module 315 of FIG. 3. In some embodiments, the content fact-checking service is implemented by the processes of FIGS. 4-9 and the disambiguation process may be performed at least at step 403 of FIG. 4.

FIG. 33 is an example of a user interface of an embodiment of a content fact-checking service with source categorization and labeling. In the example user interface view shown, a claim (e.g., "Koenigsegg Jesko is fastest") is evaluated and found by the content fact-checking service to be "missing context." The claim is thus categorized and displayed with the "missing context" category label along with multiple sources that are also categorized and optionally labeled to explain and/or provide context to the determined "missing context" claim evaluation result. For example, the sources identified that are relevant to the claim and its evaluation result can be categorized into the categories: supporting sources, counterargument sources, and neutral sources. Other categories may be appropriate as well. In some embodiments, the sources and their determined categories are used for disambiguation of the analyzed claim. In some embodiments, the user interface displays the identified source category as a label alongside the source with a summary of the source. For example, for each of the identified sources relevant to the claim and its evaluation result, a summary of the source can be determined and shown along with a reference to the original source and a user interface label identifying the determined category of the source.

Figure 34:
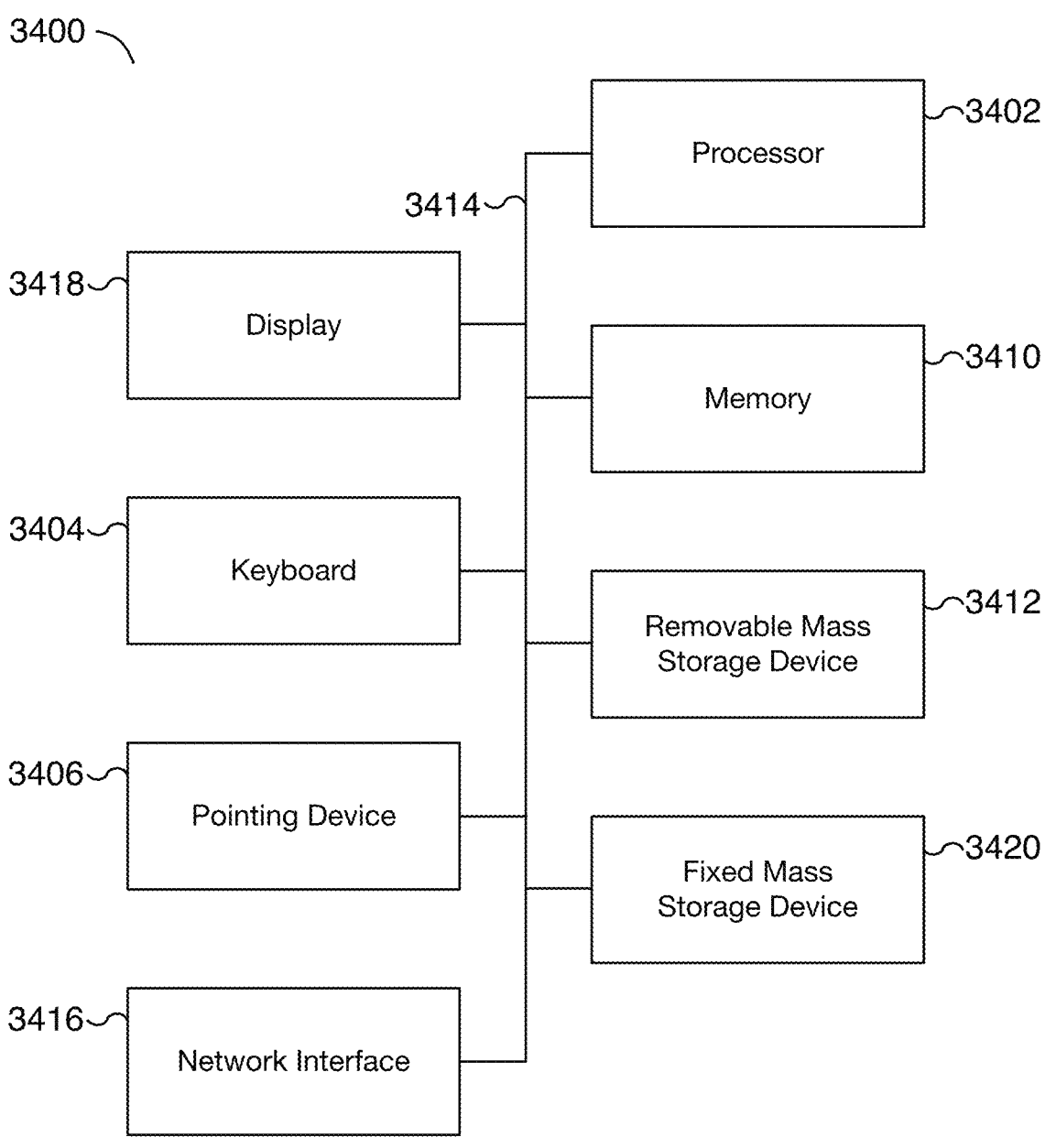
FIG. 34 is a functional diagram illustrating a programmed computer system for content fact-checking.

FIG. 34 is a functional diagram illustrating a programmed computer system for content fact-checking. As will be apparent, other computer system architectures and configurations can be utilized for content fact-checking. Examples of computer system 3400 include clients 101, 103, and 105 of FIG. 1, one or more computers of content fact-checking service 131 of FIG. 1, large language model (LLM) services 141 of FIG. 1, and/or content fact-checking service 301 of FIG. 3, and/or one or more computers used to enable the execution of client application 201 of FIG. 1. Computer system 3400, which includes various subsystems as described below, includes at least one microprocessor subsystem (also referred to as a processor or a central processing unit (CPU)) 3402. For example, processor 3402 can be implemented by a single-chip processor or by multiple processors. In some embodiments, processor 3402 is a general purpose digital processor that controls the operation of the computer system 3400. Using instructions retrieved from memory 3410, the processor 3402 controls the reception and manipulation of input data, and the output and display of data on output devices (e.g., display 3418). In various embodiments, one or more instances of computer system 3400 can be used to implement at least portions of the processes of FIGS. 4-9 and the functionality associated with the diagrams of FIGS. 10-33.

Processor 3402 is coupled bi-directionally with memory 3410, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 3402. Also as is well known in the art, primary storage typically includes basic operating instructions, program code, data and objects used by the processor 3402 to perform its functions (e.g., programmed instructions). For example, memory 3410 can include any suitable computer-readable storage media, described below, depending on whether, for example, data access needs to be bi-directional or unidirectional. For example, processor 3402 can also directly and very rapidly retrieve and store frequently needed data in a cache memory (not shown).

A removable mass storage device 3412 provides additional data storage capacity for the computer system 3400 and is coupled either bi-directionally (read/write) or unidirectionally (read only) to processor 3402. For example, storage 3412 can also include computer-readable media such as magnetic tape, flash memory, PC-CARDS, portable mass storage devices, holographic storage devices, and other storage devices. A fixed mass storage 3420 can also, for example, provide additional data storage capacity. The most common example of mass storage 3420 is a hard disk drive. Mass storages 3412, 3420 generally store additional programming instructions, data, and the like that typically are not in active use by the processor 3402. It will be appreciated that the information retained within mass storages 3412 and 3420 can be incorporated, if needed, in standard fashion as part of memory 3410 (e.g., RAM) as virtual memory.

In addition to providing processor 3402 access to storage subsystems, bus 3414 can also be used to provide access to other subsystems and devices. As shown, these can include a display monitor 3418, a network interface 3416, a keyboard 3404, and a pointing device 3406, as well as an auxiliary input/output device interface, a sound card, speakers, and other subsystems as needed. For example, the pointing device 3406 can be a mouse, stylus, track ball, or tablet, and is useful for interacting with a graphical user interface.

The network interface 3416 allows processor 3402 to be coupled to another computer, computer network, or telecommunications network using a network connection as shown. For example, through the network interface 3416, the processor 3402 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 3402 can be used to connect the computer system 3400 to an external network and transfer data according to standard protocols. For example, various process embodiments disclosed herein can be executed on processor 3402 or can be performed across a network such as the Internet, intranet networks, or local area networks, in conjunction with a remote processor that shares a portion of the processing. Additional mass storage devices (not shown) can also be connected to processor 3402 through network interface 3416.

An auxiliary I/O device interface (not shown) can be used in conjunction with computer system 3400. The auxiliary I/O device interface can include general and customized interfaces that allow the processor 3402 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 34 is but an example of a computer system suitable for use with the various embodiments disclosed herein. Other computer systems suitable for such use can include additional or fewer subsystems. In addition, bus 3414 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving content;
using a machine learning model query to automatically identify one or more statements in the content that meet one or more candidate criteria for correctness verification, wherein identifying one or more statements that meet the one or more candidate criteria include distinguishing purported facts from subjective opinion statements based on machine linguistic analysis;
for at least one statement of the identified one or more statements, using a machine learning model to perform a first assessment of correctness of the at least one statement including by searching resources associated with the at least one statement to determine a search result and automatically evaluating the search result as an input to the machine learning model using retrieval-augmented generation to determine whether the at least one statement is verifiable, wherein the first assessment includes categorizing the at least one statement as missing context when an ambiguity associated with the at least one statement prevents a definitive assessment of correctness;

in response to categorizing the at least one statement as missing context, requesting a clarification on the ambiguity;
receiving a user feedback response clarifying the ambiguity;
performing a second assessment of the correctness of the at least one statement based on the user feedback response; and
automatically determining based on the second assessment, a machine learning model generated revision of at least one statement assessed to be incorrect in the identified one or more statements.

2. The method of claim 1, wherein the search result includes one or more resources for supporting or refuting the assessed correctness of the at least one statement.

3. The method of claim 2, wherein the one or more resources for supporting or refuting the assessed correctness of the at least one statement are ranked based on one or more metrics.

4. The method of claim 3, wherein the one or more metrics are based on one or more of the following associated with the statement: reliability, accuracy, bias, political leaning, endorsements, purpose, intention, reputation, credibility, transparency, language, currency, peer review, or objectivity.

5. The method of claim 1, wherein using the machine learning model to assess the correctness of the at least one statement includes determining a confidence score associated with the assessed correctness.

6. The method of claim 5, wherein the confidence score is based on a ranking of at least one resource identified by the search result, and wherein the at least one resource is used to support or refute the assessed correctness of the at least one statement.

7. The method of claim 1, further comprising categorizing the assessed correctness of the at least one statement as belonging to one of the following categories: true, false, unverifiable, or missing context.

8. The method of claim 1, further comprising generating a summary of the assessed correctness of the at least one statement, wherein the summary identifies resources of the search result that are in agreement or are in disagreement.

9. The method of claim 1, further comprising generating a bias report, wherein the bias report compares two or more resources identified by the search result and used to assess the correctness of the at least one statement.

10. The method of claim 9, wherein the bias report includes a visualization of the two or more resources identified by the search result and used to assess the correctness of the at least one statement.

11. The method of claim 1, wherein the content is received from an extension of a client application, and the revision of the at least one statement accessed to be incorrect is provided to the client application via the extension.

12. A system, comprising:
one or more processors; and
a memory coupled to the one or more processors, wherein the memory is configured to provide the one or more processors with instructions which when executed cause the one or more processors to:
receive content;
using a machine learning model query, automatically identify one or more statements in the content that meet one or more candidate criteria for correctness verification, wherein identifying one or more statements that meet the one or more candidate criteria include distinguishing purported facts from subjective opinion statements based on machine linguistic analysis;

for at least one statement of the identified one or more statements, using a machine learning model, perform a first assessment of correctness of the at least one statement including by searching resources associated with the at least one statement to determine a search result and automatically evaluating the search result as an input to the machine learning model using retrieval-augmented generation to determine whether the at least one statement is verifiable, wherein the first assessment includes categorizing the at least one statement as missing context when an ambiguity associated with the at least one statement prevents a definitive assessment of correctness;

in response to categorizing the at least one statement as missing context, request a clarification on the ambiguity;

receive a user feedback response clarifying the ambiguity;

perform a second assessment of the correctness of the at least one statement based on the user feedback response; and automatically determine based on the second assessment, a machine learning model generated revision of at least one statement assessed to be incorrect in the identified one or more statements.

13. The system of claim 12, wherein the search result includes one or more resources for supporting or refuting the assessed correctness of the at least one statement.

14. The system of claim 12, wherein the memory is further configured to provide the one or more processors with instructions which when executed cause the one or more processors to: generate a summary of the assessed correctness of the at least one statement, wherein the summary identifies resources of the search result that are in agreement or are in disagreement.

15. The system of claim 12, wherein the memory is further configured to provide the one or more processors with instructions which when executed cause the one or more processors to: generate a bias report, wherein the bias report compares two or more resources identified by the search result and used to assess the correctness of the at least one statement.

16. The system of claim 12, wherein the content is received from an extension of a client application, and the revision of the at least one statement accessed to be incorrect is provided to the client application via the extension.

17. A method, comprising:

receiving a selection of content;

generating a content fact-checking request, wherein the content fact-checking request includes the selected content;

providing the content fact-checking request to a content fact-checking service that performs machine linguistic analysis for distinguishing a purported fact from a subjective opinion statement for the selected content; and in response to providing the content fact-checking request to the content fact-checking service, receiving a content fact-checking result, wherein the content fact-checking result is generated by the content fact-checking service searching resources associated with the selected content to determine a search result and evaluating the search result as an input to the machine learning model using retrieval-augmented generation to determine whether the selected content is verifiable including by: categorizing at least a portion of the selected content as missing context due to an ambiguity, requesting a clarification on the ambiguity, receiving a user feedback response clarifying the ambiguity, performing an updated assessment of correctness of the selected content based on the user feedback response, and automatically determining based on the updated assessment, a machine learning model generated revision of the selected content;

wherein the content fact-checking result includes: one or more statements of the content identified as meeting one or more candidate criteria for correctness verification, and a correctness assessment of each of the one or more identified statements.

18. The method of claim 17, wherein a correctness assessment of at least one of the one or more identified statements is categorized as belonging to one of the following categories: true, partly true, inconclusive, partly false, or false.

19. The method of claim 17, wherein the content fact-checking result includes a revision of at least one of the one or more identified statements.

20. The method of claim 19, wherein the revision includes a citation to a resource in support of a factual claim of the revision.

21. A method, comprising:

receiving content;

using a machine learning model query to automatically identify one or more statements in the content that meet one or more candidate criteria for correctness verification, wherein identifying one or more statements that meet the one or more candidate criteria include distinguishing purported facts from subjective opinion statements based on machine linguistic analysis;

for at least one statement of the identified one or more statements, using a machine learning model to identify an ambiguity associated with the at least one statement that prevents a definitive assessment of correctness and categorize the at least one statement as missing context including by searching resources associated with the at least one statement to determine a search result and evaluating the search result as an input to the machine learning model using retrieval-augmented generation to determine whether the at least one statement is verifiable;

in response to categorizing the at least one statement as missing context, request a clarification on the ambiguity;

receiving a user feedback response to clarify the ambiguity of the at least one statement;

perform a second assessment of the correctness of the at least one statement based on the user feedback response; and automatically determine based on the second assessment, a machine learning model generated revision of at least one statement assessed to be incorrect in the identified one or more statements.

* * * * *